(12) United States Patent
Sato et al.

(10) Patent No.: US 9,578,344 B2
(45) Date of Patent: Feb. 21, 2017

(54) IMAGE CAPTURING SYSTEM, IMAGE CAPTURING APPARATUS, DECODING APPARATUS, IMAGE CAPTURING METHOD, AND DISPLAY CONTROL SYSTEM

(71) Applicant: Panasonic Intellectual Property Management Co., Ltd., Osaka (JP)

(72) Inventors: Satoshi Sato, Kyoto (JP); Takeo Azuma, Kyoto (JP); Jun Ozawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/258,440

(22) Filed: Sep. 7, 2016

(65) Prior Publication Data

US 2016/0381369 A1     Dec. 29, 2016

Related U.S. Application Data

(63) Continuation of application No. 14/510,121, filed on Oct. 9, 2014, now Pat. No. 9,479,787.

(30) Foreign Application Priority Data

Oct. 24, 2013    (JP) .................................. 2013-221216
Jun. 30, 2014    (JP) .................................. 2014-134106

(51) Int. Cl.
    *H04N 5/232*      (2006.01)
    *H04N 19/192*     (2014.01)
    (Continued)

(52) U.S. Cl.
    CPC .......... *H04N 19/192* (2014.11); *H04N 19/136* (2014.11); *H04N 19/172* (2014.11); *H04N 19/12* (2014.11); *H04N 19/60* (2014.11)

(58) Field of Classification Search
    CPC .... H04N 19/12; H04N 19/136; H04N 19/172; H04N 19/192; H04N 19/60; H04N 3/155; H04N 5/335
See application file for complete search history.

(56) References Cited

U.S. PATENT DOCUMENTS

| | | | | |
|---|---|---|---|---|
| 6,653,992 B1 * | 11/2003 | Colbeth | ................. | H04N 5/357 327/52 |
| 9,036,065 B1 * | 5/2015 | Vogelsang | ............. | H04N 5/378 250/208.1 |

(Continued)

FOREIGN PATENT DOCUMENTS

JP     2010-245955     10/2010

OTHER PUBLICATIONS

J. Ma, "Improved Iterative Curvelet Thresholding for Compressed Sensing and Measurement", IEEE Transactions on Instrumentation and Measurement, vol. 60, No. 1, Jan. 2011, pp. 126-136.

(Continued)

*Primary Examiner* — Amy Hsu
(74) *Attorney, Agent, or Firm* — Wenderoth, Lind & Ponack, L.L.P.

(57) ABSTRACT

An image capturing system includes a photoelectric conversion unit, a charge holding unit, a multiple sampling information setting unit, a multiple sampling unit, a conversion unit, and an image reconstruction unit. The photoelectric conversion unit converts optical signals received by a plurality of pixels to electric signals. The charge holding unit stores the electric signals and holds the electric signals as charge signals. The multiple sampling information setting unit sets multiple sampling information used for a multiple sampling process. The multiple sampling information includes first multiple sampling information and second (Continued)

multiple sampling information. The multiple sampling unit performs the multiple sampling process using the multiple sampling information and the charge signals so as to output signals. The conversion unit converts the output signals to digital signals. The image reconstruction unit generates reconstructed images using the digital signals and the multiple sampling information, and outputs the reconstructed images.

5 Claims, 44 Drawing Sheets

(51) Int. Cl.
*H04N 19/136* (2014.01)
*H04N 19/172* (2014.01)
*H04N 19/12* (2014.01)
*H04N 19/60* (2014.01)

(56) References Cited

U.S. PATENT DOCUMENTS

| | | | | |
|---|---|---|---|---|
| 2003/0076432 | A1* | 4/2003 | Luo | H04N 3/155 348/308 |
| 2009/0101798 | A1* | 4/2009 | Yadid-Pecht | H04N 5/3532 250/208.1 |
| 2010/0259662 | A1* | 10/2010 | Oike | H04N 5/335 348/308 |
| 2012/0038805 | A1* | 2/2012 | Kelly | G02B 26/0833 348/300 |
| 2014/0139684 | A1* | 5/2014 | Binder | H04N 5/349 348/164 |
| 2014/0193076 | A1* | 7/2014 | Gardiner | G06K 9/46 382/190 |

OTHER PUBLICATIONS

Y. Oike et al., "A 256x256 CMOS Image Sensor with ΔΣ—Based Single—Shot Compressed Sensing", IEEE International Solid—State Circuits Conference (ISSCC) Dig. of Tech. Papers, pp. 386-387, 2012.

Toshiyuki Tanaka, "Mathematics of Compressed Sensing", IEICE Fundamentals Review, vol. 4, No. 1, pp. 39-47, 2010 (with partial English translation).

Toshihide Ibaraki et al., "Method of Optimization", Information mathematics course, vol. 14, Kyoritsu Shuppan Co., Ltd., pp. 159-164, Published by first edition first impression on Jul. 20, 1993 (with partial English translation).

M. V. Afonso et al., "Fast Image Recovery Using Variable Splitting and Constrained Optimization", IEEE Transactions on Image Processing, vol. 19, No. 9, Sep. 2010, pp. 2345-2356.

C. Tomasi et al., "Bilateral Filterring for Gray and Color Images", Proc. of IEEE International Conference on Computer Vision, Bombay, India, pp. 839-846, 1998.

Makoto Nakashizuka, "Sparse Signal Representations and its Applications to Image processing", The Journal of the Institute of Image Information and Television Engineers, vol. 65, No. 10, pp. 1381-1386, 2011 (with partial English translation).

J. Zhang et al., "Compressed Sensing Recovery via Collaborative Sparsity", Proc. of IEEE Data Compression Conference, pp. 287-296, 2012.

* cited by examiner

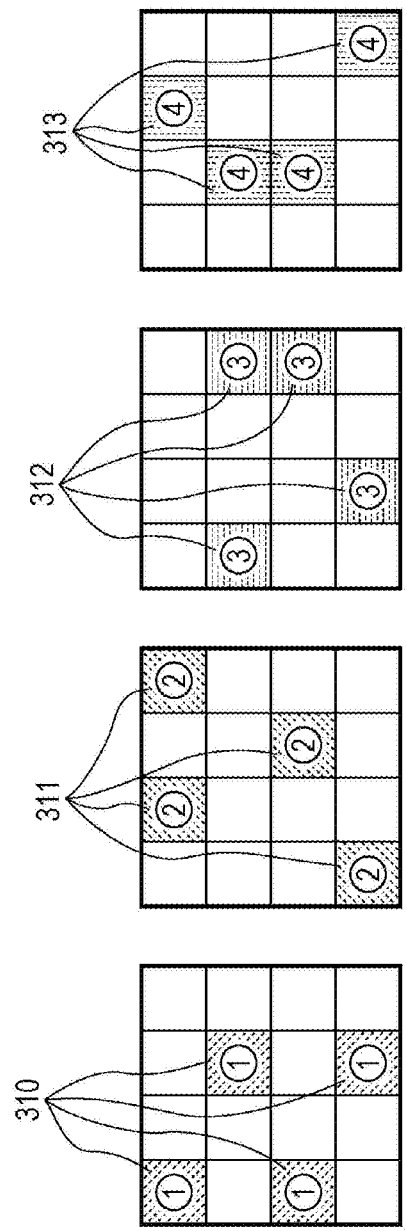

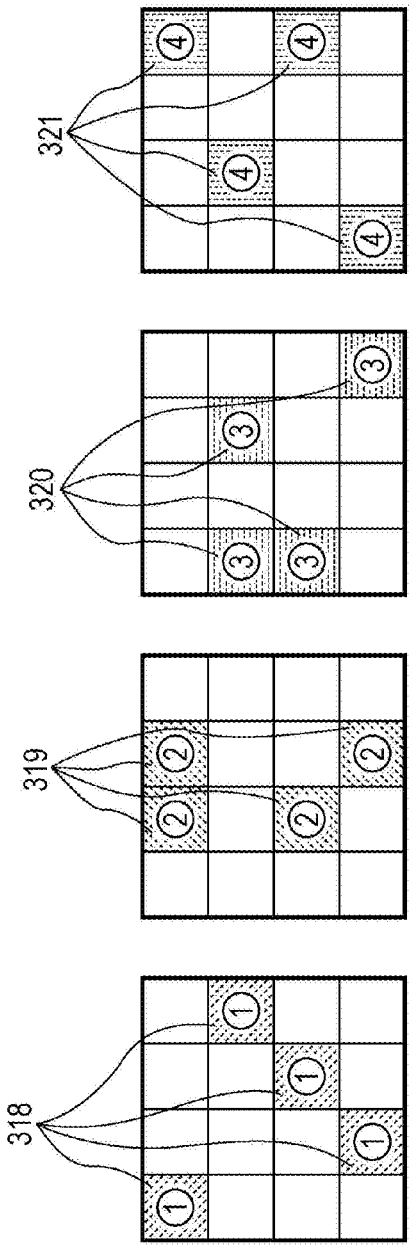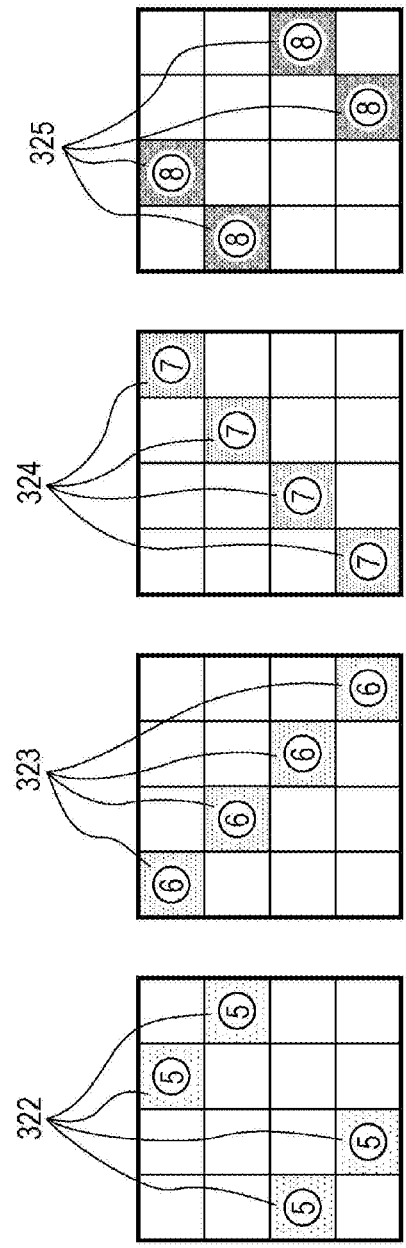

FIG. 12

| TABLE NUMBER | ENCODED DATA OF MULTIPLE SAMPLING INFORMATION | | | |
|---|---|---|---|---|
| 1 | 1010 | 0000 | 0101 | 0000 |
|  | 0100 | 0001 | 1000 | 0001 |
|  | 0001 | 1000 | 0000 | 1010 |
|  | 0000 | 0110 | 0010 | 0100 |
|  | 1000 | 0100 | 0010 | 0001 |
|  | 0010 | 0001 | 1000 | 0100 |
|  | 0100 | 1000 | 0001 | 0010 |
|  | 0001 | 0010 | 0100 | 1000 |
| 2 | 1000 | 0010 | 1000 | 0010 |
|  | 0101 | 0000 | 0010 | 1000 |
|  | 0000 | 1001 | 0001 | 0100 |
|  | 0010 | 0100 | 0100 | 0001 |
|  | 0100 | 0010 | 0001 | 1000 |
|  | 0001 | 1000 | 0100 | 0010 |
|  | 0010 | 0100 | 1000 | 0001 |
|  | 1000 | 0001 | 0010 | 0100 |

FIG. 13

| TABLE NUMBER | ENCODED DATA OF MULTIPLE SAMPLING INFORMATION | | | |
|---|---|---|---|---|
| 3 | 1000 | 0001 | 0010 | 0100 |
|   | 0110 | 0000 | 0100 | 0010 |
|   | 0000 | 1010 | 1000 | 0001 |
|   | 0001 | 0100 | 0001 | 1000 |
|   | 0010 | 0001 | 1000 | 0100 |
|   | 1000 | 0100 | 0010 | 0001 |
|   | 0001 | 0010 | 0100 | 1000 |
|   | 0100 | 1000 | 0001 | 0010 |
| 4 | 1001 | 0000 | 0000 | 1001 |
|   | 0100 | 0010 | 0001 | 0100 |
|   | 0010 | 1000 | 0110 | 0000 |
|   | 0000 | 0101 | 1000 | 0010 |
|   | 0001 | 1000 | 0100 | 0010 |
|   | 0100 | 0010 | 0001 | 1000 |
|   | 1000 | 0001 | 0010 | 0100 |
|   | 0010 | 0100 | 1000 | 0001 |

PSNR = 23.91 [dB]

PSNR = 27.41 [dB]

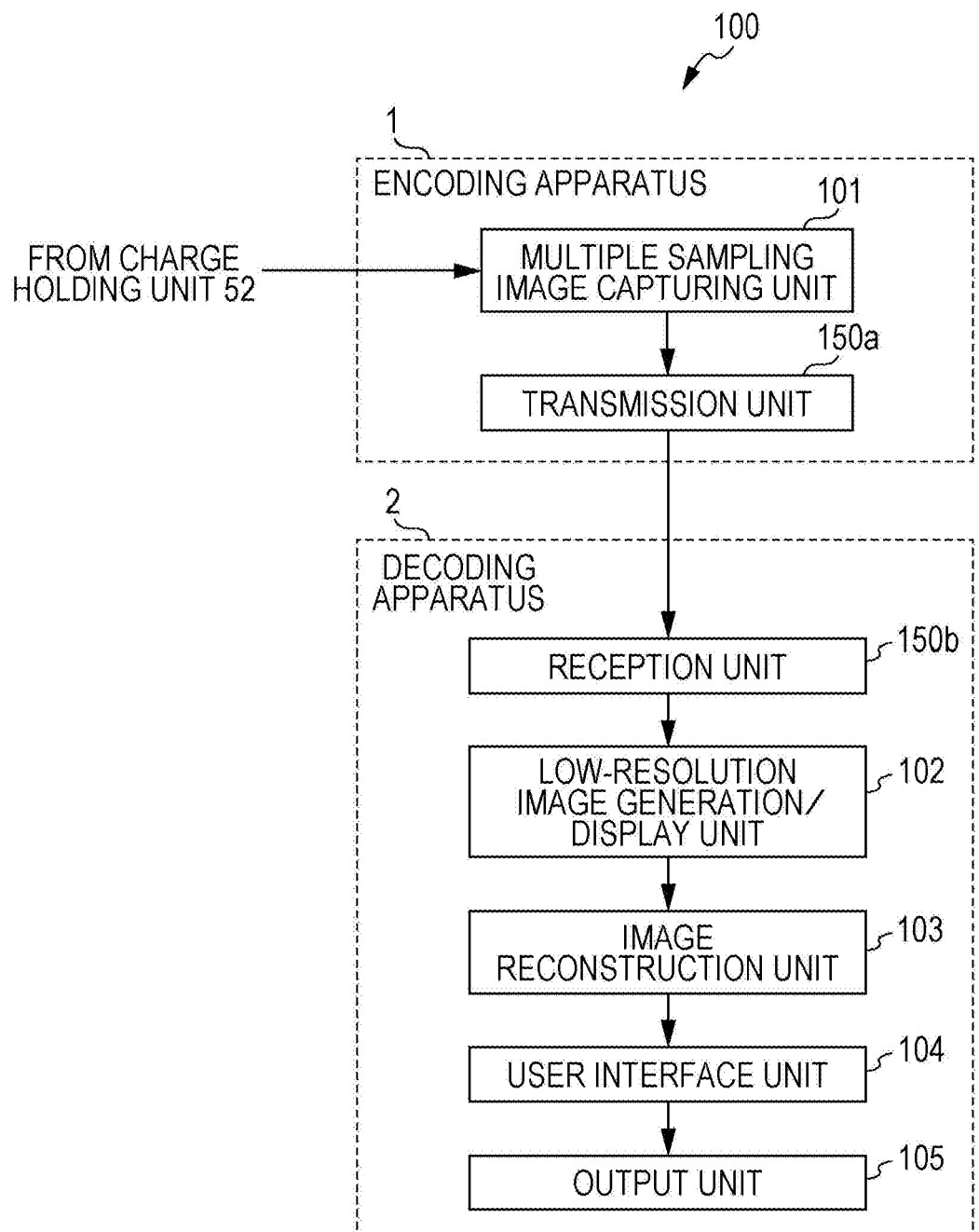

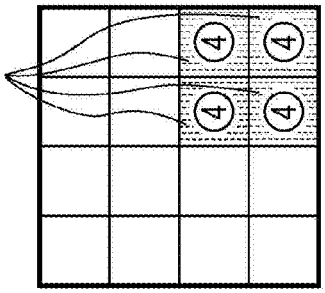
FIG. 25A
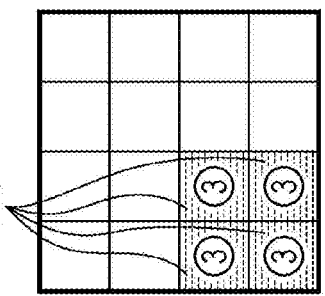
FIG. 25B
FIG. 25C
FIG. 25D
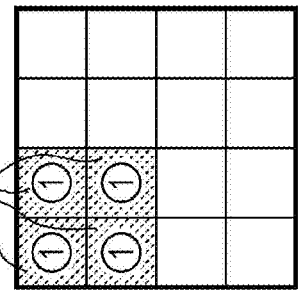
FIG. 25E
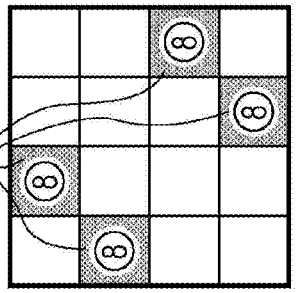
FIG. 25F
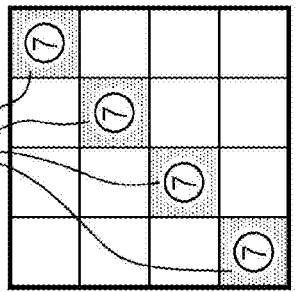
FIG. 25G
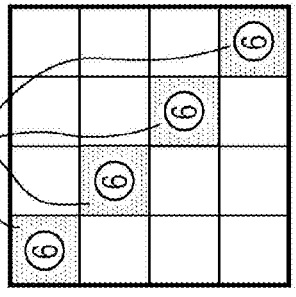
FIG. 25H
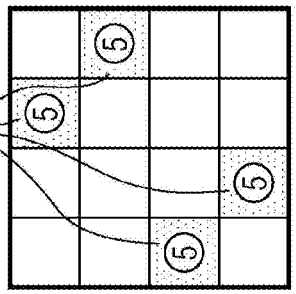

FIG. 27

| TABLE NUMBER | ENCODED DATA OF MULTIPLE SAMPLING INFORMATION | | | |
|---|---|---|---|---|
| 1 | 1100 | 1100 | 0000 | 0000 |
|   | 0011 | 0011 | 0000 | 0000 |
|   | 0000 | 0000 | 1100 | 1100 |
|   | 0000 | 0000 | 0011 | 0011 |
|   | 1000 | 0100 | 0010 | 0001 |
|   | 0010 | 0001 | 1000 | 0100 |
|   | 0100 | 1000 | 0001 | 0010 |
|   | 0001 | 0010 | 0100 | 1000 |
| 2 | 1100 | 1100 | 0000 | 0000 |
|   | 0011 | 0011 | 0000 | 0000 |
|   | 0000 | 0000 | 1100 | 1100 |
|   | 0000 | 0000 | 0011 | 0011 |
|   | 0100 | 0010 | 0001 | 1000 |
|   | 0001 | 1000 | 0100 | 0010 |
|   | 0010 | 0100 | 1000 | 0001 |
|   | 1000 | 0001 | 0010 | 0100 |

FIG. 28

| TABLE NUMBER | ENCODED DATA OF MULTIPLE SAMPLING INFORMATION | | | |
|---|---|---|---|---|
| 3 | 1100 | 1100 | 0000 | 0000 |
|   | 0011 | 0011 | 0000 | 0000 |
|   | 0000 | 0000 | 1100 | 1100 |
|   | 0000 | 0000 | 0011 | 0011 |
|   | 0010 | 0001 | 1000 | 0100 |
|   | 1000 | 0100 | 0010 | 0001 |
|   | 0001 | 0010 | 0100 | 1000 |
|   | 0100 | 1000 | 0001 | 0010 |
| 4 | 1100 | 1100 | 0000 | 0000 |
|   | 0011 | 0011 | 0000 | 0000 |
|   | 0000 | 0000 | 1100 | 1100 |
|   | 0000 | 0000 | 0011 | 0011 |
|   | 0001 | 1000 | 0100 | 0010 |
|   | 0100 | 0010 | 0001 | 1000 |
|   | 1000 | 0001 | 0010 | 0100 |
|   | 0010 | 0100 | 1000 | 0001 |

IMAGE CAPTURING SYSTEM, IMAGE CAPTURING APPARATUS, DECODING APPARATUS, IMAGE CAPTURING METHOD, AND DISPLAY CONTROL SYSTEM

CROSS REFERENCE TO RELATED APPLICATIONS

This application claims priority to Japanese Patent Applications No. 2013-221216 filed on Oct. 24, 2013 and No. 2014-134106 filed on May 30, 2014, the contents of which are hereby incorporated by reference.

BACKGROUND

1. Technical Field

The present disclosure relates to an image capturing apparatus that uses compressed sensing.

2. Description of the Related Art

In recent years, a technique called "compressed sensing" has been developed. Compressed sensing is a technique of compressing image information by adding pixel values (charge signals) of a plurality of pixels at the time of capturing an image, and reconstructing the image using the sparsity (described below) of the image (see, for example, J. Ma, "Improved Iterative Curvelet Thresholding for Compressed Sensing and Measurement", IEEE Transactions on Instrumentation and Measurement, vol. 60, no. 1, pp 126-136, 2011). Image capturing based on the above-described method is called multiple sampling image capturing.

SUMMARY

Further enhancement of the quality of a reconstructed image has been demanded.

One non-limiting and exemplary embodiment provides an image capturing system that enhances the quality of a reconstructed image.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

In one general aspect, the techniques disclosed here feature an image capturing system including a photoelectric conversion unit, a charge holding unit, a multiple sampling information setting unit, a multiple sampling unit, a conversion unit, and an image reconstruction unit. The photoelectric conversion unit is configured to convert optical signals received by a plurality of pixels to electric signals. The charge holding unit is configured to store the electric signals and hold the electric signals as charge signals. The multiple sampling information setting unit is configured to set multiple sampling information used for a multiple sampling process. The multiple sampling information includes first multiple sampling information and second multiple sampling information different from the first multiple sampling information. The multiple sampling unit is configured to perform the multiple sampling process using the multiple sampling information and the charge signals so as to output signals. The multiple sampling unit performs the multiple sampling process using the first multiple sampling information and first pixel values of a first plurality of pixels included in the plurality of pixels so as to output first signals used for a first frame. The multiple sampling unit performs the multiple sampling process using the second multiple sampling information and second pixel values of the first plurality of pixels so as to output second signals used for a second frame adjacent to the first frame. The output signals include the first signals and the second signals. The conversion unit is configured to convert the output signals to digital signals. The image reconstruction unit is configured to generate reconstructed images using the digital signals and the multiple sampling information, and output the reconstructed images.

With the image capturing system according to an embodiment of the present disclosure, a reconstructed image of higher quality can be obtained.

BRIEF DESCRIPTION OF THE DRAWINGS

FIGS. 9A to 9H are schematic diagrams describing a multiple sampling process performed at time t2.

FIGS. 10A to 10H are schematic diagrams describing a multiple sampling process performed at time t3.

FIG. 12 is a schematic diagram illustrating an example of a multiple sampling information table, which is an example of a method for representing encoded data.

FIG. 13 is a schematic diagram illustrating an example of a multiple sampling information table, which is an example of a method for representing encoded data.

FIG. 19 is a block diagram illustrating the configuration of an encoding system according to a second embodiment.

FIGS. 25A to 25H are schematic diagrams describing a multiple sampling process performed at time t3.

FIG. 27 is a schematic diagram illustrating an example of a multiple sampling information table, which is an example of a method for representing encoded data.

FIG. 28 is a schematic diagram illustrating an example of a multiple sampling information table, which is an example of a method for representing encoded data.

DESCRIPTION OF THE PREFERRED EMBODIMENTS

Knowledge Underlying Present Disclosure

Figure 1:
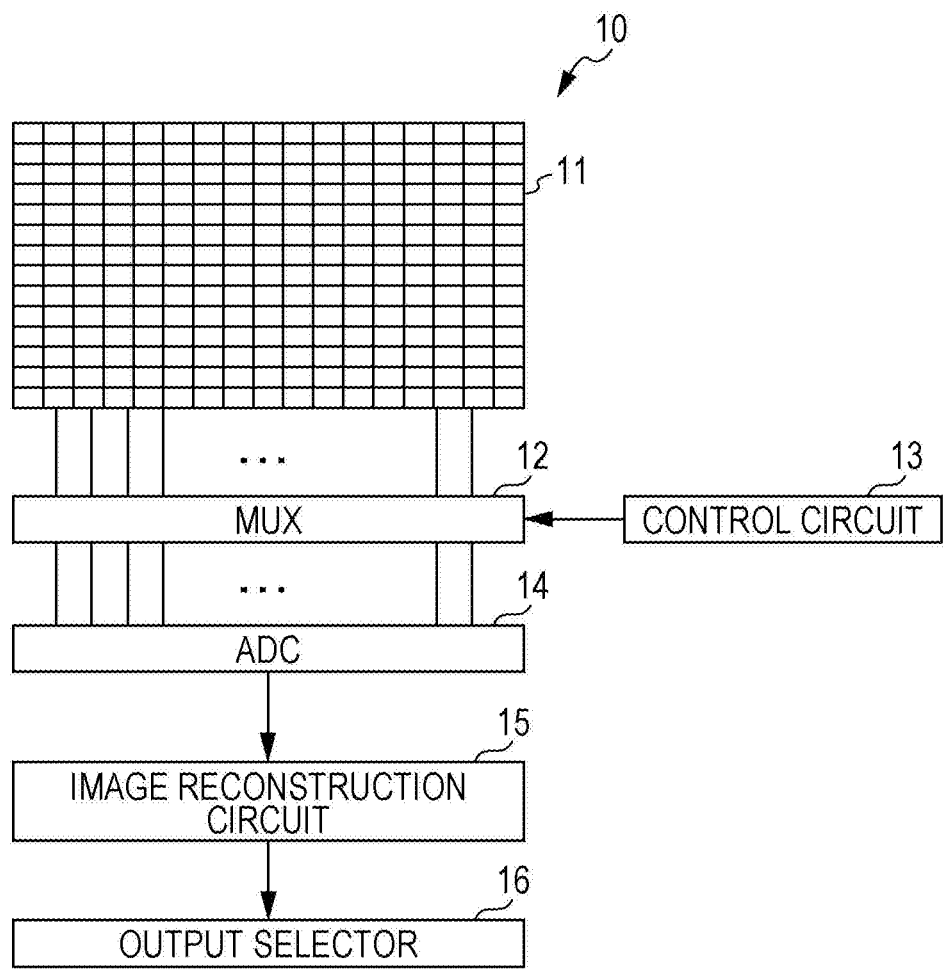
FIG. 1 is a diagram illustrating an example of the hardware configuration of an image capturing system according to an embodiment of the present disclosure.

In recent years, a technique called "compressed sensing" has been developed. Compressed sensing is a technique of compressing image information by adding pixel values (charge signals) of a plurality of pixels at the time of capturing an image, and reconstructing the image using the sparsity of the image (see, for example, J. Ma, "Improved Iterative Curvelet Thresholding for Compressed Sensing and Measurement", IEEE Transactions on Instrumentation and Measurement, vol. 60, no. 1, pp 126-136, 2011, hereinafter this reference is referred to as "J. Ma"). Image capturing based on the above-described method is called multiple sampling image capturing.

Normally, such multiple sampling image capturing causes loss in the amount of information about an image, and the quality of a reconstructed image is significantly degraded. However, with compressed sensing, a reconstruction process is performed using the sparsity of an image, and thus a reconstructed image whose quality is equivalent to the quality of the original image can be obtained, with the amount of data being reduced by addition image capturing. Here, "the sparsity of an image" means that, in a case where an image is projected to a wavelet space or a discrete cosine transform (DCT) space, the values of many coefficients become substantially zero. In compressed sensing, L0 norm minimization or L1 norm minimization is used as an image reconstruction method using the sparsity of an image.

In compressed sensing, data can be compressed by performing a simple addition process before performing a process using an analog-to-digital converter (hereinafter referred to as an "ADC") in an image capturing device, and thus the drive frequency of the ADC can be decreased. Accordingly, lower power consumption, a higher SN ratio, and a reduced communication band can be realized.

For example, Japanese Unexamined Patent Application Publication No. 2010-245955 discloses a solid-state image capturing device that uses the concept of compressed sensing. In this solid-state image capturing device, a plurality of different wires are connected to a plurality of pixels. The solid-state image capturing device sequentially drives a plurality of pixels in a pixel group at timings of different phases, so as to read out signals. This configuration realizes a solid-state image capturing device in which additional circuits are reduced, a sample and hold circuit is not necessary, and degradation of image quality caused by increased noise, an increase in area, and a decrease in speed can be prevented.

"J. Ma" discloses a method of applying compressed sensing to an image by using an improved iterative curvelet thresholding method.

However, the sparsity of an image, which is a premise of compressed sensing, is not necessarily achieved in general images. For example, a highly random image, such as an image of small objects that are scattered, is less likely to be sparse. Thus, if the method disclosed in "J. Ma" is used for such an image, the quality of a reconstructed image is degraded. Accordingly, further enhancement of the quality of a reconstructed image has been demanded.

An image capturing system according to an embodiment of the present disclosure includes a photoelectric conversion unit, a charge holding unit, a multiple sampling information setting unit, a multiple sampling unit, a conversion unit, and an image reconstruction unit. The photoelectric conversion unit is configured to convert optical signals received by a plurality of pixels to electric signals. The charge holding unit is configured to store the electric signals and hold the electric signals as charge signals. The multiple sampling information setting unit is configured to set multiple sampling information used for a multiple sampling process. The multiple sampling information includes first multiple sampling information and second multiple sampling information different from the first multiple sampling information. The multiple sampling unit is configured to perform the multiple sampling process using the multiple sampling information and the charge signals so as to output signals. The multiple sampling unit performs the multiple sampling process using the first multiple sampling information and first pixel values of a first plurality of pixels included in the plurality of pixels so as to output first signals used for a first frame. The multiple sampling unit performs the multiple sampling process using the second multiple sampling information and second pixel values of the first plurality of pixels so as to output second signals used for a second frame adjacent to the first frame. The output signals include the first signals and the second signals. The conversion unit is configured to convert the output signals to digital signals. The image reconstruction unit is configured to generate reconstructed images using the digital signals and the multiple sampling information, and output the reconstructed images.

In an image capturing system according to an embodiment of the present disclosure, image capturing is performed using a multiple sampling process while multiple sampling information being changed for each frame, and image reconstruction using a compressed sensing technique is performed on output signals of a plurality of frames obtained thereby. Since the multiple sampling process is performed by changing multiple sampling information for each frame, output signals can be randomly sampled also in a frame direction. Accordingly, a reconstructed image of higher quality can be obtained, with the amount of signals being reduced.

In an embodiment, the first plurality of pixels are n pixels. The first multiple sampling information includes m first pieces of information, m being smaller than n. The multiple sampling unit outputs m first addition results. Each of the m first addition results is given by summing pixel values of pixels specified by one of the m first pieces of information. The m first addition results and the m first pieces of information are in one-to-one relationship. The second multiple sampling information includes m second pieces of information. The multiple sampling unit outputs m second addition results. Each of the m second addition results is given by summing pixel values of pixels specified by one of the m second pieces of information. The m second addition results and the m second pieces of information are in one-to-one relationship.

In an embodiment, the multiple sampling information setting unit sets, for all of the plurality of pixels, multiple sampling information for performing control to perform a multiple sampling process that varies among frames.

In an embodiment, the multiple sampling information setting unit sets, for some of the plurality of pixels, multiple sampling information for performing control to perform a multiple sampling process that is identical among frames.

In an embodiment, the image reconstruction unit includes an average signal generation unit configured to generate a time average image of reconstructed images that have been generated in a certain period of time, a difference signal generation unit configured to generate difference signals representing differences between the digital signals and the time average image, and a difference image reconstruction unit configured to generate a difference image from the difference signals using the multiple sampling information and further generate the reconstructed image using the difference image and the time average image.

In an embodiment, the multiple sampling information setting unit sets, as the multiple sampling information, information representing a method of the multiple sampling process performed by the multiple sampling unit.

In an embodiment, the charge holding unit outputs the charge signals as a frame image in every certain frame period, the multiple sampling information setting unit changes the multiple sampling information for each of the frame images, the charge signals include pixel signals corresponding to the plurality of pixels, and the multiple sampling unit simultaneously performs the multiple sampling process on pixels close to one another among the plurality of pixels on the basis of the multiple sampling information, so as to output one signal.

In an embodiment, the plurality of pixels are grouped into a plurality of pixel groups, and the image capturing system further includes a low-resolution image generation/display unit configured to generate a low-resolution image from individual signals output in association with the plurality of pixel groups, the low-resolution image having a relatively low resolution and being an image that is to be displayed on a viewer.

In an embodiment, the image capturing system further includes an image capturing state estimation unit configured to estimate an image capturing state, which is a state at a time when the optical signals are converted to the electric signals in the photoelectric conversion unit, and instruct the multiple sampling information setting unit to change the multiple sampling information in accordance with the estimated image capturing state.

In an embodiment, the image capturing state estimation unit detects an image region included in a scene in which a temporal change is larger than or equal to a predetermined reference, and instructs the multiple sampling information setting unit to increase a sampling number for the multiple sampling process for the detected image region.

An image capturing apparatus according to another embodiment of the present disclosure includes a photoelectric conversion unit, a charge holding unit, a multiple sampling information setting unit, and a multiple sampling unit. The photoelectric conversion unit is configured to convert optical signals received by a plurality of pixels to electric signals. The charge holding unit is configured to store the electric signals and hold the electric signals as charge signals. The multiple sampling information setting unit is configured to set multiple sampling information used for a multiple sampling process. The multiple sampling information includes first multiple sampling information and second multiple sampling information different from the first multiple sampling information. The multiple sampling unit is configured to perform the multiple sampling process using the multiple sampling information and the charge signals so as to output signals. The multiple sampling unit performs the multiple sampling process using the first multiple sampling information and first pixel values of a first plurality of pixels included in the plurality of pixels so as to output first signals used for a first frame. The multiple sampling unit performs the multiple sampling process using the second multiple sampling information and second pixel values of the first plurality of pixels so as to output second signals used for a second frame adjacent to the first frame. The output signals include the first signals and the second signals.

A decoding apparatus according to still another embodiment of the present disclosure is a decoding apparatus that receives digital signals from an encoding apparatus. The decoding apparatus includes a reception unit and an image reconstruction unit. The reception unit is configured to receive the digital signals and multiple sampling information from the encoding apparatus. The image reconstruction unit is configured to generate a reconstructed image using the digital signals and the multiple sampling information. The encoding apparatus includes a photoelectric conversion unit, a charge holding unit, a multiple sampling information setting unit, a multiple sampling unit, and a conversion unit. The photoelectric conversion unit is configured to convert optical signals received by a plurality of pixels to electric signals. The charge holding unit is configured to store the electric signals and hold the electric signals as charge signals. The multiple sampling information setting unit is configured to set the multiple sampling information used for a multiple sampling process. The multiple sampling information includes first multiple sampling information and second multiple sampling information different from the first multiple sampling information. The multiple sampling unit is configured to perform the multiple sampling process using the multiple sampling information and the charge signals so as to output signals. The multiple sampling unit performs the multiple sampling process using the first multiple sampling information and first pixel values of a first plurality of pixels included in the plurality of pixels so as to output first signals used for a first frame. The multiple sampling unit performs the multiple sampling process using the second multiple sampling information and second pixel values of the first plurality of pixels so as to output second signals used for a second frame adjacent to the first frame. The output signals include the first signals and the second signals. The conversion unit is configured to convert the output signals to digital signals.

In an embodiment, the image reconstruction unit includes an average signal generation unit configured to generate a time average image of reconstructed images that have been generated in a certain period of time, a difference signal generation unit configured to generate difference signals representing differences between the digital signals and the time average image, and a difference image reconstruction unit configured to generate a difference image from the difference signals using the multiple sampling information and further generate the reconstructed image using the difference image and the time average image.

An image capturing method according to another embodiment of the present disclosure includes a photoelectric conversion step, a charge holding step, a multiple sampling information setting step, a multiple sampling step, a conversion step, and an image reconstruction step. The photoelectric conversion step converts optical signals received by a plurality of pixels to electric signals. The charge holding step stores the electric signals and holds the electric signals as charge signals. The multiple sampling information setting step sets multiple sampling information used for a multiple sampling process. The multiple sampling information includes first multiple sampling information and second multiple sampling information different from the first multiple sampling information. The multiple sampling step performs the multiple sampling process using the multiple sampling information and the charge signals so as to output signals. The multiple sampling step performs the multiple sampling process using the first multiple sampling informa-tion and first pixel values of a first plurality of pixels included in the plurality of pixels so as to output first signals used for a first frame. The multiple sampling step performs the multiple sampling process using the second multiple sampling information and second pixel values of the first plurality of pixels so as to output second signals used for a second frame adjacent to the first frame. The output signals include the first signals and the second signals. The conversion step converts the output signals to digital signals. The image reconstruction step generates reconstructed images using the digital signals and the multiple sampling information, and outputs the reconstructed images.

A display control system according to another embodiment of the present disclosure includes a reception unit, a decoding apparatus, and an output unit. The reception unit is configured to receive, from the above-described image capturing apparatus, digital signals of a plurality of frames based on the charge signals on which the multiple sampling process has been performed, and the multiple sampling information. The decoding apparatus is configured to extract, using a compressed sampling technique, a region of at least part of a frame specified by the multiple sampling information and the digital signals, the region being extracted as a still image. The output unit is configured to output the still image.

In an embodiment, the display control system further includes a determination unit configured to determine a percentage of an image region that has changed among the plurality of frames. In a case where a determination result generated by the determination unit indicates that the percentage is lower than a certain percentage, the decoding apparatus extracts a region of at least part of a frame specified by an instruction, the region being extracted as a still image.

Hereinafter, an overview of the present disclosure will be described. An image capturing system according to an embodiment of the present disclosure captures an image using the technique of compressed sensing. The image capturing system includes a photoelectric conversion unit configured to convert optical signals received by a plurality of pixels to electric signals; a charge holding unit configured to store the electric signals and hold the electric signals as charge signals; a multiple sampling information setting unit configured to set, for at least some of the plurality of pixels and for two certain frames adjacent to each other, multiple sampling information for performing control to perform a multiple sampling process that varies among the frames; a multiple sampling unit configured to perform the multiple sampling process on the charge signals in accordance with the multiple sampling information and output the charge signals; a conversion unit configured to convert output signals output from the multiple sampling unit to digital signals; and an image reconstruction unit configured to generate reconstructed images using the digital signals and the multiple sampling information and output the reconstructed images.

An image capturing apparatus according to an embodiment of the present disclosure uses the technique of compressed sensing, and includes a multiple sampling image capturing unit configured to capture an image by performing multiple sampling on a plurality of pixels; a low-resolution image generation/display unit configured to generate and display a low-resolution image using information about an image captured by the multiple sampling image capturing unit; an image reconstruction unit configured to reconstruct an image using information about an image captured by the multiple sampling image capturing unit; a user interface unit configured to detect an intention of a user; and an output unit configured to display an output image on the basis of the intention of the user detected by the user interface unit.

The multiple sampling image capturing unit includes a photoelectric conversion unit configured to convert optical signals received by a plurality of pixels to electric signals; a charge holding unit configured to hold charges stored in the photoelectric conversion unit; a multiple sampling information setting unit configured to set a multiple sampling method (multiple sampling information) so that the multiple sampling method varies among frames; a multiple sampling unit configured to add, in a plurality of pixels, the charge signals held by the charge holding unit in accordance with the multiple sampling information; and an analog-to-digital converter configured to convert output signals of the multiple sampling unit to digital signals. Further, the image reconstruction unit includes an average signal generation unit configured to generate a time average image of reconstructed images, an average signal holding unit configured to hold the time average image generated by the average signal generation unit; a difference signal generation unit configured to generate a difference signal representing a difference between an output signal of the analog-to-digital converter and a signal corresponding to the time average image held by the average signal holding unit using the multiple sampling information set by the multiple sampling information setting unit; and a difference image reconstruction unit configured to reconstruct an image using the difference signal and the technique of compressed sensing.

With this configuration, the image capturing apparatus is capable of performing image capturing while changing multiple sampling information for each frame. Accordingly, a high-quality time average image can be generated. In a difference signal obtained by subtracting a signal corresponding to a time average image held by the average signal holding unit from an output signal of the analog-to-digital converter, signal components correlated among frames are cancelled, and thus the difference signal has a high sparsity compared to a general image signal. Thus, as a result of reconstructing an image using a difference signal and compressed sensing, a reconstructed image of higher quality can be obtained. Furthermore, a multiple sampling process enables the drive frequency of an analog-to-digital converter (ADC) to be decreased, and thus lower power consumption, a higher SN ratio, and a reduced communication band can be realized.

Hereinafter, an image capturing system according to an embodiment of the present disclosure will be described with reference to the attached drawings.

First Embodiment

FIG. 1 illustrates an example of the hardware configuration of an image capturing system 10 according to an embodiment of the present disclosure. The image capturing system 10 includes an image capturing device 11, a multiplexer (MUX) 12, a control circuit 13, an analog-to-digital converter (ADC) 14, an image reconstruction circuit 15, and an output selector 16.

The image capturing device 11 is a pixel array constituted by a plurality of pixels. The image capturing device 11 converts optical signals received thereby to electric signals. More specifically, the individual pixels of the image capturing device 11 receive light, store charges corresponding to the amount of received light, and output the charges.

The MUX 12 performs a multiple sampling process, which is a process of adding pixel values (charge signals) of a plurality of pixels. More specifically, the multiple sampling process is a process of adding, to a sampled charge signal of a pixel at a certain position, a sampled charge signal or sampled charge signals of a pixel or pixels at a position or positions having a certain relationship with the certain position, and thereby generating a new signal. The multiple sampling process is performed on analog charge signals, and the signal obtained thereby is also an analog charge signal. The details of the multiple sampling process according to this embodiment will be described below.

The control circuit 13 generates a control signal for controlling a multiple sampling process in the MUX 12, and outputs the control signal to the MUX 12. This control signal corresponds to multiple sampling information described below.

The ADC 14 converts analog charge signals obtained through the multiple sampling process to digital data. The ADC 14 is, for example, a $\Delta\Sigma$-type ADC constituted by connecting a $\Delta\Sigma$ modulator and a digital filter (both are not illustrated) in series. The $\Delta\Sigma$ modulator receives the analog signals and converts the signals to a pulse waveform (digital waveform) of one bit, which has been sampled at a rate higher than an estimated sampling rate. The digital filter performs band limitation and decimation on the pulse wave, and outputs multi-bit digital data of the estimated sampling rate.

The image reconstruction circuit 15 generates an image that would have been originally generated by the image capturing device 11 using the digital data obtained from the ADC 14 and the compressed sampling technique. This process is referred to as "reconstruct an image" in this specification.

The output selector 16 selects whether or not to output the image reconstructed by the image reconstruction circuit 15. For example, if an image capturing switch for capturing an image (not illustrated) is OFF, the output selector 16 prohibits output of the reconstructed image. On the other hand, if the image capturing switch is ON, the output selector 16 permits output of the reconstructed image.

Figure 2:
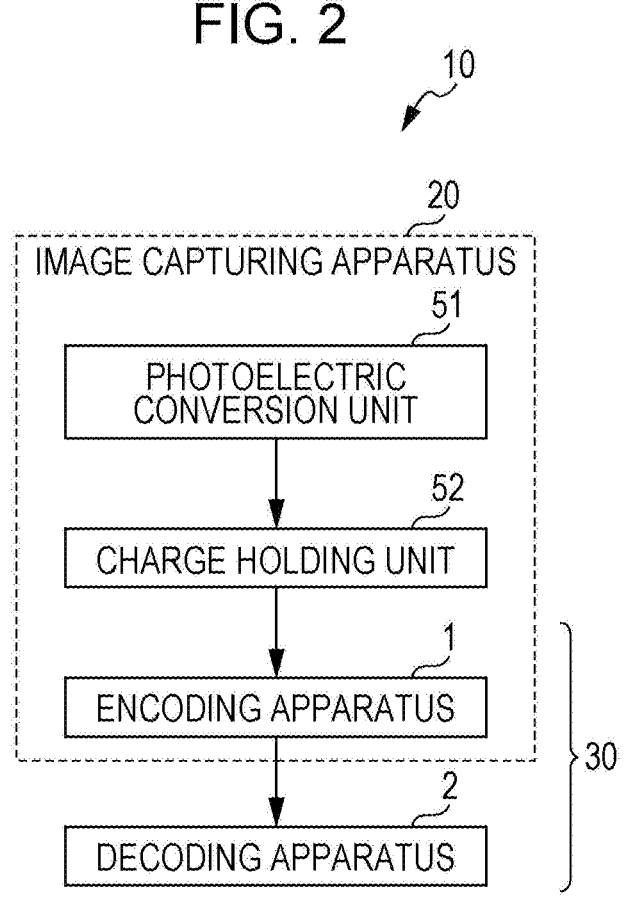
FIG. 2 is a block diagram illustrating an example of the configuration of an image capturing system according to a first embodiment.

FIG. 2 is a block diagram illustrating an example of the configuration of the image capturing system 10 according to this embodiment. The image capturing system 10 includes an image capturing apparatus 20 and a decoding apparatus 2. The image capturing apparatus 20 encodes and outputs an image signal obtained through capturing. The decoding apparatus 2 decodes and reconstructs an image using the encoded image signal transmitted from the image capturing apparatus 20.

The image capturing apparatus 20 includes a photoelectric conversion unit 51, a charge holding unit 52, and an encoding apparatus 1.

The photoelectric conversion unit 51 includes a plurality of pixels, and each pixel converts received light to an electric signal corresponding to the amount of light. The charge holding unit 52 stores the electric signals obtained by the photoelectric conversion unit 51 for a certain period of time, and holds the electric signals as charge signals. The photoelectric conversion unit 51 and the charge holding unit 52 correspond to the image capturing device 11 illustrated in FIG. 1.

The encoding apparatus 1 corresponds to the MUX 12, the control circuit 13, and the ADC 14 illustrated in FIG. 1.

The decoding apparatus 2 corresponds to the image reconstruction circuit 15 and the output selector 16 illustrated in FIG. 1.

The image capturing apparatus 20 of the image capturing system 10 according to an embodiment of the present disclosure compresses image signals that have not been A/D converted in order to reduce the amount of information, using the method of compressed sensing. The image capturing apparatus 20 converts the analog signals to digital data and outputs the digital data. The decoding apparatus 2 reconstructs an image using the digital data.

A compression process and a reconstruction process have a great influence on the quality of an image that is finally output, and thus it is important how to perform these processes.

Regarding the compression process, a sampling method for a multiple sampling process performed on some pixels (multiple sampling information) is set so as to vary among frames, and charge signals held by the charge holding unit 52 are added in accordance with the multiple sampling information.

Regarding the reconstruction process, an image is reconstructed using digital data of a plurality of frames that has been obtained in a certain period of time, multiple sampling information for the plurality of frames, and the technique of compressed sensing.

In the image capturing system 10 according to an embodiment of the present disclosure, image capturing is performed by changing multiple sampling information for each frame. As a result of changing multiple sampling information for each frame to be captured, an artifact that depends on multiple sampling information can vary among frames. Accordingly, an image of higher quality can be reconstructed. Furthermore, a multiple sampling process enables the drive frequency of the ADC to be decreased, and thus lower power consumption, a higher SN ratio, and a reduced communication band can be realized.

As is understood from the description given above, in this embodiment, the process performed in the encoding apparatus 1 and the decoding apparatus 2 may be regarded as a main process. Thus, a description will be given below mainly of a process performed in an encoding system 30 that includes the encoding apparatus 1 and the decoding apparatus 2. The following embodiments will also be described by focusing on an encoding system. The encoding system according to each embodiment may also be incorporated into an image capturing system like the one illustrated in FIG. 2.

In FIG. 2, the image capturing apparatus 20 and the decoding apparatus 2 are separated from each other, but the image capturing apparatus 20 may include the decoding apparatus 2. The encoding apparatus 1 and the decoding apparatus 2 are not necessarily provided in different housings as long as an image can be compressed before A/D conversion and at least one of the above-described advantages can be obtained.

Figure 3:
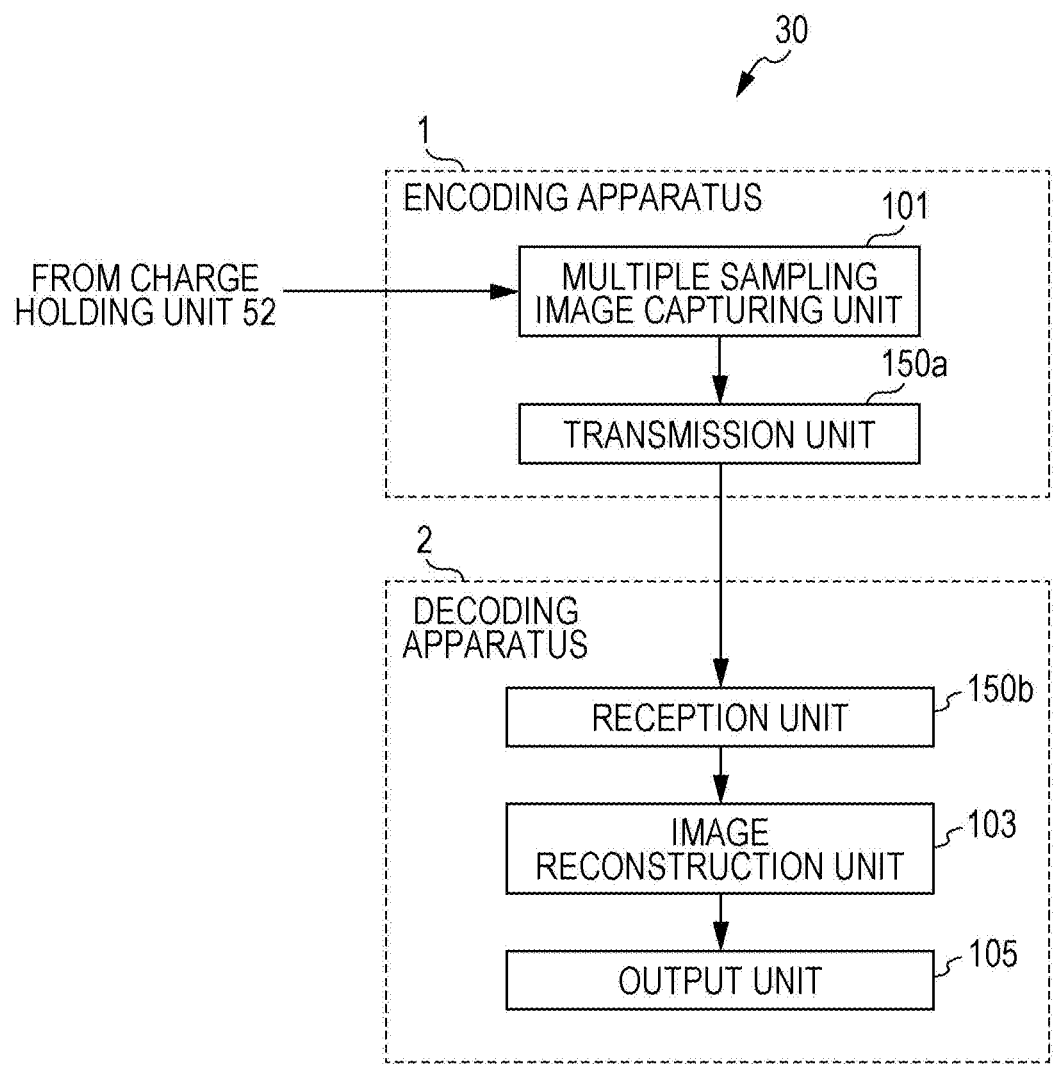
FIG. 3 is a block diagram illustrating the configuration of an encoding system according to the first embodiment.
Figure 4:
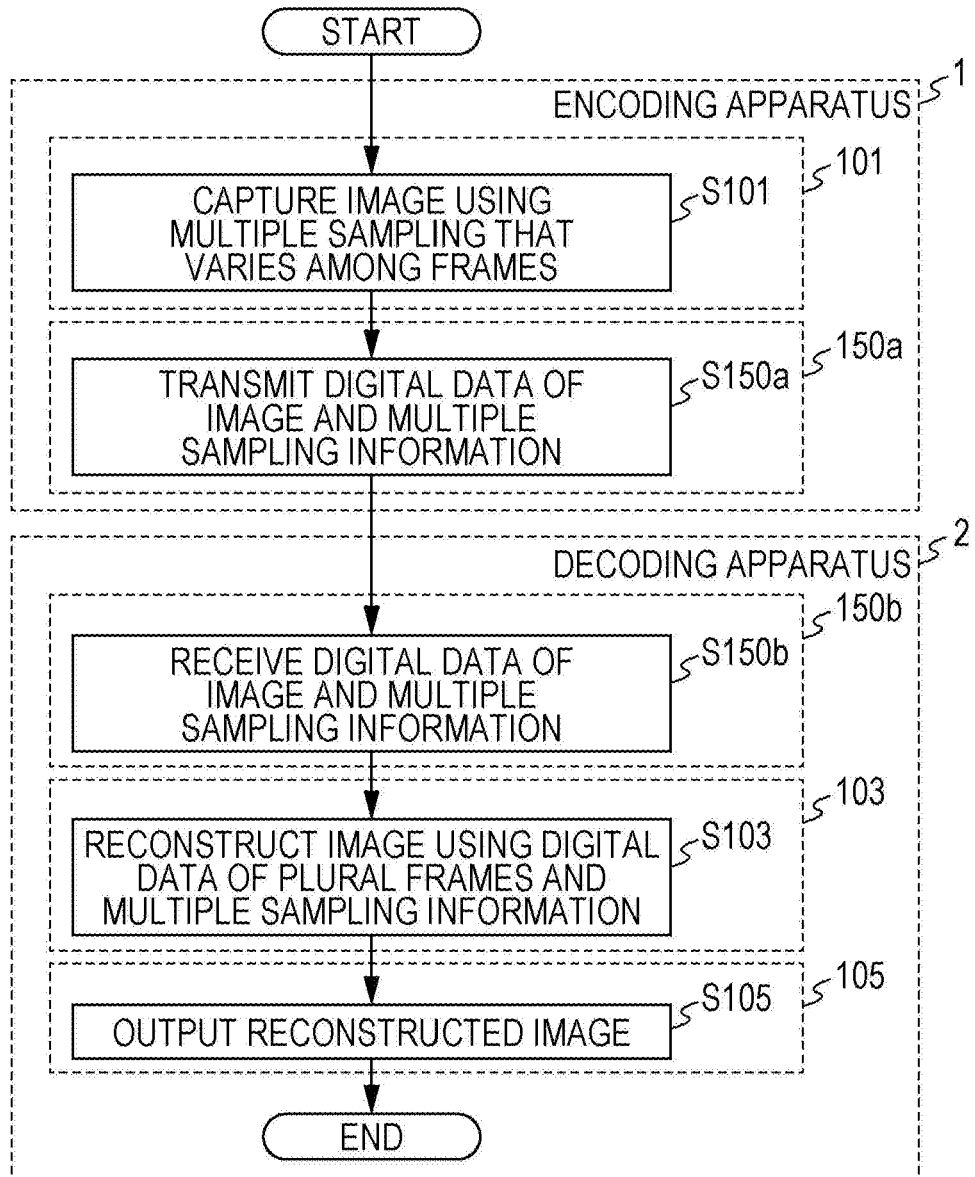
FIG. 4 is a flowchart illustrating the procedure of a main process performed in the encoding system according to the first embodiment.

FIG. 3 is a block diagram illustrating the configuration of the encoding system 30 according to this embodiment. FIG. 4 is a flowchart illustrating the procedure of a main process performed in the encoding system 30 according to this embodiment.

As described above, the encoding system 30 includes the encoding apparatus 1 and the decoding apparatus 2. The encoding apparatus 1 includes a multiple sampling image capturing unit 101 and a transmission unit 150*a*. The decoding apparatus 2 includes a reception unit 150*b*, an image reconstruction unit 103, and an output unit 105. The transmission unit 150*a* of the encoding apparatus 1 and the reception unit 150*b* of the decoding apparatus 2 communicate with each other, and transmit or receive digital data of an image and multiple sampling information. The communication is performed via a wireless or wired communication line (network). That is, the reception unit 150*b* may be mounted as a communication circuit.

The encoding apparatus 1 need not always transmit digital data of an image and multiple sampling information to the decoding apparatus 2 in real time. For example, a recording medium may be provided instead of the transmission unit 150*a*, and digital data of an image and multiple sampling information may be written on the recording medium. The recording medium may be provided inside the encoding apparatus 1 or outside the encoding apparatus 1. Other compression coding techniques may be compositively used for recording. The digital data of the image and the multiple sampling information that have been read from the recording medium may be transmitted to the decoding apparatus 2. This exemplary configuration is also applied to the following embodiments.

The operations of the individual elements of the encoding apparatus 1 and the decoding apparatus 2 will be described with reference to FIG. 4.

The multiple sampling image capturing unit 101 receives charge signals from the charge holding unit 52, performs a multiple sampling process that varies among frames (described below), and captures an image of a scene (step S101).

The charge holding unit 52 may output charge signals as a frame image in every certain frame period. The transmission unit 150*a* transmits digital data of the image captured by the multiple sampling image capturing unit 101 and the multiple sampling information used by the multiple sampling image capturing unit 101 to capture the image, to the decoding apparatus 2 (step S150*a*).

The reception unit 150*b* receives the digital data of the image and the multiple sampling information used by the multiple sampling image capturing unit 101 to capture the image, which have been transmitted from the transmission unit 150*a* (step S150*b*).

The image reconstruction unit 103 reconstructs the captured image using multiple sampling signals of a plurality of frames captured by the multiple sampling image capturing unit 101 and the compressed sampling technique (step S103).

The output unit 105 outputs the reconstructed image (step S105).

Figure 5:
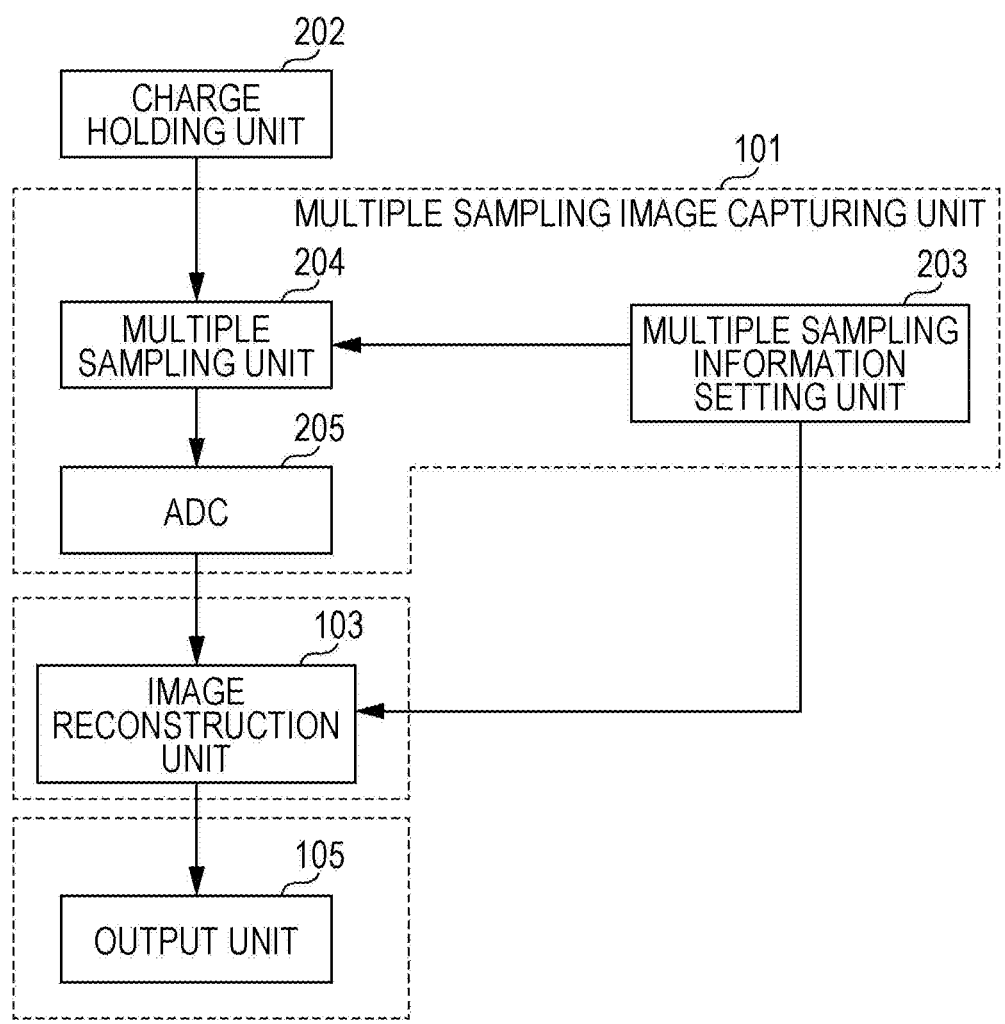
FIG. 5 is a block diagram illustrating the detailed configurations of a multiple sampling image capturing unit of an image capturing apparatus and an image reconstruction unit according to the first embodiment.
Figure 6:
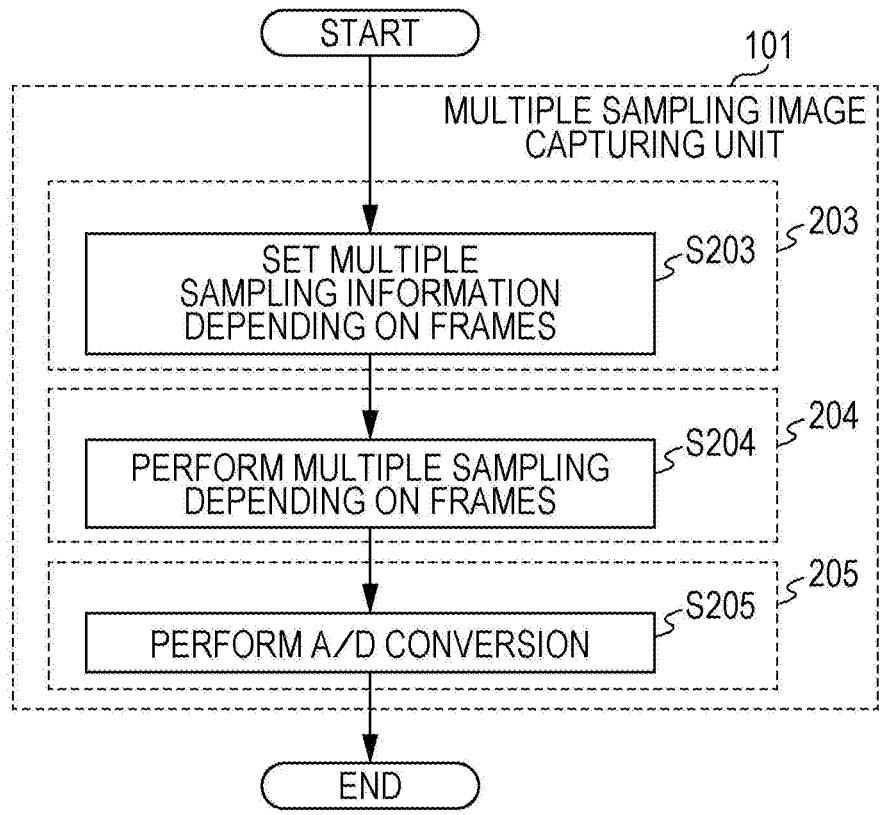
FIG. 6 is a flowchart illustrating the procedure of a process performed in the multiple sampling image capturing unit according to the first embodiment.

FIG. 5 is a block diagram illustrating the detailed configuration of the multiple sampling image capturing unit 101 and the image reconstruction unit 103. In FIG. 5, the transmission unit 150*a* and the reception unit 150*b* are not illustrated. FIG. 6 is a flowchart illustrating the procedure of a process performed in the multiple sampling image capturing unit 101 of the image capturing apparatus 20 according to this embodiment.

The multiple sampling image capturing unit 101 includes a multiple sampling information setting unit 203, a multiple sampling unit 204, and an analog-to-digital converter (ADC) 205. The multiple sampling information setting unit 203, the multiple sampling unit 204, and the ADC 205 correspond to the control circuit 13, the MUX 12, and the ADC 14 illustrated in FIG. 1, respectively.

The image reconstruction unit 103 corresponds to the image reconstruction circuit 15 illustrated in FIG. 1, and is an operation circuit constituted by, for example, an integrated circuit.

Hereinafter, the individual elements of the multiple sampling image capturing unit 101 and the image reconstruction unit 103 will be described in detail.

First, a process performed in the multiple sampling image capturing unit 101 will be described in detail.

The multiple sampling information setting unit 203 sets multiple sampling information so that the pixels to be added vary among frames in a multiple sampling process performed by the multiple sampling unit 204 (step S203). The multiple sampling information setting unit 203 may change multiple sampling information for each frame image. The multiple sampling information is information for specifying the details of a process performed by the multiple sampling unit 204. Specifically, the multiple sampling information includes, regarding individual signal values of new output signals after a multiple sampling process, the positions of pixels sampled to be added in original charge signals, gain information about pixels representing how much gain is to be given to perform addition, and order information representing the order in which added output signals are to be transmitted. The multiple sampling information setting unit 203 may change multiple sampling information for each frame image by switching among a plurality of types of multiple sampling information. A specific example will be described below.

The multiple sampling unit 204 performs a multiple sampling process on charge signals (pixel values) of a plurality of pixels held by the charge holding unit 52 on the basis of the multiple sampling information set by the multiple sampling information setting unit 203, so as to generate and output new signals (step S204). At this time, the quality of a reconstructed image can be enhanced by changing the multiple sampling information for each frame, as described below.

The ADC 205 converts the signals generated by the multiple sampling unit 204 to digital signals (step S205). This process may be performed using the above-described ΔΣ-type ADC, or may be performed using a pipeline-type or column-type ADC which are widely used.

With the multiple sampling process performed by the multiple sampling unit 204, the amount of image information can be reduced, and accordingly the amount of signals to be transmitted to the ADC 205, that is, the amount of signals to be processed by the ADC 205, can be reduced. The image reconstruction unit 103 is capable of reconstructing an image using the compressed image information and the multiple sampling information.

Next, a multiple sampling process performed by the multiple sampling unit 204 will be described in detail with reference to FIGS. 7 and 8A to 17B. In this specification, a description will be given of a process of outputting eight signals for 4×4=16 pixels as an example, to simplify the description.

This exemplary process for sixteen pixels may be applied to all the pixels of the image capturing device 11, or to some of the pixels of the image capturing device 11.

Figure 7:
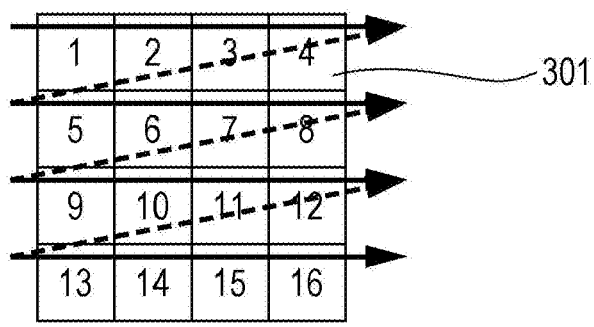
FIG. 7 is a diagram illustrating the arrangement of 4×4=16 pixels.

FIG. 7 illustrates the arrangement of 4×4=16 pixels, which are used as an example in this specification. In FIG. 7, pixel numbers are assigned to the individual 4×4 pixels. Specifically, for the 4×4 pixels, "1", "2", "3", and "4" are assigned in the right direction in order from the pixel at the upper-left corner. Also, "5", "6", . . . are assigned from the left-end pixel in the next row, and "16" is assigned to the pixel at the lower-right corner. For example, a pixel 301 is a pixel having a pixel number 4. FIGS. 8A to 11H are schematic diagrams describing a multiple sampling process.

It is assumed that a multiple sampling process is performed at time t1, time t2, time t3, and time t4 in chronological order, where t1 is the earliest. It is assumed that, with the sampling process performed at each time, eight multiple sampling signals are output for the pixel values of sixteen pixels. In a case where frame 1, frame 2, frame 3, and frame 4 are consecutive in this order, eight output signals obtained through the multiple sampling process performed at time t1 may be used for frame 1. Eight output signals obtained through the multiple sampling process performed at time t2 may be used for frame 2. Eight output signals obtained through the multiple sampling process performed at time t3 may be used for frame 3. Eight output signals obtained through the multiple sampling process performed at time t4 may be used for frame 4. FIGS. 8A to 8H illustrate the pixels from which charge signals are obtained to be added to generate eight output signals obtained through the multiple sampling process performed at time t1. That is, the pixels to which numbers are assigned in each of FIGS. 8A to 8H are pixels used for the multiple sampling process. In this specification, a group of pixels used for a multiple sampling process illustrated in each of FIGS. 8A to 8H is called a "readout pixel group".

FIGS. 8A to 8H illustrate eight readout pixel groups 302 to 309 at time t1.

Figure 8D:
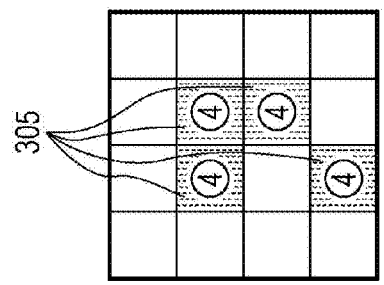
FIGS. 8A to 8H are schematic diagrams describing a multiple sampling process performed at time t1.
Figure 8C:
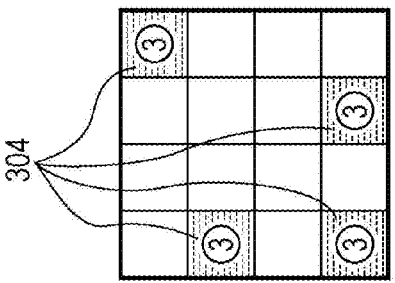
Figure 8B:
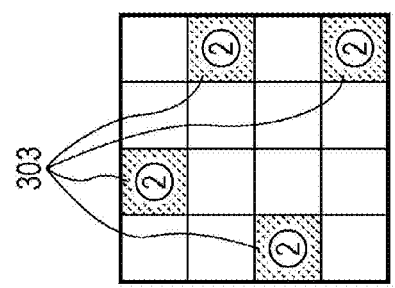
Figure 8A:
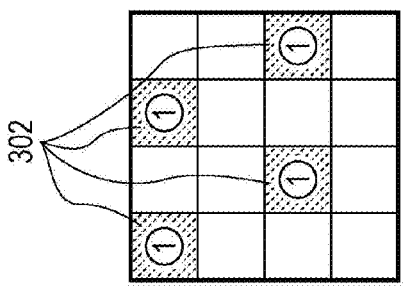

FIG. 8A illustrates that the readout pixel group 302 includes the pixels to which number 1 is assigned.

FIG. 8B illustrates that the readout pixel group 303 includes the pixels to which number 2 is assigned.

FIG. 8C illustrates that the readout pixel group 304 includes the pixels to which number 3 is assigned.

FIG. 8D illustrates that the readout pixel group 305 includes the pixels to which number 4 is assigned.

Figure 8H:
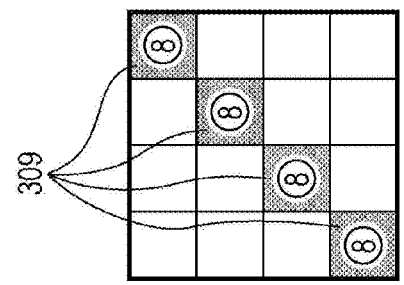
Figure 8G:
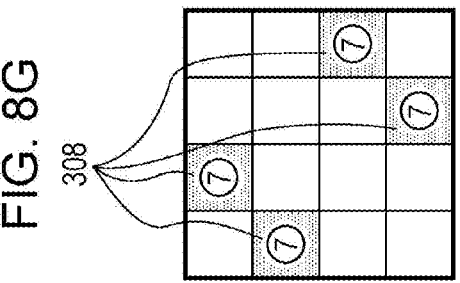
Figure 8F:
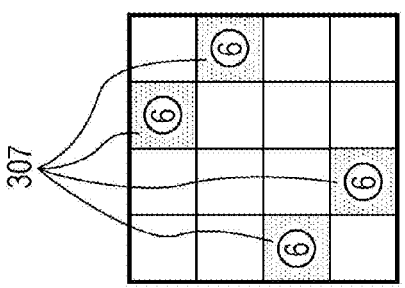
Figure 8E:
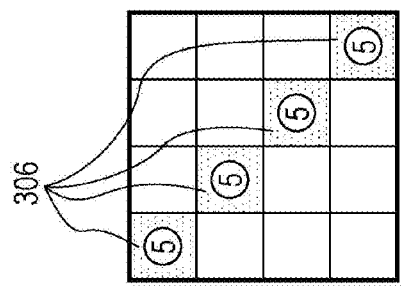
Figure 11D:
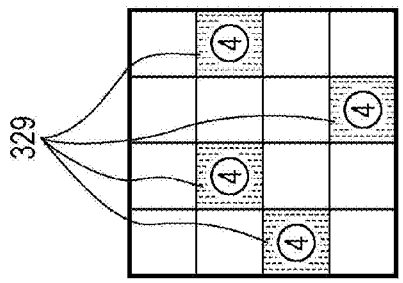
FIGS. 11A to 11H are schematic diagrams describing a multiple sampling process performed at time t4.
Figure 11C:
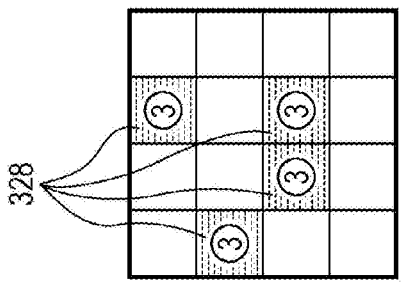
Figure 11B:
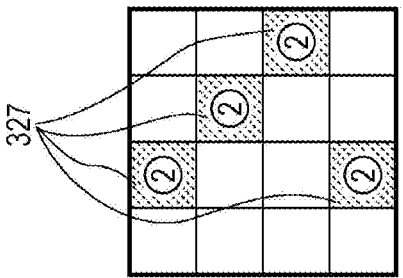
Figure 11A:
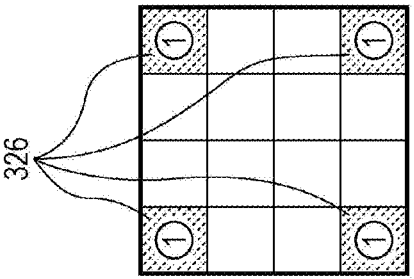
Figure 11H:
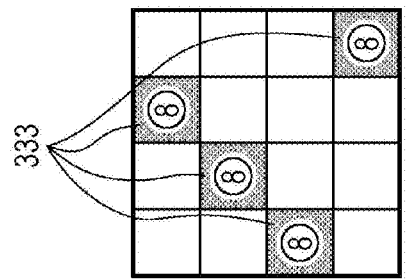
Figure 11G:
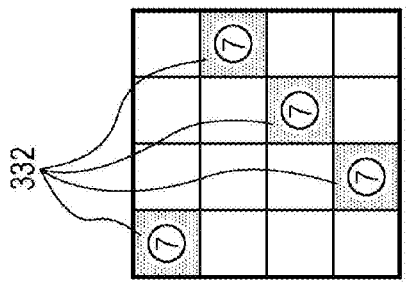
Figure 11F:
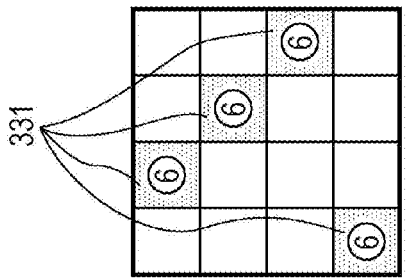
Figure 11E:
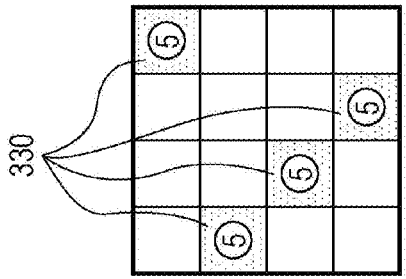

FIG. 8E illustrates that the readout pixel group 306 includes the pixels to which number 5 is assigned.

FIG. 8F illustrates that the readout pixel group 307 includes the pixels to which number 6 is assigned.

FIG. 8G illustrates that the readout pixel group 308 includes the pixels to which number 7 is assigned.

FIG. 8H illustrates that the readout pixel group 309 includes the pixels to which number 8 is assigned. Likewise, FIGS. 9A to 9H illustrate eight readout pixel groups 310 to 317 at time t2.

Likewise, FIGS. 10A to 10H illustrate eight readout pixel groups 318 to 325 at time t3.

Likewise, FIGS. 11A to 11H illustrate eight readout pixel groups 326 to 333 at time t4.

The eight output signals obtained through the multiple sampling process are regarded as a first output signal, a second output signal, a third output signal, a fourth output signal, a fifth output signal, a sixth output signal, a seventh output signal, and an eighth output signal.

The first output signal at time t1 is generated by reading out charge signals of the pixels having pixel numbers 1, 3, 10, and 12 illustrated in FIG. 8A and adding the charge signals of the four pixels.

The second output signal at time t1 is generated by reading out charge signals of the pixels having pixel numbers 2, 8, 9, and 16 illustrated in FIG. 8B and adding the charge signals of the four pixels.

The third output signal at time t1 is generated by reading out charge signals of the pixels having pixel numbers 4, 5, 13, and 15 illustrated in FIG. 8C and adding the charge signals of the four pixels.

The fourth output signal at time t1 is generated by reading out charge signals of the pixels having pixel numbers 6, 7, 11, and 14 illustrated in FIG. 8D and adding the charge signals of the four pixels.

The fifth output signal at time t1 is generated by reading out charge signals of the pixels having pixel numbers 1, 6, 11, and 16 illustrated in FIG. 8E and adding the charge signals of the four pixels.

The sixth output signal at time t1 is generated by reading out charge signals of the pixels having pixel numbers 3, 8, 9, and 14 illustrated in FIG. 8F and adding the charge signals of the four pixels.

The seventh output signal at time t1 is generated by reading out charge signals of the pixels having pixel numbers 2, 5, 12, and 15 illustrated in FIG. 8G and adding the charge signals of the four pixels.

The eighth output signal at time t1 is generated by reading out charge signals of the pixels having pixel numbers 4, 7, 10, and 13 illustrated in FIG. 8H and adding the charge signals of the four pixels.

In this way, charge signals of 4×4=16 pixels are compressed to eight output signals. Accordingly, the operation speed of the ADC 205 described below can be decreased, and thus an image can be reconstructed while realizing lower power consumption, a higher SN ratio, and a reduced communication band.

The above-described multiple sampling information is represented as data that has been encoded in the order of the pixel numbers illustrated in FIG. 7, with the pixel sampled for addition being "1", and the pixel not sampled being "0" (see FIGS. 7 and 8A to 8H). The details are as follows.

First output signal: "1010 0000 0101 0000"
Second output signal: "0100 0001 1000 0001"
Third output signal: "0001 1000 0000 1010"
Fourth output signal: "0000 0110 0010 0100"
Fifth output signal: "1000 0100 0010 0001"
Sixth output signal: "0010 0001 1000 0100"
Seventh output signal: "0100 1000 0001 0010"
Eighth output signal: "0001 0010 0100 1000"

As a result of combining these signals, the following multiple sampling information at time t1 is obtained.

"1010 0000 0101 0000 0100 0001 1000 0001 0001 1000 0000 1010 0000 0110 0010 0100 1000 0100 0010 0001 0010 0001 1000 0100 0100 1000 0001 0010 0001 0010 0100 1000"

In this specification, the above number sequence is called "encoded data of multiple sampling information" or "encoded data" for short. The form of the multiple sampling information is not limited to that described here. Any form may be used as long as the positions of the pixels sampled for addition are identified.

Likewise, the encoded data at time t2 illustrated in FIGS. 9A to 9H is as follows.

"1000 0010 1000 0010 0101 0000 0010 1000 0000 1001 0001 0100 0010 0100 0100 0001 0100 0010 0001 1000 0001 1000 0100 0010 0010 0100 1000 0001 1000 0001 0010 0100"

The encoded data at time t3 illustrated in FIGS. 10A to 10H is as follows.

"1000 00001 0010 0100 0110 0000 0100 0010 0000 1010 1000 0001 0001 0100 0001 1000 0010 0001 1000 0100 1000 0100 0010 0001 0001 0010 0100 1000 0100 1000 0001 0010"

The encoded data at time t4 illustrated in FIGS. 11A to 11H is as follows.

"1001 0000 0000 1001 0100 0010 0001 0100 0010 1000 0110 0000 0000 0101 1000 0010 0001 1000 0100 0010 0100 0010 0001 1000 1000 0001 0010 0100 0010 0100 1000 0001"

FIGS. 12 and 13 are schematic diagrams illustrating examples of a multiple sampling information table, which is an example of a method for representing such encoded data. The pieces of encoded data indicated by table numbers 1, 2, 3, and 4 illustrated in these figures correspond to the multiple sampling processes illustrated in FIGS. 8A to 8H, FIGS. 9A to 9H, FIGS. 10A to 10H, and FIGS. 11A and 11H, respectively.

In this way, as a result of reading out one pixel a plurality of times and performing an addition process a plurality of times, the dynamic range of output signals can be increased, and thus the SN ratio can be increased. Such a multiple sampling process is described in, for example, Y. Oike and A. E. Gamal, "A 256×256 CMOS Image Sensor with ΔΣ-Based Single-Shot Compressed Sensing", IEEE International Solid-State Circuits Conference (ISSCC) Dig. of Tech. Papers, pp. 386-387, 2012 (hereinafter this reference is referred to as "Y. Oike and A. E. Gamal").

In the encoding apparatus 1 according to this embodiment, the following feature is given to a multiple sampling process. That is, the multiple sampling process related to the individual first to eighth output signals varies among frames (frame images), in other words, every time of sampling. The sampling frequency of individual pixels included in a read-out pixel group is the same. However, the sampling frequency is not necessarily the same. The sampling frequency of individual pixels may vary. Further, it is not necessary that the multiple sampling process vary among all frames. For example, the same sampling process may be performed on a first frame and a second frame, and a different sampling process may be performed on a third frame. From a local point of view, different processes may be performed on two adjacent frames (in the above-described example, the second and third frames).

FIGS. 14A to 17B are schematic diagrams illustrating a feature of the multiple sampling process according to this embodiment. In these figures, the same elements as those in FIGS. 8A to 11H are denoted by the same reference numerals, and the description thereof is omitted.

Figure 14A:
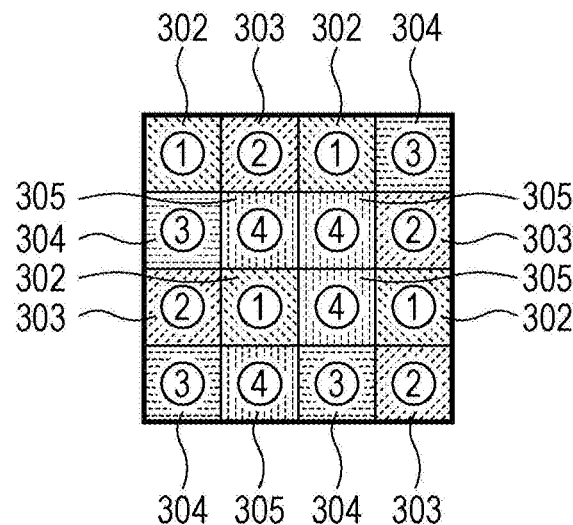
FIGS. 14A and 14B are schematic diagrams describing a feature of a multiple sampling process.

FIG. 14A illustrates the pixels included in the pixel group 302 (the readout pixel group 302) used for the multiple sampling process performed at time t1 (the pixels to which number 1 is assigned), the pixels included in the pixel group 303 (the readout pixel group 303) used for the multiple sampling process performed at time t1 (the pixels to which number 2 is assigned), the pixels included in the pixel group 304 (the readout pixel group 304) used for the multiple sampling process performed at time t1 (the pixels to which number 3 is assigned), and the pixels included in the pixel group 305 (the readout pixel group 305) used for the multiple sampling process performed at time t1 (the pixels to which number 4 is assigned).

Figure 14B:
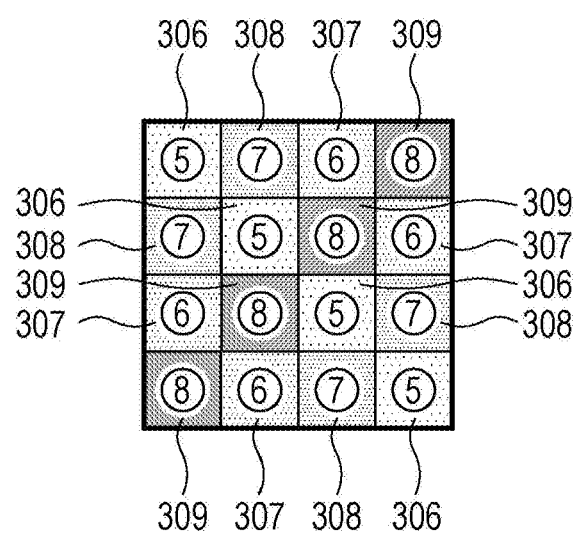

FIG. 14B illustrates the pixels included in the pixel group 306 (the readout pixel group 306) used for the multiple sampling process performed at time t1 (the pixels to which number 5 is assigned), the pixels included in the pixel group 307 (the readout pixel group 307) used for the multiple sampling process performed at time t1 (the pixels to which number 6 is assigned), the pixels included in the pixel group 308 (the readout pixel group 308) used for the multiple sampling process at time t1 (the pixels to which number 7 is assigned), and the pixels included in the pixel group 309 (the readout pixel group 309) used for the multiple sampling process performed at time t1 (the pixels to which number 8 is assigned).

Figure 15A:
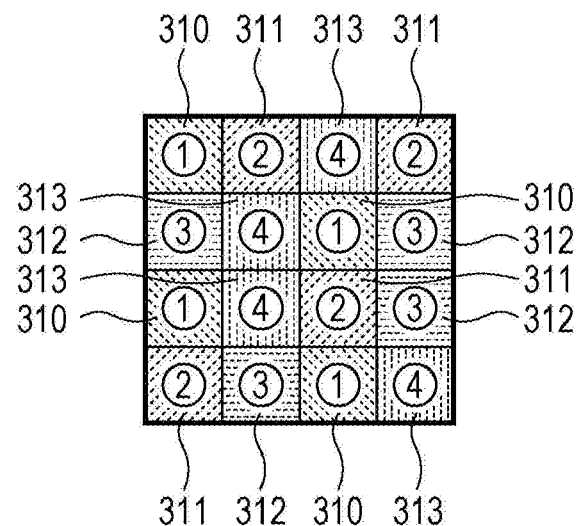
FIGS. 15A and 15B are schematic diagrams describing a feature of the multiple sampling process.
Figure 15B:
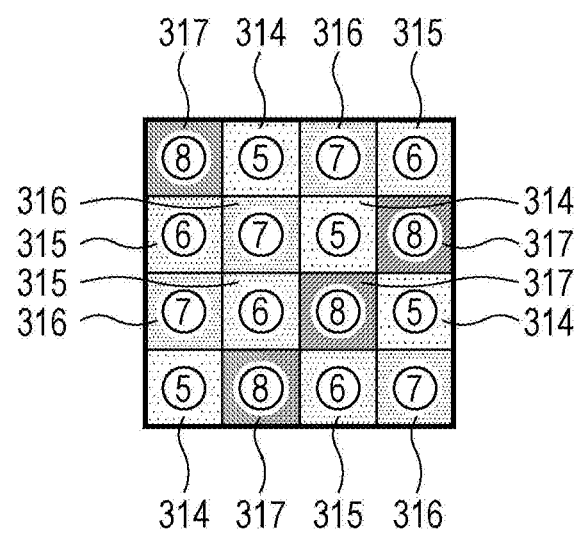

Likewise, FIGS. 15A and 15B illustrate the pixels included in the readout pixel groups 310 to 317 used for the multiple sampling process performed at time t2.

Figure 16A:
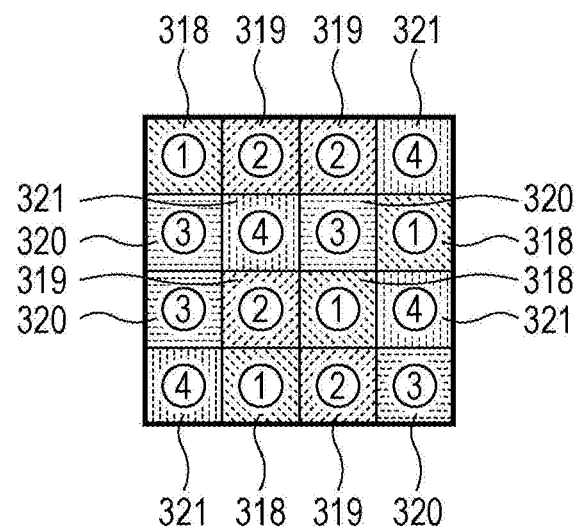
FIGS. 16A and 16B are schematic diagrams describing a feature of the multiple sampling process.
Figure 16B:
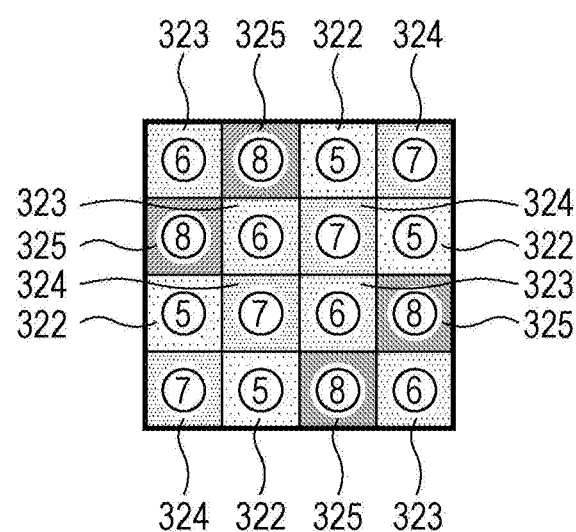

Likewise, FIGS. 16A and 16B illustrate the pixels included in the readout pixel groups 318 to 325 used for the multiple sampling process performed at time t3.

Figure 17A:
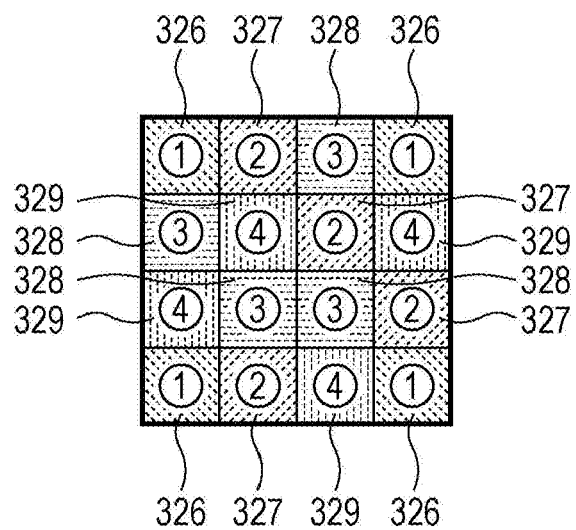
FIGS. 17A and 17B are schematic diagrams describing a feature of the multiple sampling process.
Figure 17B:
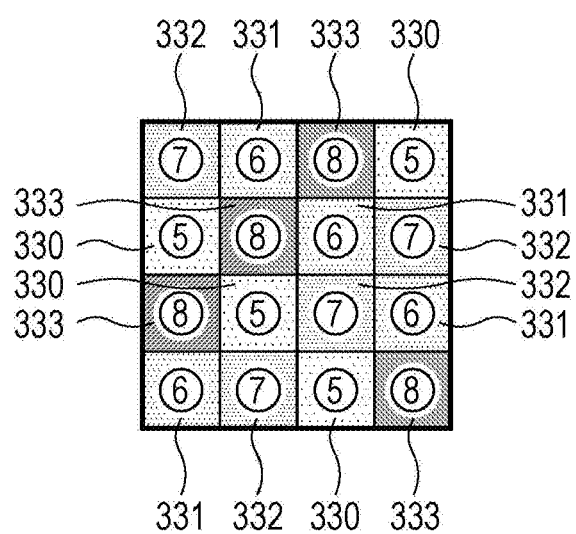

Likewise, FIGS. 17A and 17B illustrate the pixels included in the readout pixel groups 326 to 333 used for the multiple sampling process performed at time t4.

The eight output signals obtained through the multiple sampling process performed at time t1 include an output signal based on the pixel values of the pixels included in the readout pixel group 302, an output signal based on the pixel values of the pixels included in the readout pixel group 303, an output signal based on the pixel values of the pixels included in the readout pixel group 304, an output signal based on the pixel values of the pixels included in the readout pixel group 305, an output signal based on the pixel values of the pixels included in the readout pixel group 306, an output signal based on the pixel values of the pixels included in the readout pixel group 307, an output signal based on the pixel values of the pixels included in the readout pixel group 308, and an output signal based on the pixel values of the pixels included in the readout pixel group 309.

The eight output signals obtained through the multiple sampling process performed at time t2 include an output signal based on the pixel values of the pixels included in the readout pixel group 310, an output signal based on the pixel values of the pixels included in the readout pixel group 311, an output signal based on the pixel values of the pixels included in the readout pixel group 312, an output signal based on the pixel values of the pixels included in the readout pixel group 313, an output signal based on the pixel values of the pixels included in the readout pixel group 314, an output signal based on the pixel values of the pixels included in the readout pixel group 315, an output signal based on the pixel values of the pixels included in the readout pixel group 316, and an output signal based on the pixel values of the pixels included in the readout pixel group 317.

The eight output signals obtained through the multiple sampling process performed at time t3 include an output signal based on the pixel values of the pixels included in the readout pixel group 318, an output signal based on the pixel values of the pixels included in the readout pixel group 319, an output signal based on the pixel values of the pixels included in the readout pixel group 320, an output signal based on the pixel values of the pixels included in the readout pixel group 321, an output signal based on the pixel values of the pixels included in the readout pixel group 322, an output signal based on the pixel values of the pixels included in the readout pixel group 323, an output signal based on the pixel values of the pixels included in the readout pixel group 324, and an output signal based on the pixel values of the pixels included in the readout pixel group 325.

The eight output signals obtained through the multiple sampling process performed at time t4 include an output signal based on the pixel values of the pixels included in the readout pixel group 326, an output signal based on the pixel values of the pixels included in the readout pixel group 327, an output signal based on the pixel values of the pixels included in the readout pixel group 328, an output signal based on the pixel values of the pixels included in the readout pixel group 329, an output signal based on the pixel values of the pixels included in the readout pixel group 330, an output signal based on the pixel values of the pixels included in the readout pixel group 331, an output signal based on the pixel values of the pixels included in the readout pixel group 332, and an output signal based on the pixel values of the pixels included in the readout pixel group 333.

As described above, according to the individual output signals based on the readout pixel groups, the positions of the sampling pixels constantly change at time t1, time t2, time t3, and time t4. However, every pixel among the 4×4 pixels is sampled once, and the sampling frequency is the same. In this way, as a result of temporally changing sampling pixels, the quality of a time average image generated by an average signal generation unit 206 can be enhanced, as described below, and also the quality of an image reconstructed by the image reconstruction unit 103 can be enhanced. Further, as a result of sampling all the pixels at the same frequency, information about a captured image can be reliably obtained.

The above-described positions of sampled pixels are merely an example. The multiple sampling unit 204 may select the positions of sampled pixels as randomly and/or independently as possible from spatial and temporal viewpoints. Accordingly, degradation of image information caused by a multiple sampling process can be prevented, and the quality of a reconstructed image can be enhanced (see, for example, pp. 43-44 of Toshiyuki Tanaka, "Mathematics of Compressed Sensing", IEICE Fundamentals Review, vol. 4, no. 1, pp. 39-47, 2010, hereinafter this reference is referred to as "Toshiyuki Tanaka"). Such a random multiple sampling process is realized by setting encoded data that has been obtained through random sampling in advance, as illustrated in FIGS. 12 and 13. In this case, the multiple sampling information setting unit 203 may change the table number to be used for each frame.

Referring back to FIG. 5, a description will be given of the process performed in the decoding apparatus 2 of the encoding system 30. The main process in the decoding apparatus 2 is performed by the image reconstruction unit 103.

The image reconstruction unit 103 reconstructs an image corresponding to digital signals by using the digital signals of a plurality of frames output from the ADC 205 and multiple sampling information about the plurality of frames set by the multiple sampling information setting unit 203. The reconstruction process may be performed using a method according to the related art, such as a method using collaborative sparsity that is used for compressed sensing using a plurality of frames (see, for example, J. Zhang, D. Zhao, C. Zhao, R. Xiong, S. Ma, and W. Gao, "Compressed Sensing Recovery via Collaborative Sparsity", Proc. of IEEE Data Compression Conference, pp. 287-296, 2012, hereinafter this reference is referred to as "J. Zhang et al.").

In sampling in compressed sensing, the quality of a reconstructed image is enhanced by performing random sampling if an input image is unknown. Thus, in the case of performing an image reconstruction process using a plurality of frames, multiple sampling is changed for each frame, so as to realize random sampling in a time direction as well as a spatial direction and to enhance the quality of a reconstructed image. Hereinafter, a description will be given of increasing the quality of a reconstructed image by changing multiple sampling for each frame.

Figure 18A:
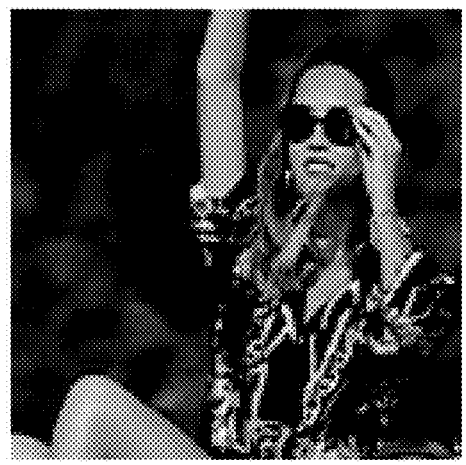
FIG. 18A is a diagram illustrating a reference image.
Figure 18B:
FIG. 18B is a diagram illustrating an image reconstructed using data of sixteen frames and an image reconstruction method according to J. Zhang, D. Zhao, C. Zhao, R. Xiong, S. Ma, and W. Gao, "Compressed Sensing Recovery via Collaborative Sparsity", Proc. of IEEE Data Compression Conference, pp. 287-296, 2012.
Figure 18C:
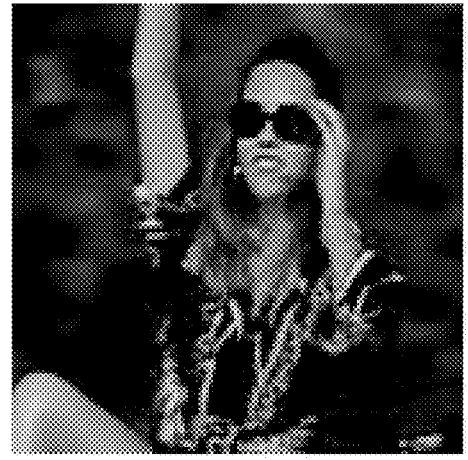
FIG. 18C is a diagram illustrating an image reconstructed through a process according to an embodiment.

FIGS. 18A to 18C illustrate a reference image, an image reconstructed using data of sixteen frames and the image reconstruction method described in "J. Zhang et al.", and an image reconstructed through the process according to this embodiment. FIG. 18A illustrates a correct image, FIG. 18B illustrates a reconstructed image in a case where multiple sampling which is fixed among all frames is performed, and FIG. 18C illustrates a reconstructed image in a case where multiple sampling which varies among frames is performed. Normally, if a multiple sampling process is performed, information about a captured image corresponding to a correct image is lost. However, a correct image on which a multiple sampling process has not been performed is illustrated as a correct image in FIG. 18A for evaluation.

As is understood from these figures, if multiple sampling varies among frames, the peak signal-to-noise ratio (PSNR) is increased by 3.5 dB, from 23.91 dB to 27.41 dB. In this way, in the image capturing apparatus 20 according to this embodiment, an artifact of a reconstructed image can be suppressed and image quality can be significantly enhanced by changing multiple sampling information for each frame.

As described above, according to this embodiment, multiple sampling information is changed for each frame, and an image reconstruction process is performed using a plurality of frames. Accordingly, the quality of a reconstructed image can be enhanced.

In the description given above, the multiple sampling unit 204 adds a plurality of pieces of pixel data, but of course gain may be applied to perform weighted addition. This is effective to overcome a situation in which addition of a plurality of pixels causes an increase in dynamic range of data and an increase in load of the ADC 205. For example, when multiple sampling illustrated in FIGS. 8A to 8H is performed, in the case of performing a normalization process to adjust the dynamic range of data after addition, a weight of ¼ may be applied as gain. In the case of applying gain to a multiple sampling process, information about the gain may be included in multiple sampling information.

The image capturing apparatus described in this specification is not necessarily implemented as an apparatus. For example, a multi-purpose processor which is a computer may execute a computer program recorded on a computer-readable recording medium, so as to perform the above-described operation of the image capturing apparatus. Such a computer program includes, for example, a group of instructions that causes the computer to execute the process realized by the flowchart illustrated in FIG. 4. The computer program is recorded on a recording medium, such as a compact disc read only memory (CD-ROM), and is circulated in the market as a product, or is transmitted via an electric communication line, such as the Internet.

Second Embodiment

Hereinafter, the configuration of a system according to a second embodiment will be described. In the following description of individual embodiments, the elements having a structure and function equivalent to those of the elements of the first embodiment described above are denoted by the same reference numerals, and the description thereof is appropriately omitted.

In a compression process according to this embodiment, in a multiple sampling process that is performed on some readout pixel groups, a sampling method (multiple sampling information) that is set varies among frames. In a multiple sampling process that is performed on some other readout pixel groups, the same multiple sampling information is set for all frames. That is, a multiple sampling process is performed using the same readout pixel groups even if the time changes.

Regarding a reconstruction process, a time average image of reconstructed images that have been generated in a certain period of time is generated, and a difference signal corresponding to the time average image is obtained from an output signal of an analog-to-digital converter using multiple sampling information. With use of the difference signal, an image is reconstructed using the technique of compressed sensing.

In an image capturing system according to an embodiment of the present disclosure, image capturing is performed for some readout pixel groups by changing multiple sampling information for each frame, and image capturing is performed for some other readout pixel groups without changing multiple sampling information.

As a result of changing multiple sampling information for each captured frame image, an artifact that depends on multiple sampling information can be changed for each reconstructed frame image. Accordingly, a high-quality time average image can be generated. A difference image signal with respect to a time average image, in which signal components correlated among frames are cancelled, has high sparsity compared to a general image signal. Thus, as a result of reconstructing an image using a difference signal and compressed sensing, a higher-quality reconstructed image can be obtained. Furthermore, a multiple sampling process enables the drive frequency of an ADC to be decreased, and thus lower power consumption, a higher SN ratio, and a reduced communication band can be realized.

On other hand, as a result of performing a multiple sampling process without changing multiple sampling information for each captured frame image, an image of lower resolution can be obtained without performing an image reconstruction process. Thus, a low-resolution image can be displayed in real time while hardly imposing a processing load.

As is understood from the description given above, in this embodiment, the process performed in the encoding apparatus 1 and the decoding apparatus 2 may be regarded as a main process. Thus, a detailed description will be given below mainly of the process performed in the encoding system including the encoding apparatus 1 and the decoding apparatus 2. Each of the embodiments given below will also be described by focusing on the encoding system. It is the same as in this embodiment that the encoding system is incorporated into an image capturing system like the one illustrated in FIG. 2.

In FIG. 2, the image capturing apparatus 20 and the decoding apparatus 2 are separated from each other, but the image capturing apparatus 20 may include the decoding apparatus 2. It is not always necessary to provide the encoding apparatus 1 and the decoding apparatus 2 in different apparatuses as long as an image can be compressed before A/D conversion and at least one of the above-described advantages can be obtained.

Figure 20:
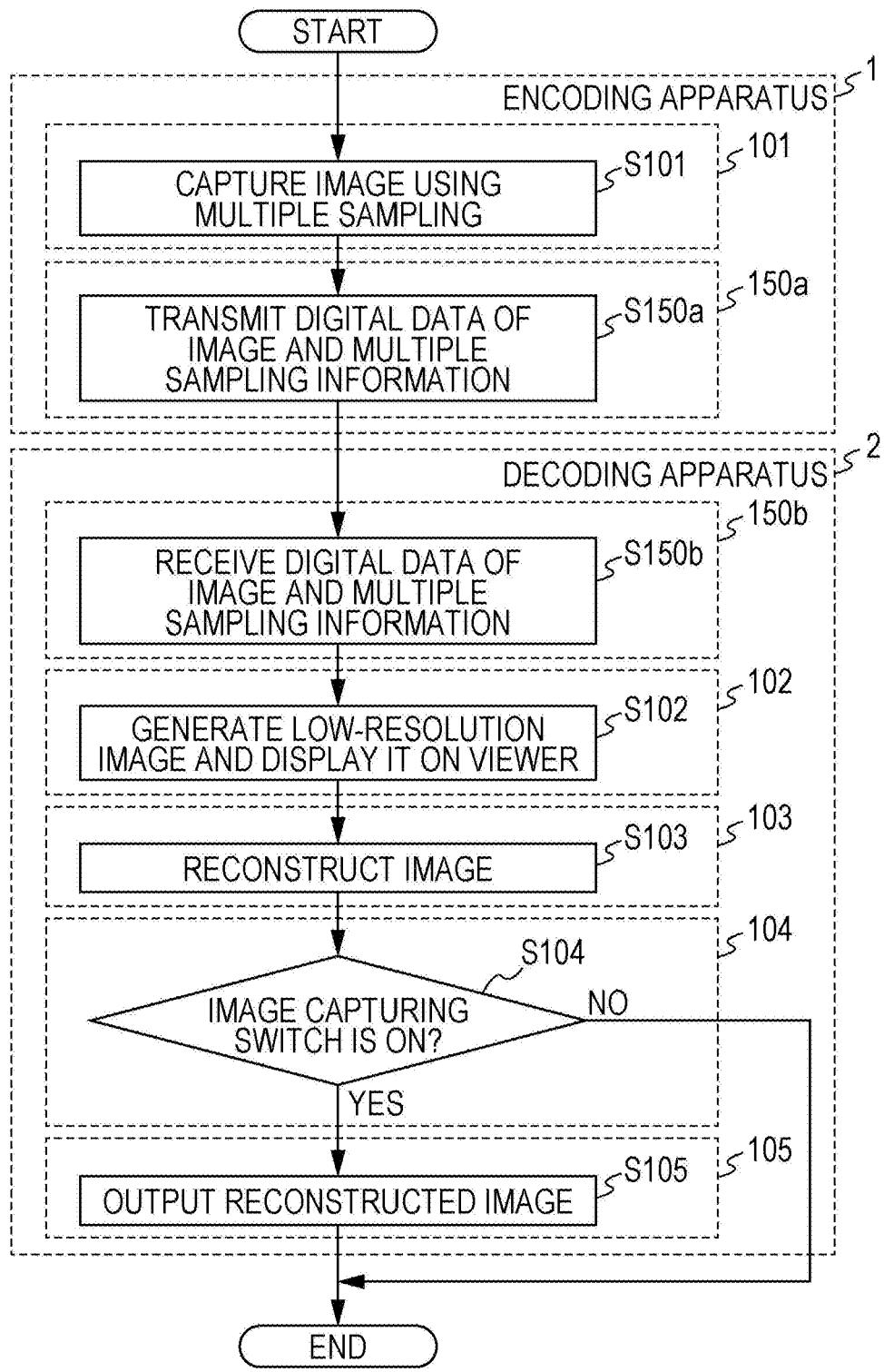
FIG. 20 is a flowchart illustrating the procedure of a main process performed in the encoding system according to the second embodiment.

FIG. 19 is a block diagram illustrating the configuration of an encoding system 100 according to this embodiment. FIG. 20 is a flowchart illustrating the procedure of a main process performed in the encoding system 100 according to this embodiment.

As described above, the encoding system 100 includes the encoding apparatus 1 and the decoding apparatus 2.

The encoding apparatus 1 includes the multiple sampling image capturing unit 101 and the transmission unit 150a.

The decoding apparatus 2 includes the reception unit 150b, a low-resolution image generation/display unit 102, the image reconstruction unit 103, a user interface unit 104, and the output unit 105. The decoding apparatus 2 according to this embodiment is configured by adding the low-resolution image generation/display unit 102 and the user interface unit 104 to the decoding apparatus 2 according to the first embodiment.

The operations of the individual elements of the encoding apparatus 1 and the decoding apparatus 2 will be described with reference to FIG. 20. The difference in the operations of the encoding apparatus 1 and the decoding apparatus 2 between the first embodiment and the second embodiment relates to the low-resolution image generation/display unit 102 and the user interface 104, which are additional elements. Specifically, the operations in steps S102 and S104 are added. In FIG. 20, step S103 is described in a simplified manner. Hereinafter, the operations in the added steps S102 and S104 will be described.

The low-resolution image generation/display unit 102 generates a low-resolution image using signals obtained from the multiple sampling image capturing unit 101, and displays the low-resolution image on a viewer that is separately provided and is not illustrated (step S102). For example, in a case where the entire encoding system 100 is mounted in the image capturing apparatus, the viewer is a liquid crystal display device or an electronic finder mounted on the image capturing apparatus. To adjust the angle of view, composition, brightness, focus, and so forth of a photographing scene, it is required to output an image in real time. Thus, as described below, the low-resolution image generation/display unit 102 outputs an image whose resolution is lower than that of a captured image in real time, without performing an image reconstruction process.

The user interface unit 104 determines whether or not a user has an intention of recording an image, and switches the process of the output unit 105 (step S104). Specifically, for example, it may be determined whether or not an image capturing switch is ON. As described below, the image capturing system 10 according to this embodiment performs image capturing in the background before the user starts image capturing, and generates a high-quality time average image. Thus, the image reconstruction unit 103 performs a reconstruction process even in a case where the user has not turned on the image capturing switch.

Figure 21:
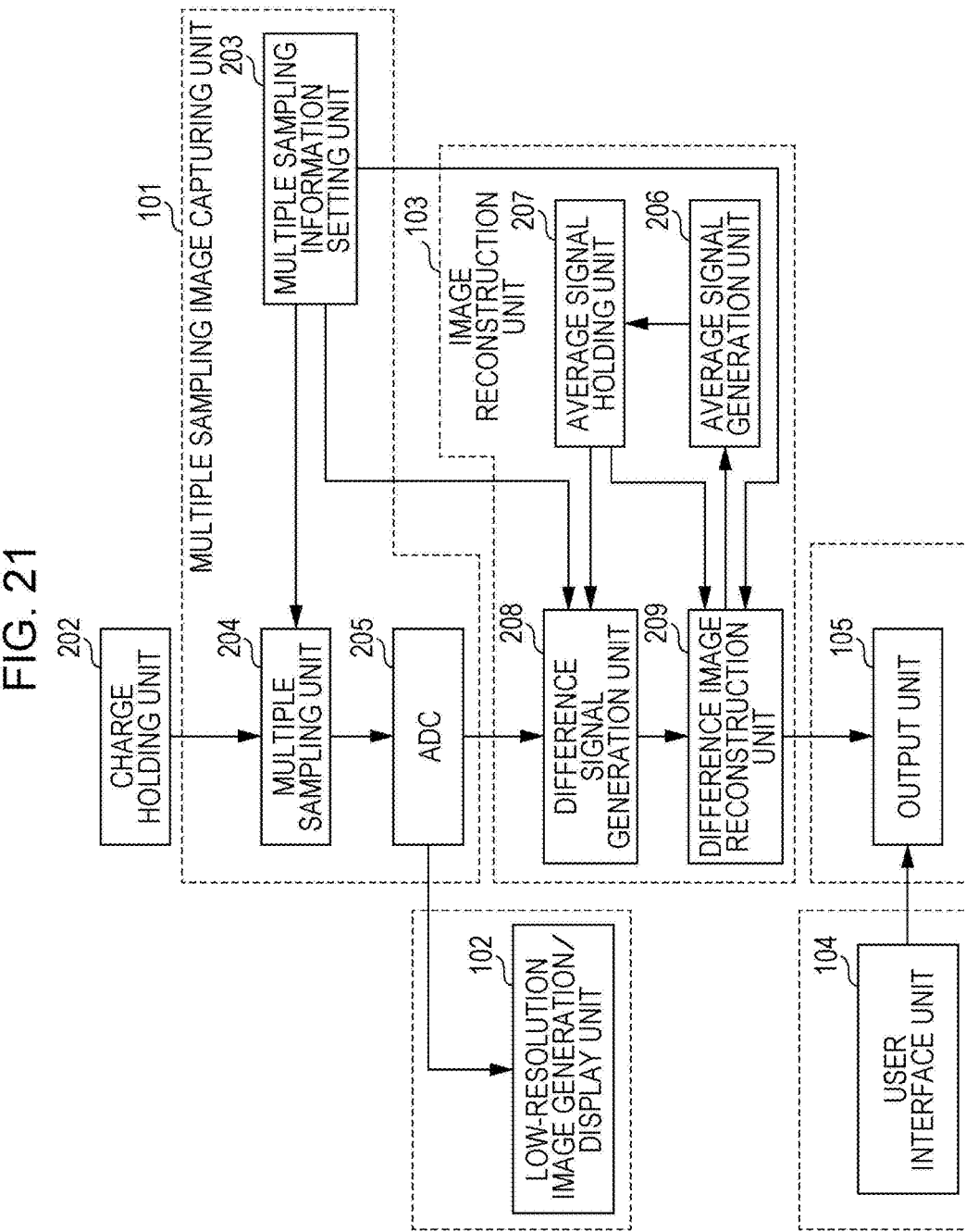
FIG. 21 is a block diagram illustrating the detailed configurations of the multiple sampling image capturing unit of an image capturing apparatus and the image reconstruction unit according to the second embodiment.
Figure 22:
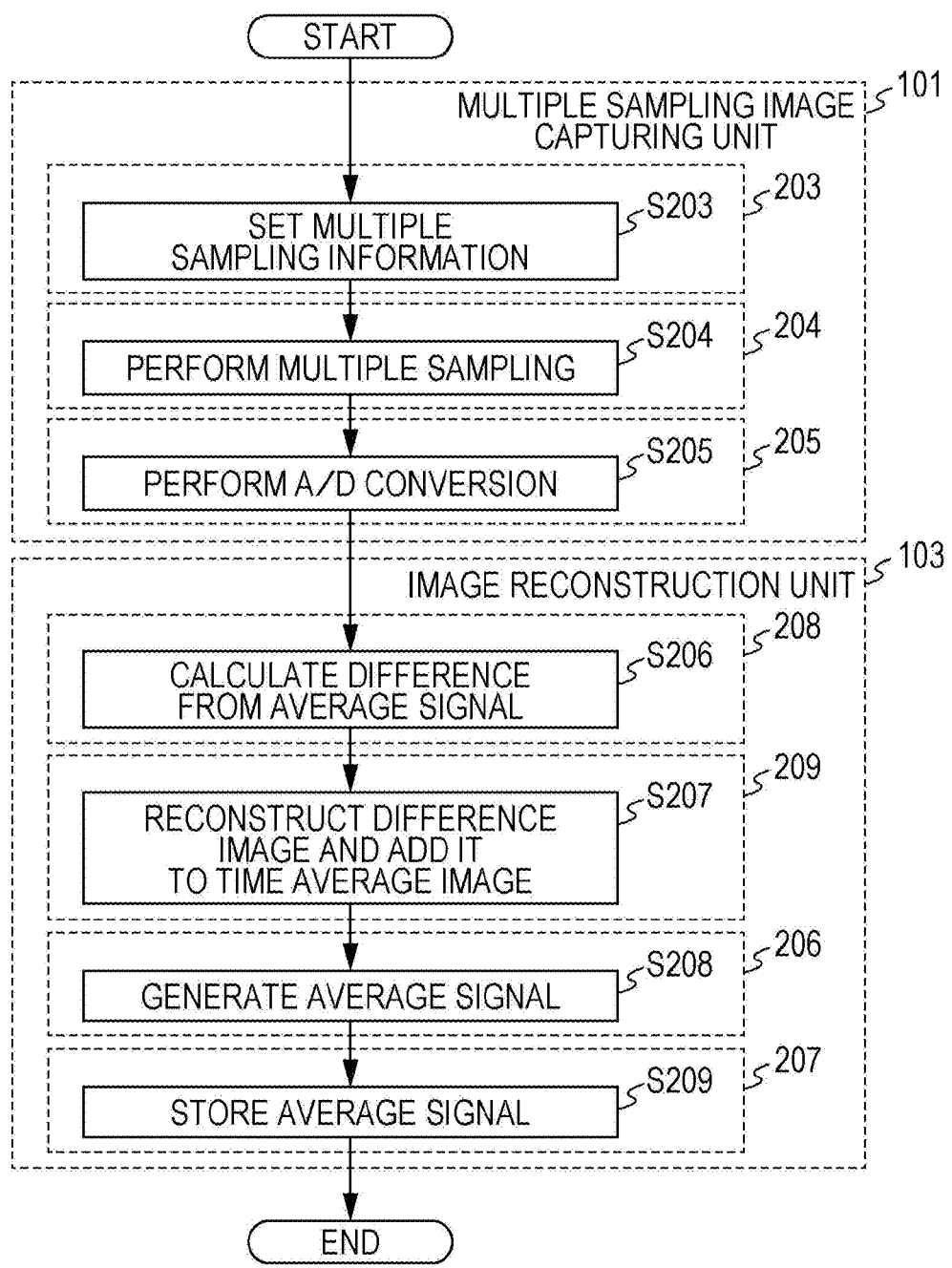
FIG. 22 is a flowchart illustrating the procedure of a process performed in the multiple sampling image capturing unit and the image reconstruction unit according to the second embodiment.

FIG. 21 is a block diagram illustrating the detailed configurations of the multiple sampling image capturing unit 101 and the image reconstruction unit 103. FIG. 22 is a flowchart illustrating the procedure of a process performed in the multiple sampling image capturing unit 101 and the image reconstruction unit 103 of the image capturing apparatus according to this embodiment. The differences from the configuration illustrated in FIG. 5 are that the low-resolution image generation/display unit 102 and the user interface unit 104 are added and that the details of the image reconstruction unit 103 are illustrated.

The image reconstruction unit 103 includes the average signal generation unit 206, an average signal holding unit 207, a difference signal generation unit 208, and a difference image reconstruction unit 209. The image reconstruction unit 103 corresponds to the image reconstruction circuit 15 illustrated in FIG. 1. The average signal generation unit 206, the difference signal generation unit 208, and the difference image reconstruction unit 209 are operation circuits constituted by, for example, an integrated circuit. The average signal holding unit 207 is a storage circuit such as a buffer. The integrated circuit and the buffer may be integrated together and is mounted as a digital signal processor (DSP) or the like.

Hereinafter, the individual elements of the multiple sampling image capturing unit 101 and the image reconstruction unit 103 will be described in detail. The description of the process that is the same as in the first embodiment is appropriately omitted.

First, the process performed in the multiple sampling image capturing unit 101 will be described in detail.

The multiple sampling information setting unit 203 sets multiple sampling information so that the pixels to be added vary each time and that a low-resolution image can be easily generated by an addition process in a multiple sampling process performed by the multiple sampling unit 204 (step S203). The multiple sampling information is information for specifying the details of the process performed by the multiple sampling unit 204, as described above in the first embodiment. That is, the multiple sampling information includes, regarding individual signal values of new output signals after a multiple sampling process, the positions of pixels sampled to be added in original charge signals, gain information about pixels representing how much gain is to be given to perform addition, and order information representing the order in which added output signals are to be transmitted. A specific example will be described below.

The multiple sampling unit 204 performs a multiple sampling process on charge signals of a plurality of pixels held by the charge holding unit 52 on the basis of the multiple sampling information set by the multiple sampling information setting unit 203, and generates and outputs new signals (step S204). At this time, as described below, the multiple sampling information setting unit 203 changes multiple sampling information for each frame, and thereby the quality of a reconstructed image can be enhanced.

Next, the multiple sampling process performed by the multiple sampling unit 204 will be described in detail with reference to FIGS. 23A to 32B. In this specification, a description will be given of a process of outputting eight signals for 4×4=16 pixels as an example, to simplify the description. The manner of assigning pixel numbers is the same as that described above with reference to FIG. 7. FIGS. 23A to 23H illustrate readout pixel groups 302 to 309 to which numbers 1 to 8 are assigned, respectively. For the convenience of description, each reference numeral indicates only one of the pixels included in a readout pixel group. The same applies to the following. FIGS. 23A to 26H are schematic diagrams describing a multiple sampling process.

FIGS. 23A to 23H illustrate the pixels from which charge signals are obtained to be added to generate eight output signals at time t1. That is, the pixels to which numbers are assigned in each of FIGS. 23A to 23H are pixels used for a multiple sampling process.

Likewise, FIGS. 24A to 24H illustrate readout pixel groups 310 to 317 in eight output signals at time t2, FIGS. 25A to 25H illustrate readout pixel groups 318 to 325 in eight output signals at time t3, and FIGS. 26A to 26H illustrate readout pixel groups 326 to 333 in eight output signals at time t4.

Now, a description will be given of a main difference between the multiple sampling process according to this embodiment and the multiple sampling process according to the first embodiment.

As is understood from FIGS. 23A to 23D and 24A to 24D, the pixel groups used for a multiple sampling process may be the same even if the frame changes. On the other hand, according to FIGS. 8A to 8D and 9A to 9D in the first embodiment, the pixel groups used for a multiple sampling process are different when the frame time changes. This means that pixel groups change when the frame changes in the multiple sampling process according to the first embodiment, whereas pixel groups do not necessarily change in the multiple sampling process according to this embodiment. Note that, as is understood from FIGS. 23E to 23H and 24E to 24H, the pixel groups used for a multiple sampling process may be changed when the frame changes in this embodiment. Hereinafter, a detailed description will be given.

Figure 23D:
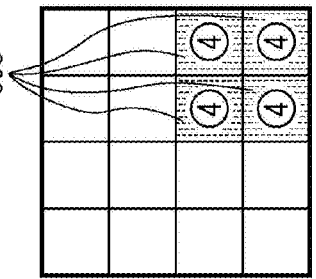
FIGS. 23A to 23H are schematic diagrams describing a multiple sampling process performed at time t1.
Figure 23C:
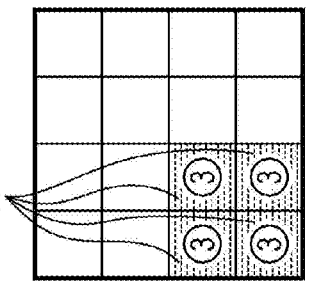
Figure 23B:
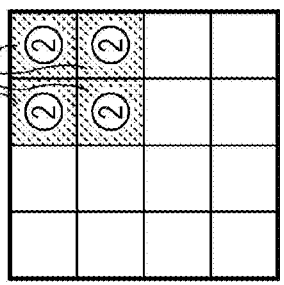
Figure 23A:
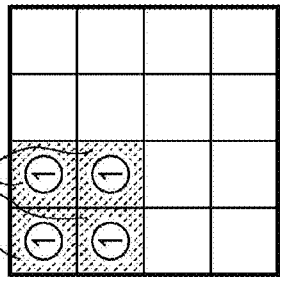
Figure 23H:
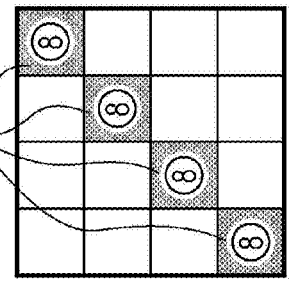
Figure 23G:
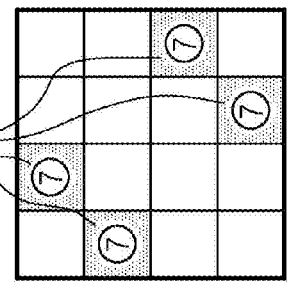
Figure 23F:
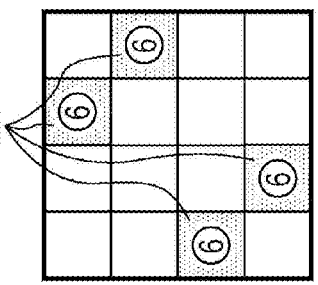
Figure 23E:
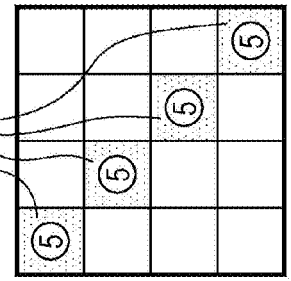
Figure 24D:
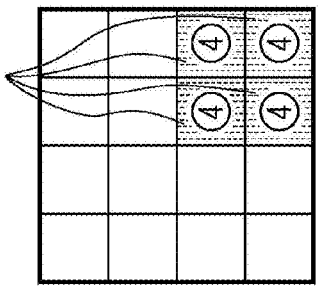
FIGS. 24A to 24H are schematic diagrams describing a multiple sampling process performed at time t2.
Figure 24C:
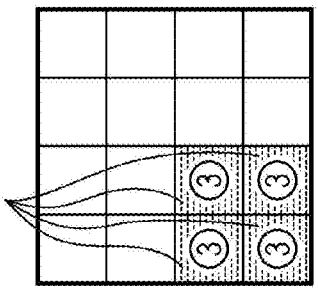
Figure 24B:
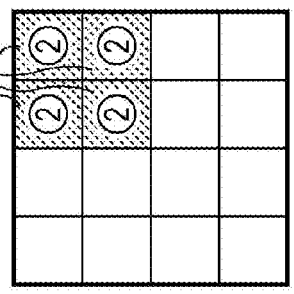
Figure 24A:
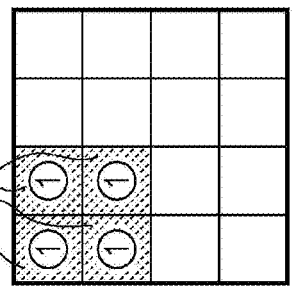
Figure 24H:
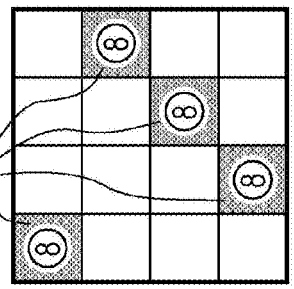
Figure 24G:
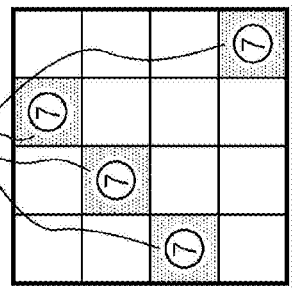
Figure 24F:
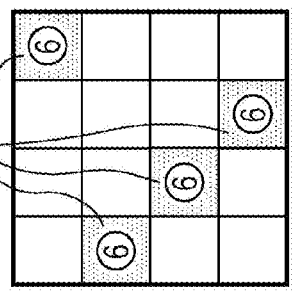
Figure 24E:
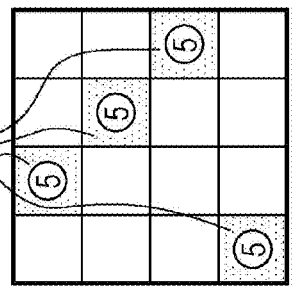
Figure 26D:
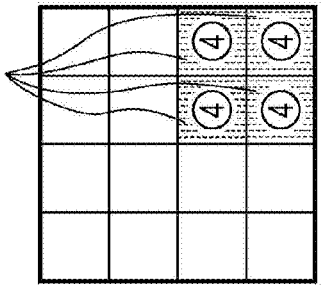
FIGS. 26A to 26H are schematic diagrams describing a multiple sampling process performed at time t4.
Figure 26C:
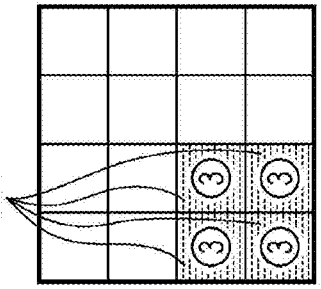
Figure 26B:
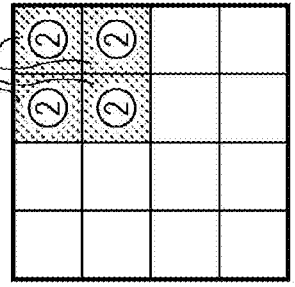
Figure 26A:
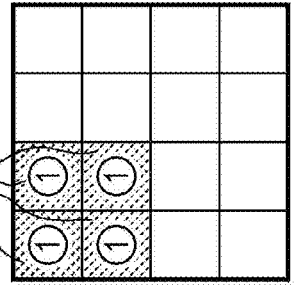
Figure 26H:
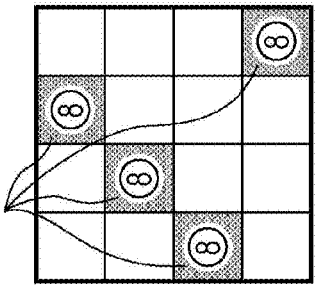
Figure 26G:
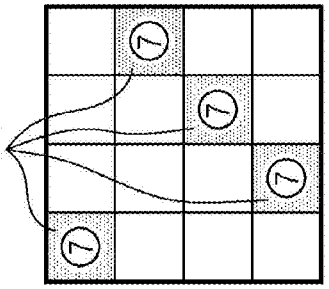
Figure 26F:
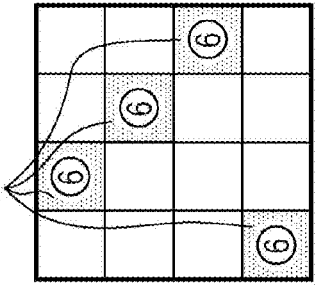
Figure 26E:
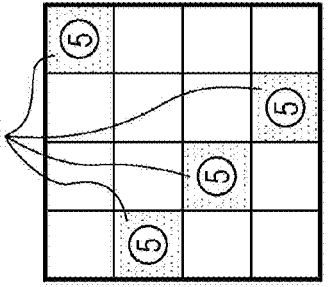
Figure 29A:
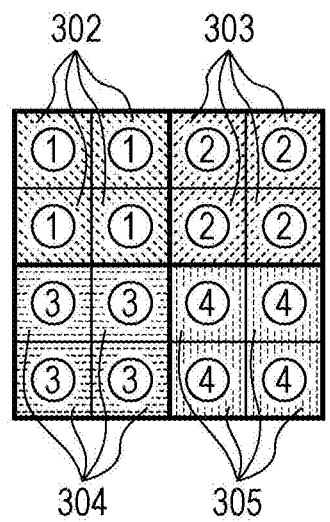
FIGS. 29A and 29B are schematic diagrams describing two features of a multiple sampling process.
Figure 29B:
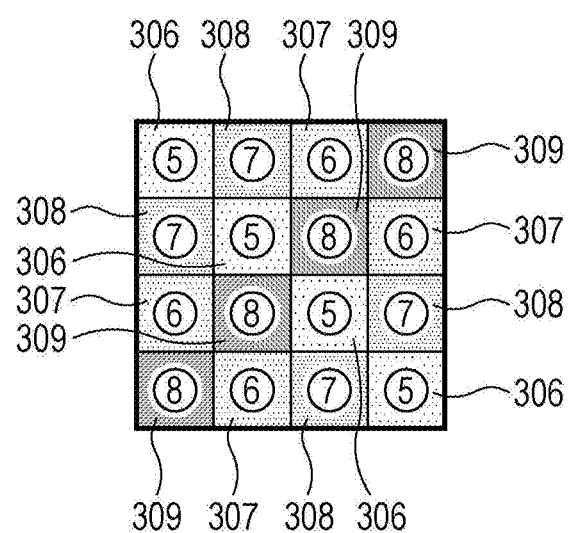
Figure 30A:
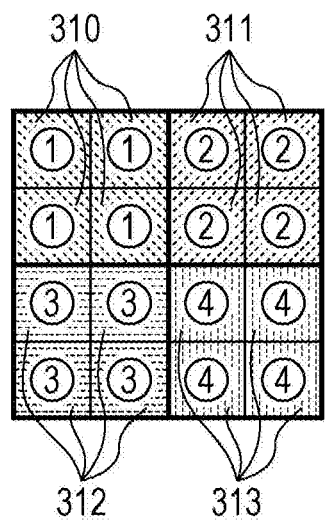
FIGS. 30A and 30B are schematic diagrams describing the two features of the multiple sampling process.
Figure 30B:
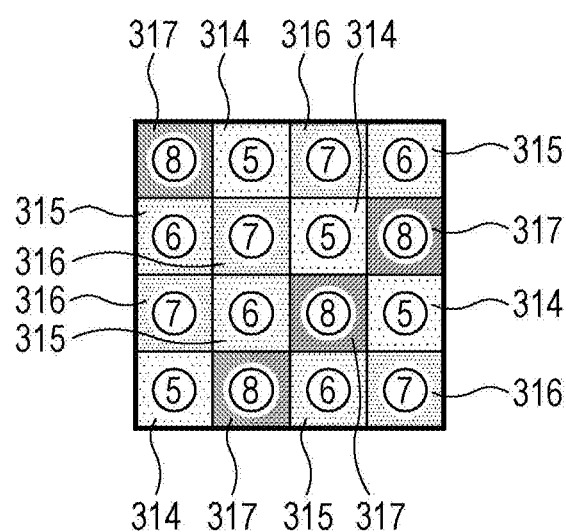
Figure 31A:
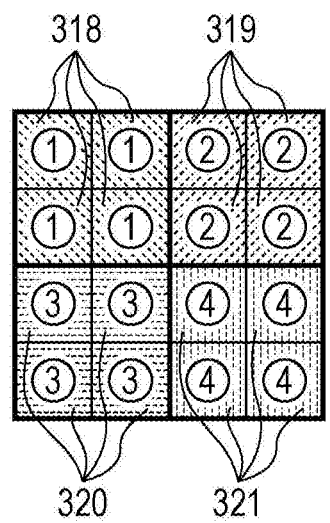
FIGS. 31A and 31B are schematic diagrams describing the two features of the multiple sampling process.
Figure 31B:
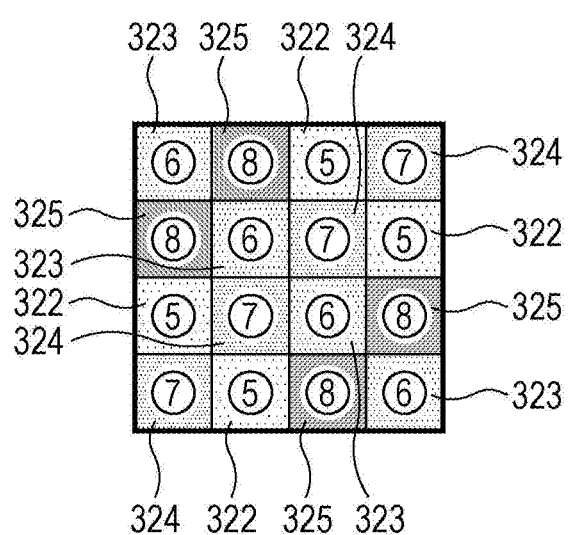
Figure 32A:
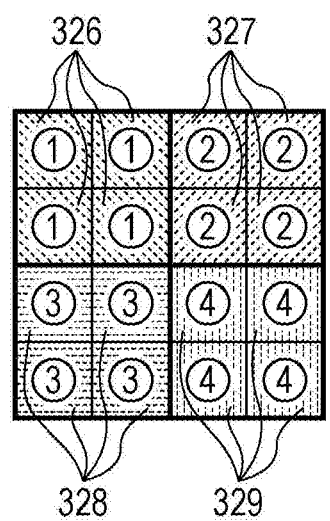
FIGS. 32A and 32B are schematic diagrams describing the two features of the multiple sampling process.
Figure 32B:
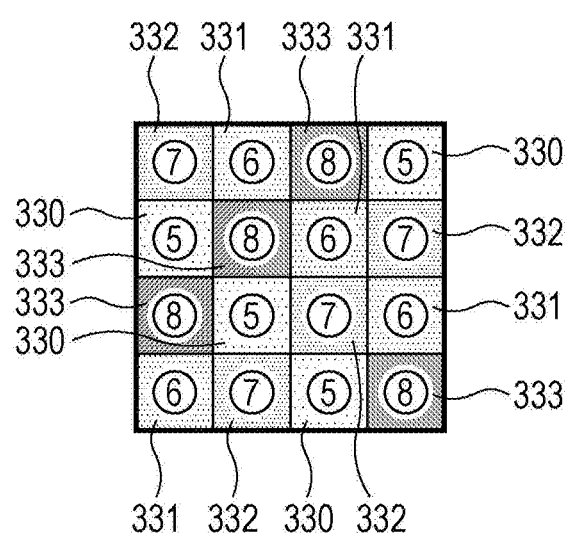

In FIG. 23A, charge signals of pixel numbers 1, 2, 5, and 6 are read out, the charge signals of the four pixels are added, and thereby a first output signal at time t1 is generated. Likewise, in FIG. 23B, charge signals of pixel numbers 3, 4, 7, and 8 are read out, the charge signals of the four pixels are added, and thereby a second output signal at time t1 is generated. In FIG. 23C, charge signals of pixel numbers 9, 10, 13, and 14 are read out, the charge signals of the four pixels are added, and thereby a third output signal at time t1 is generated. In FIG. 23D, charge signals of pixel numbers 11, 12, 15, and 16 are read out, the charge signals of the four pixels are added, and thereby a fourth output signal at time t1 is generated. Likewise, in FIGS. 23E to 23F, a fifth output signal at time t1 is generated from charge signals of pixel numbers 1, 6, 11, and 16, a sixth output signal at time t1 is generated from charge signals of pixel numbers 3, 8, 9, and 14, a seventh output signal at time t1 is generated from charge signals of pixel numbers 2, 5, 12, and 15, and an eighth output signal at time t1 is generated from charge signals of pixel numbers 4, 7, 10, and 13.

In this way, charge signals of 4×4=16 pixels are compressed to eight output signals. Accordingly, the operation speed of the ADC 205, which will be described below, can be reduced. Thus, an image can be reconstructed while realizing lower power consumption, a higher SN ratio, and a reduced communication band.

The above-described multiple sampling information is represented as data that has been encoded in the order of the pixel numbers illustrated in FIG. 7, with the pixel sampled for addition being "1", and the pixel not sampled being "0". The details are as follows.

First output signal: "1100 1100 0000 0000"
Second output signal: "0011 0011 0000 0000"
Third output signal: "0000 0000 1100 1100"
Fourth output signal: "0000 0000 0011 0011"
Fifth output signal: "1000 0100 0010 0001"
Sixth output signal: "0010 0001 1000 0100"
Seventh output signal: "0100 1000 0001 0010"
Eighth output signal: "0001 0010 0100 1000"

As a result of combining these signals, the following multiple sampling information at time t1 is obtained.

"1100 1100 0000 0000 0011 0011 0000 0000 0000 0000 1100 1100 0000 0000 0011 0011 1000 0100 0010 0001 0010 0001 1000 0100 0100 1000 0001 0010 0001 0010 0100 1000"

In this specification, the above number sequence is called "encoded data of multiple sampling information" or "encoded data" for short. The form of the multiple sampling information is not limited to that described here. Any form may be used as long as the positions of the pixels sampled for addition are identified.

Likewise, the encoded data at time t2 illustrated in FIGS. 24A to 24H is as follows.

"1100 1100 0000 0000 0011 0011 0000 0000 0000 0000 1100 1100 0000 0000 0011 0011 0100 0010 0001 1000 0001 1000 0100 0010 0010 0001 1000 0100 1000 0100 0010 0001 0010 0100"

The encoded data at time t3 illustrated in FIGS. 25A to 25H is as follows.

"1100 1100 0000 0000 0011 0011 0000 0000 0000 0000 1100 1100 0000 0000 0011 0011 0010 0001 1000 0100 0100 1000 0001 0010 0001 0010 0100 1000 1000 0100 0010 0001 0010"

The encoded data at time t4 illustrated in FIGS. 26A to 26H is as follows.

"1100 1100 0000 0000 0011 0011 0000 0000 0000 0000 1100 1100 0000 0000 0011 0011 0001 1000 0100 0010 0010 0100 1000 0001"

FIGS. 27 and 28 are schematic diagrams illustrating examples of a multiple sampling information table, which is an example of a method for representing such encoded data. The pieces of encoded data indicated by table numbers 1, 2, 3, and 4 illustrated in these figures correspond to the multiple sampling processes illustrated in FIGS. 23A to 23H, FIGS. 24A to 24H, FIGS. 25A to 25H, and FIGS. 26A and 26H, respectively.

In this way, as a result of reading out one pixel a plurality of times and performing an addition process a plurality of times, the dynamic range of output signals can be increased, and thus noise can be reduced. Such a multiple sampling process is described in, for example, "Y. Oike and A. E. Gamal".

In the encoding apparatus 1 according to this embodiment, the following two features are given to a multiple sampling process.

(1) The multiple sampling process related to first to fourth output signals is the same regardless of time. Pixels close to one another are simultaneously sampled so that the readout pixel group becomes a low-resolution image of a reconstructed image.

(2) The multiple sampling process related to fifth to eighth output signals varies each time, in other words, among frames, but the sampling frequency of the pixels included in the readout pixel group is the same.

FIGS. 29A to 32B are schematic diagrams describing the two features of a multiple sampling process. In these figures, the same elements as those in FIGS. 23A to 26H are denoted by the same reference numerals, and the description thereof is omitted. In FIGS. 29A to 32B, FIGS. 29A, 30A, 31A, and 32A illustrate first to fourth readout pixel groups that are read out in the multiple sampling process at time t1, time t2, time t3, and time t4, and FIGS. 29B, 30B, 31B, and 32B illustrate fifth to eighth readout pixel groups that are read out in the multiple sampling processes at time t1, time t2, time t3, and time t4.

Regarding individual output signals based on the first to fourth readout pixel groups, 4×4 pixels are reduced to be equivalent to 2×2 pixels in the multiple sampling process. Furthermore, the sampling pixels are the same at time t1, time t2, time t3, and time t4. Thus, the low-resolution image generation/display unit 102 displays a low-resolution image on a viewer without performing an image reconstruction process on the first to fourth output signals, and accordingly the low-resolution image can be displayed in real time by hardly imposing a processing load.

On the other hand, regarding individual output signals based on the fifth to eighth readout pixels groups, the positions of the sampling pixels constantly change at time t1, time t2, time t3, and time t4, but all the 4×4 pixels are sampled once without fail, and the sampling frequency is the same. In this way, as a result of changing the sampling pixels over time, the quality of a time average image generated by the average signal generation unit 206 can be enhanced, and also the quality of an image reconstructed by the image reconstruction unit 103 can be enhanced, as described below.

Of course, the multiple sampling unit 204 may select the positions of pixels to be sampled as randomly and/or independently as possible from the spatial and/or temporal viewpoint, on the basis of a plurality of types of multiple sampling information. In this way, degradation of image information caused by a multiple sampling process can be prevented, and the quality of a reconstructed image can be enhanced (see, for example, pp. 43-44 of "Toshiyuki Tanaka"). Such a random multiple sampling process is realized by setting encoded data that has been obtained through random sampling in advance as illustrated in FIGS. 27 and 28. In this case, the multiple sampling information setting unit 203 may change the table number to be used for each frame.

Referring back to FIGS. 21 and 22, the process performed in the decoding apparatus 2 of the encoding system 100 will be described. A main process of the decoding apparatus 2 is performed by the image reconstruction unit 103.

The difference signal generation unit 208 calculates a difference signal representing the difference between a digital signal output from the ADC 205 and a time average image of reconstructed images held by the average signal holding unit 207 described below (step S206).

The digital signal output from the ADC 205 corresponds to an output signal of the multiple sampling unit 204, and is not an image signal. On the other hand, the time average image held by the average signal holding unit 207 is a reconstructed image signal. Thus, the difference between both of the signals cannot be calculated by performing a difference process. Thus, the difference signal generation unit 208 performs a multiple sampling process on the time average image using multiple sampling information and then performs a difference process. This process will be described in detail.

First, for the convenience of description, a captured image and a multiple sampling output signal are expressed by vectors. In a case where a captured image vector obtained by arranging pixel values of a captured image in the order of the pixel numbers illustrated in FIG. 7 is represented by x, and an output signal vector obtained by arranging first to eighth multiple sampling output signals is represented by y, the following relational expression (1) is obtained.

$$y = S \cdot x \quad (1)$$

A matrix S is a sampling matrix, and is obtained by expressing as a matrix the multiple sampling information set by the multiple sampling information setting unit 203. In a case where the data indicated by the table number 1 illustrated in FIG. 27 is used as multiple sampling information, the sampling matrix S is expressed as follows.

$$S = \begin{bmatrix} 1 & 1 & 0 & 0 & 1 & 1 & 0 & 0 & 0 & 0 & 0 & 0 & 0 & 0 & 0 & 0 \\ 0 & 0 & 1 & 1 & 0 & 0 & 1 & 1 & 0 & 0 & 0 & 0 & 0 & 0 & 0 & 0 \\ 0 & 0 & 0 & 0 & 0 & 0 & 0 & 1 & 1 & 0 & 0 & 1 & 1 & 0 & 0 \\ 0 & 0 & 0 & 0 & 0 & 0 & 0 & 0 & 1 & 1 & 0 & 0 & 1 & 1 \\ 1 & 0 & 0 & 0 & 0 & 1 & 0 & 0 & 0 & 1 & 0 & 0 & 0 & 0 & 1 \\ 0 & 0 & 1 & 0 & 0 & 0 & 0 & 1 & 1 & 0 & 0 & 0 & 0 & 1 & 0 & 0 \\ 0 & 1 & 0 & 0 & 1 & 0 & 0 & 0 & 0 & 0 & 1 & 0 & 0 & 0 & 1 & 0 \\ 0 & 0 & 0 & 1 & 0 & 0 & 1 & 0 & 0 & 1 & 0 & 0 & 1 & 0 & 0 & 0 \end{bmatrix} \quad (2)$$

From expression (1), a time average signal ya corresponding to the output signal of the multiple sampling unit 204 is calculated with the following expression (3) using a time average image xa held by the average signal holding unit 207.

$$ya = S \cdot x.a \quad (3)$$

With use of expression (3), the difference signal generation unit 208 is capable of calculating a difference signal (y−ya) representing the difference between the signal y subjected to a multiple sampling process (expression (1)) and the time average signal ya (expression (3)).

The average signal holding unit 207 may hold a digitalized time average signal subjected to a multiple sampling process using expression (3). In this case, the difference between the digital signal output from the ADC 205 and the time average signal can be easily calculated.

The difference image reconstruction unit 209 reconstructs, using the difference signal generated by the difference signal generation unit 208 and the multiple sampling information set by the multiple sampling information setting unit 203, an image corresponding to the difference signal (a difference image). Further, the difference image reconstruction unit 209 adds the reconstructed difference image and the time average image held by the average signal holding unit 207, and thereby generates a reconstructed image (step S207). This reconstruction process may be performed using a method according to the related art, such as an improved iterative curvelet thresholding method that is widely used in compressed sensing (see, for example, "J. Ma"), an affine-scaling method (see, for example, Toshihide Ibaraki and Masao Fukushima, "Jouhou Suugaku Kouza Vol. 14 (15 volumes in total), Saitekika no Shuhou", Kyoritsu Shuppan Co., Ltd., first impression of the first edition issued on Jul. 20, 1993 (pp. 159-164)), or an alternating direction method of multipliers (see, for example, M. V. Afonso, J. M. Bioucas-Dias and M. A. T. Figueiredo, "Fast Image Recovery Using Variable Splitting and Constrained Optimization", IEEE Transactions on Image Processing, Vol. 19, No. 9, pp. 2345-2356, 2010).

In compressed sensing, the quality of a reconstructed image is enhanced as the sparsity of a coefficient vector of an input image increases when the input image is projected to a certain space. That is, it is important for enhancing the quality of a reconstructed image to use the space in which an input image can be sparsely expressed. Hereinafter, a description will be given that sparsity is increased by using a difference image, which is a difference signal representing a difference from a time average image, as an input image.

Figure 33A:
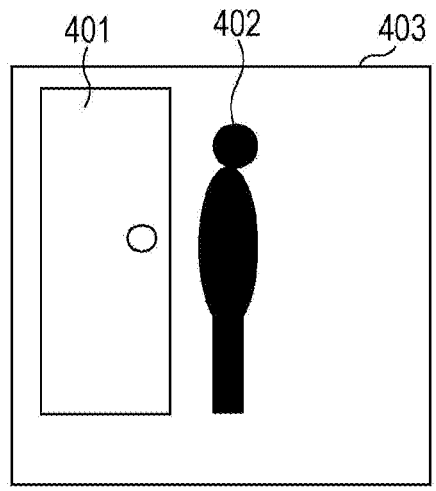
FIGS. 33A to 33D are schematic diagrams describing a reconstruction process using a difference image.
Figure 33B:
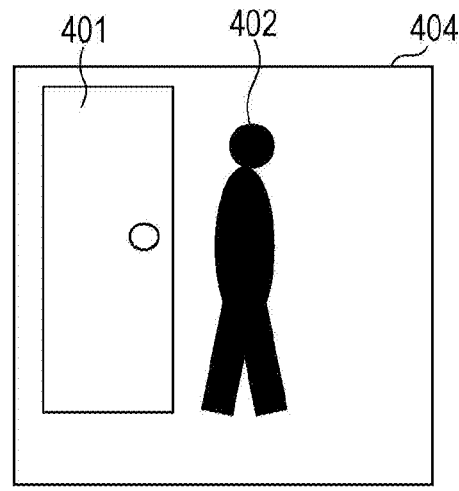

FIGS. 33A to 33D are schematic diagrams describing a reconstruction process using a difference image. FIG. 33A illustrates an image 403, which is obtained by capturing an image of a person (motion region) who is moving in front of a background 401 at time t1. FIG. 33B illustrates an image 404, which is obtained by capturing an image of the same scene as in FIG. 33A at time t2.

Figure 33C:
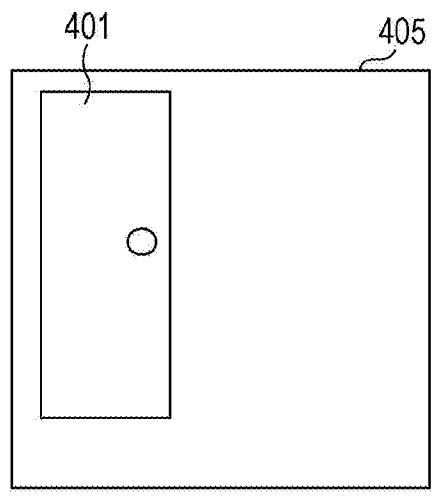

FIG. 33C illustrates a time average image 405, which is calculated using a plurality of images captured in the above-described manner. Note that the time average image 405 illustrated in FIG. 33C is not an average image that is obtained from only the two images illustrated in FIGS. 33A and 33B, but is an average image obtained from the two images and other images of the person (motion region) 402 who continues moving. The background 401 does not dependent on time and is captured at the same position of the image, and is thus located at the same position also in the time average image. On the other hand, the position of the motion region 402 changes at each time, and thus the motion region 402 does not exist in the time average image. Therefore, an image in which the motion region 402 does not exist and only the background 401 exists can be generated by generating a time average image.

Figure 33D:
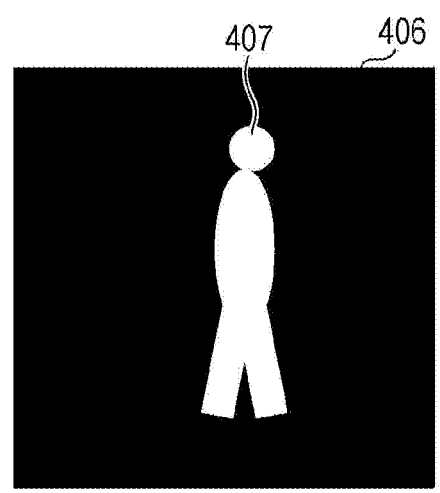

FIG. 33D illustrates a difference image 406 representing the difference between the image 404 captured at time t2 and the time average image 405. In FIG. 33D, a white region 407 is a region in which a difference value exists. In FIG. 33D, a leader line for reference numeral 407 is white, which is for convenience of illustration.

As described above, the quality of a reconstructed image based on compressed sensing greatly depends on the sparsity of the image. Thus, image reconstruction based on compressed sensing is not suitable for reconstructing an image having a fine texture of a small doll, a patterned carpet, or the like. On the other hand, in a case where a time average image and the difference image thereof are used, such a fine texture for which it is difficult to enhance the image quality is included in a background in many cases, and is not included in the difference image. Accordingly, the sparsity of the difference image is high. Also, from the viewpoint that signal components correlated among frames are cancelled, the sparsity of the difference image is high. Therefore, if a high-quality time average image can be obtained, a high-quality reconstructed image can be obtained by performing image reconstruction on only a difference image on the basis of compressed sensing.

However, it is necessary to generate a high-quality time average image in order to enhance image quality in the above-described manner. The time average image is generated by performing a time average process on reconstructed images. Thus, if the quality of the reconstructed images is low, the quality of the time average image may also be low.

Accordingly, the multiple sampling information setting unit 203 of the image capturing apparatus according to this embodiment changes multiple sampling information for each frame. With this process, the quality of a time average image can be enhanced even if the quality of a reconstructed image is low. Hereinafter, this will be described by dividing an input image into a motion region and a background.

First, a motion region will be described. As described above, a motion region does not exist in a time average image. Thus, the quality of the time average image does not affect the quality of the motion region, and strongly depends on only a background region.

Next, a background region will be described. A reconstructed image of a background region is estimated to be the same over a plurality of frames. An artifact that causes degradation of the quality of a reconstructed image greatly affect multiple sampling information used in a multiple sampling process. That is, in a case where a multiple sampling process is performed on a background region over a plurality of frames while fixing multiple sampling information, a reconstructed image has an artifact similar to that of reconstructed images of individual frames. On the other hand, in a case where multiple sampling information is changed for each frame, reconstructed images of individual frames have different artifacts.

Figure 34:
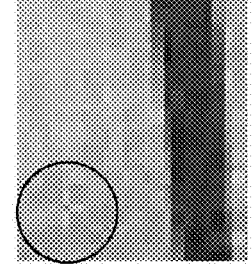
FIG. 34 is a schematic diagram illustrating reconstructed images and their time average images in a case where multiple sampling information is fixed for each frame and in a case where multiple sampling information is changed for each frame.

FIG. 34 is a schematic diagram illustrating reconstructed images and their time average images in a case where multiple sampling information is fixed for each frame and a case where multiple sampling information is changed for each frame. The inventors of the present application performed a multiple sampling process on a scene composed of ten frames, frames 0 to 9, and then reconstructed images. Also, the inventors obtained a time average image of the ten reconstructed images. FIG. 34 illustrates, as an example, reconstructed images of frames 0, 4, and 9. The circles are given for convenience in order to indicate the regions on which attention is to be focused in the following description, and are not included in the reconstructed images.

In FIG. 34, the top row shows a result obtained by performing a multiple sampling process on the ten frames by fixing multiple sampling information. The middle row shows a result obtained by performing a multiple sampling process by changing multiple sampling information for each frame in accordance with the multiple sampling information setting unit 203 according to this embodiment. The bottom row shows correct images. In the bottom row of FIG. 34, known images that are not subjected to a multiple sampling process are shown as correct images for evaluation.

In the result of the process performed using the same multiple sampling information shown in the top row, a similar artifact exist in all the frames. Thus, a similar artifact remains in the time average image. For example, in the region surrounded by a circle at the upper left of a reconstructed image, a T-shaped artifact exists in all the frames, and also a similar artifact remains in the time average image. On the other hand, in the result of the process performed by changing multiple sampling information for each frame shown in the middle row (the result of the process performed in the image capturing apparatus according to this embodiment), an artifact varies among the frames. For example, in the reconstructed image of frame 0, a T-shaped artifact similar to that in the processing result shown in the top row exists, whereas such an artifact does not exist in the reconstructed images of frame 4 and frame 9. Thus, in the time average image, the artifacts existing in the individual reconstructed images are averaged to be reduced, and only the background that exists in the original scene exists. As a result, it has been determined that the image quality is significantly enhanced.

Figure 35:
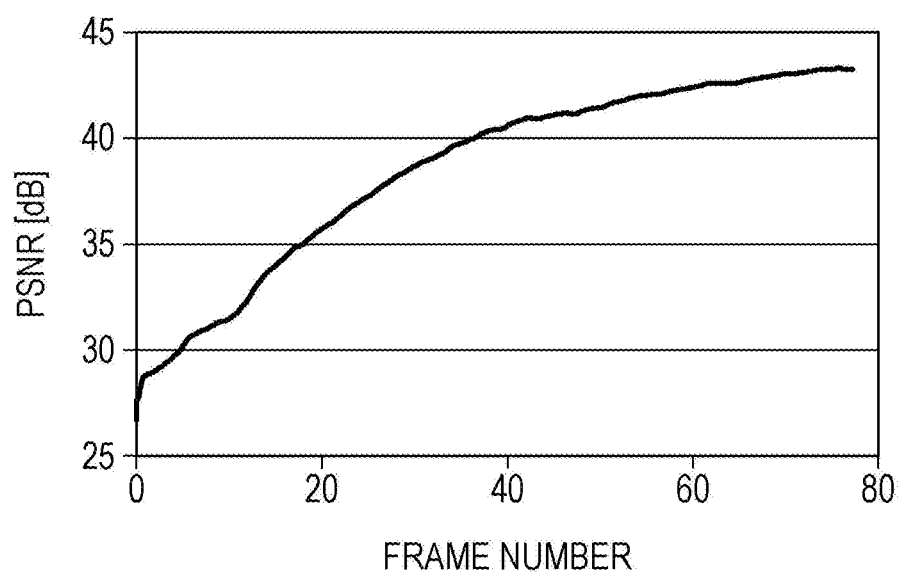
FIG. 35 is a schematic diagram illustrating the quality of reconstructed images using a time average image.

FIG. 35 schematically illustrates the quality of reconstructed images using a time average image obtained in the above-described manner. In this figure, the horizontal axis represents the frame number, and the vertical axis represents the PSNR of a reconstructed image and a correct image. As the frame to be processed proceeds, the quality of the reconstructed image is significantly enhanced. In this way, in the image capturing apparatus according to this embodiment, the occurrence of an artifact in a reconstructed image can be suppressed by changing multiple sampling information for each frame, and thus the image quality can be significantly enhanced.

As illustrated in FIG. 35, to enhance the quality of a time average image and a reconstructed image, it is important to process a plurality of frames in advance and generate a high-quality time average image. Thus, in the image capturing apparatus according to this embodiment, as described in step S104 in FIG. 20, image capturing is performed even in a state where an image capturing switch is off, and a process of generating a time average image is performed. Accordingly, a high-quality image can be reconstructed quickly.

Referring back to FIGS. 21 and 22, a description will be given of the process performed in the decoding apparatus 2 of the encoding system 100.

The average signal generation unit 206 generates a time average image of the reconstructed images generated by the difference image reconstruction unit 209 (step S208). This is realized by, for example, using the following IIR filter.

$$A(k+1) = (1-M) \cdot A(k) + M \cdot I(k). \qquad (4)$$

Note that A(k) represents a time average image at frame k, I(k) represents a reconstructed image at frame k, and M represents a positive constant in which $0 \leq M \leq 1$ is satisfied.

Of course, the average signal generation unit 206 may use an FIR filter expressed by the following expression (5) using a plurality of frames, instead of the IIR filter.

$$A(k+1) = \frac{1}{N}\sum_{n=0}^{N-1} I(k-n). \quad (5)$$

Note that N represents the number of frames used for a time average process and is a positive constant.

Of course, the average signal generation unit 206 may enhance image quality by using a noise suppression method according to the related art (see, for example, C. Tomasi and R. Manduchi, "Bilateral filtering for gray and color images", Proc. of IEEE International Conference on Computer Vision, pp. 839-846, 1998). With use of the noise suppression method, the quality of a time average image can be enhanced.

The average signal holding unit 207 holds the time average signal generated by the average signal generation unit 206 (step S209), and transmits the time average signal to the difference signal generation unit 208. This is realized by an image frame memory for one frame.

As described above, according to this embodiment, a time average image of reconstructed images is generated by changing multiple sampling information for each frame, and an image reconstruction process is performed using a difference signal representing a difference from the time average image. Accordingly, the quality of a reconstructed image can be enhanced.

In the description given above, the multiple sampling unit 204 adds a plurality of pieces of pixel data, but of course gain may be applied to perform weighted addition. This is effective to overcome a situation in which addition of a plurality of pixels causes an increase in dynamic range of data and an increase in load of the ADC 205. For example, when multiple sampling illustrated in FIGS. 23A to 23H is performed, in the case of performing a normalization process to adjust the dynamic range of data after addition, a weight of ¼ may be applied as gain. In the case of applying gain to a multiple sampling process, information about the gain may be included in multiple sampling information.

The low-resolution image generation/display unit 102 may display, in the image reconstruction unit 103, a result of a high-speed image reconstruction process on the viewer. This is realized by, for example, reconstructing only part of a captured image. Because only part of an image is processed, a reconstructed image can be quickly generated compared to the case of processing the entire image. Accordingly, an image with a small delay can be displayed for a user. The region of the image to be generated and displayed may be selected by the user through the user interface unit 104, or the center of a screen may be selected. The size of the reconstructed image may be set with reference to the resolution of the viewer.

As the image reconstruction method used by the image reconstruction unit 103, a method according to the related art, such as a matching pursuits method or a matching pursuits denoising method, may be used (see, for example, Makoto Nakashizuka, "Sparse Signal Representations and its Applications to Image Processing", the Journal of the Institute of Image Information and Television Engineers, Vol. 65, No. 10, pp. 1381-1386, 2011).

The difference signal generation unit 208 may generate a motion compensation time average signal using a motion detection technique, and may calculate a difference signal representing the difference between a digital signal output from the ADC 205 and the motion compensation time average signal. With use of the motion compensation time average signal, image quality can be enhanced even if the image capturing apparatus is operating. Further, a sprite image of a time average image may be generated using depth information, and only a background region may be cut out to be processed.

Third Embodiment

Figure 36:
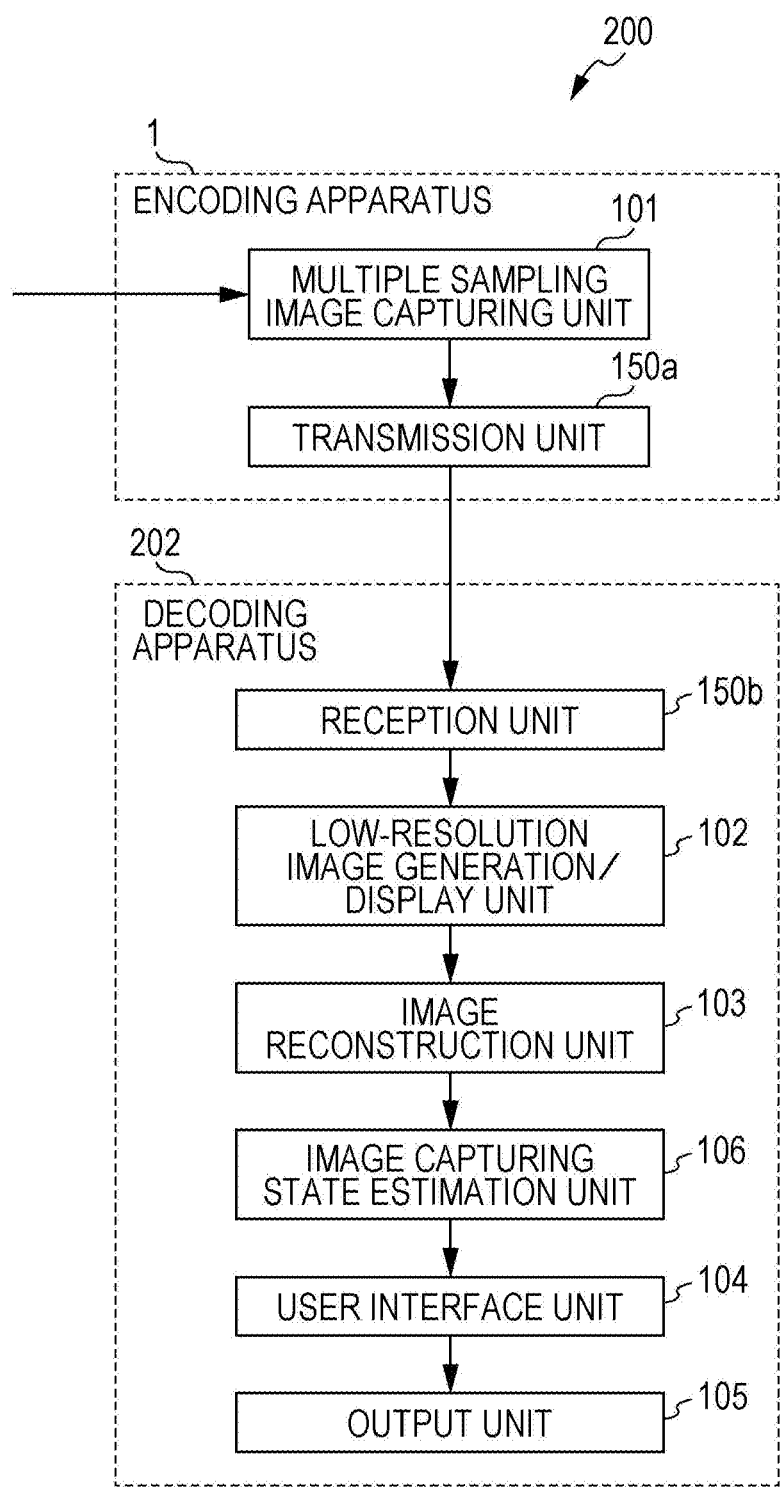
FIG. 36 is a block diagram illustrating the configuration of an encoding system according to a third embodiment.
Figure 37:
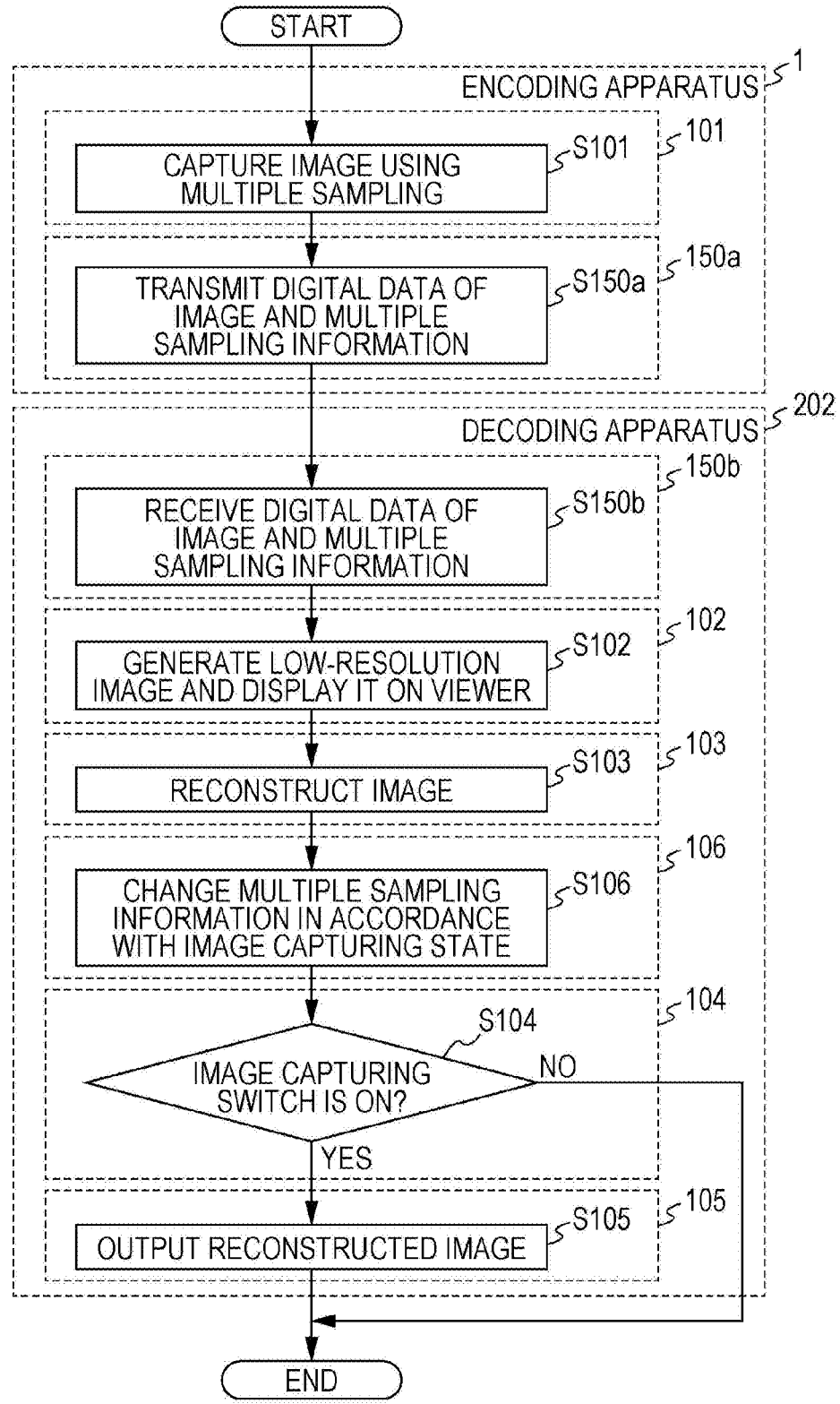
FIG. 37 is a flowchart illustrating the procedure of the encoding system according to the third embodiment.
Figure 38:
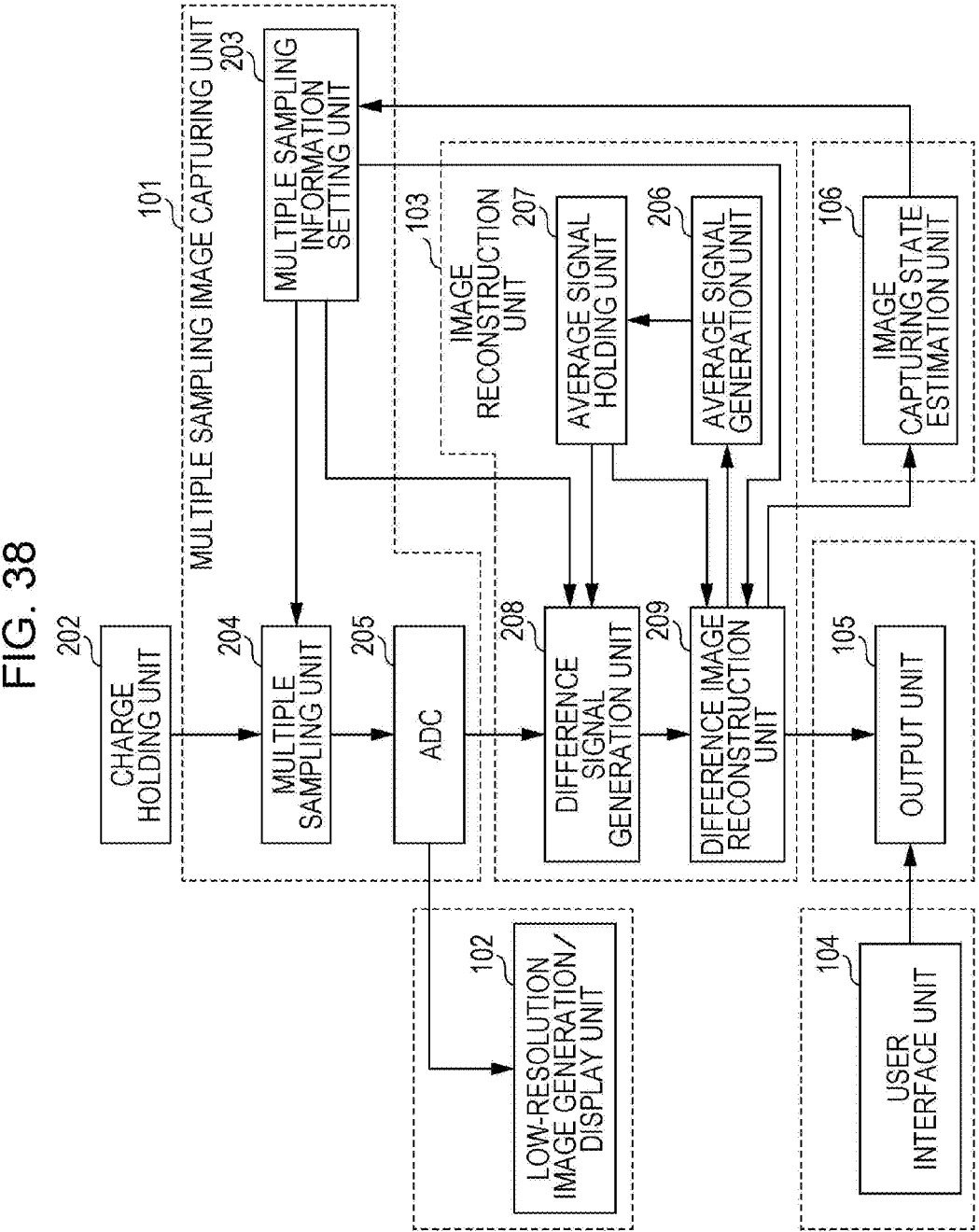
FIG. 38 is a block diagram illustrating the relationship between an image capturing state estimation unit and the image reconstruction unit.

FIG. 36 is a block diagram illustrating the configuration of an encoding system 200 according to a third embodiment. FIG. 37 is a flowchart illustrating the procedure of a process performed in the encoding system 200 according to this embodiment. FIG. 38 is a block diagram illustrating the relationship between an image capturing state estimation unit 106 and the image reconstruction unit 103. In FIGS. 36, 37, and 38, the same elements as those in FIGS. 19, 20, and 21 are denoted by the same reference numerals, and the description thereof is omitted.

The encoding system 200 according to this embodiment is different from the encoding system 100 according to the second embodiment in the configuration of the decoding apparatus. That is, a decoding apparatus 202 according to this embodiment is configured by adding the image capturing state estimation unit 106 to the decoding apparatus 2. Hereinafter, a process performed by the image capturing state estimation unit 106 will be described in detail.

The image capturing state estimation unit 106 estimates an image capturing state, and the multiple sampling information setting unit 203 changes multiple sampling information in accordance with the estimated image capturing state (step S106). The image capturing state means, for example, an image capturing scene which is a state at a time when optical signals are converted to electric signals by the photoelectric conversion unit 51. For example, in a case where the image capturing state estimation unit 106 estimates that a scene in which a temporal change is larger than or equal to a predetermined reference is being captured, the image capturing state estimation unit 106 instructs the multiple sampling information setting unit 203 to change multiple sampling information so as to increase the sampling number of a multiple sampling process for the image region in which a temporal change is large. In a case where the image capturing state estimation unit 106 estimates that a scene in which a temporal change is smaller than the predetermined reference, such as a scene having almost no temporal changes, is being captured, the image capturing state estimation unit 106 instructs the multiple sampling information setting unit 203 to change multiple sampling information so as to decrease the sampling number for the region having almost no temporal changes. Accordingly, the quality of a reconstructed image can be enhanced. In a region having no temporal changes, a time average image held by the average signal holding unit 207 may be used to generate a highly-precise image even if a reconstructed image does not exist. On the other hand, in a region having a large temporal change, that is, in a motion region, a time average image is not usable, and thus the sampling number is increased to enhance the quality of a reconstructed image generated by the image reconstruction unit 103.

As a method for determining, with the image capturing state estimation unit 106, a temporal change in a region, an inter-frame difference value of a reconstructed image may be used as follows.

$$\|I(k)-I(k-1)\|_2^2 \geq Th\_d. \qquad (6)$$

That is, in a case where the inter-frame difference value of the reconstructed image is larger than or equal to a threshold Th_d in a region, the region is determined to be a region having a large temporal change. For the region determined to be a region having a large temporal change, the sampling number is increased from the next frame by the multiple sampling information setting unit 203. On the other hand, for the region determined to be a region having a small temporal change, the sampling number is decreased from the next frame by the multiple sampling information setting unit 203.

Of course, a motion vector of a reconstructed image may be detected to estimate a region in which the temporal change will be large in the next frame, and thereby the sampling number in the region may be increased.

Of course, in order to determine a temporal change in a region, the image capturing state estimation unit 106 may use a low-resolution image generated by the low-resolution image generation/display unit 102, instead of a reconstructed image. Specifically, inter-frame difference values of the first to fourth output signals of the multiple sampling unit 204 may be used. In these output signals, the pixels for which charge signals are added are the same among frames, and thus a temporal change in a region can be estimated. In a region determined to have a large temporal change, the sampling number is increased for the fifth to eighth output signals by the multiple sampling information setting unit 203. On the other hand, in a region determined to have a small temporal change, the sampling number is decreased for the fifth to eighth output signals by the multiple sampling information setting unit 203. If there is a region having no temporal changes, the difference image reconstruction unit 209 may use a time average image as a reconstructed image of the region, and thus need not generate the fifth to eighth output signals.

Of course, in order to determine a temporal change in a region, the image capturing state estimation unit 106 may use inter-frame difference values of the output signals of the multiple sampling unit 204. In this case, for example, the process may be simplified by using the total sum of the difference values.

As described above, according to the third embodiment, the image capturing state estimation unit 106 is used to determine a change in an image capturing state and to set optimal multiple sampling information in accordance with a captured image. Accordingly, a higher-quality reconstructed image can be obtained.

Fourth Embodiment

In the above-described encoding systems according to the second and third embodiments, a low-resolution image is generated by the decoding apparatus, and the low-resolution image is displayed on the viewer provided in the encoding apparatus. The relationship between a low-resolution image and the resolution of the viewer has not been described. However, the resolution of the viewer may be considered to generate a low-resolution image.

Hereinafter, a description will be given of a fourth embodiment in which the process performed in the encoding apparatus is changed so that a low-resolution image can be generated in consideration of the resolution of the viewer.

Figure 39:
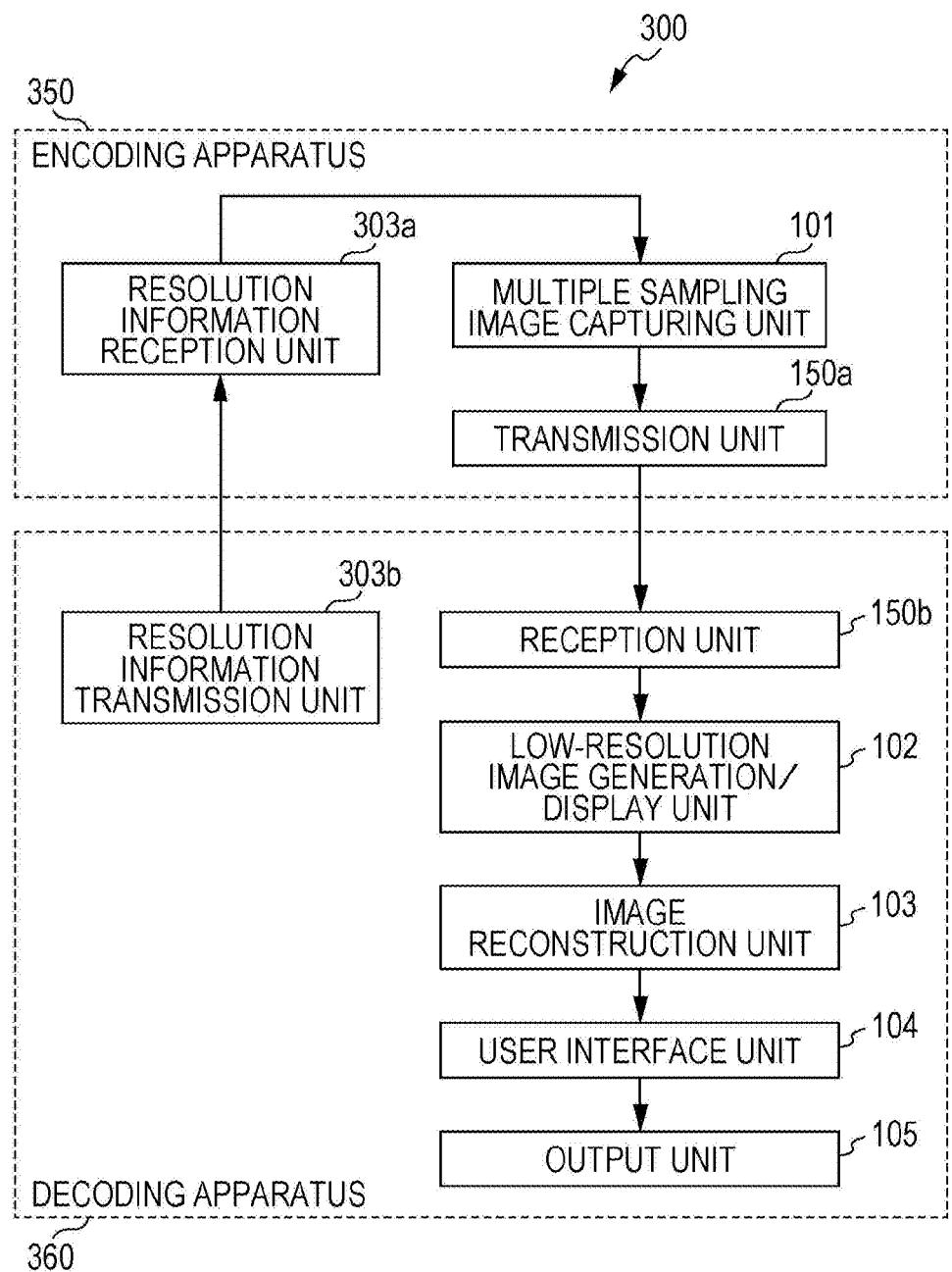
FIG. 39 is a block diagram illustrating the configuration of an encoding system according to a fourth embodiment.

FIG. 39 is a block diagram illustrating the configuration of an encoding system 300 according to this embodiment. In the encoding system 300, elements for transmitting and receiving resolution information are added to the encoding system 100 according to the second embodiment. In FIG. 39, the same elements as those in FIG. 19 are denoted by the same reference numerals, and the description thereof is omitted.

The encoding system 300 includes an encoding apparatus 350 including a resolution information reception unit 303a and a decoding apparatus 360 including a resolution information transmission unit 303b.

The resolution information transmission unit 303b obtains resolution information about a viewer of the decoding apparatus 360 or a viewer connected to the decoding apparatus 360, and transmits the information to the encoding apparatus 350 via a network. The resolution information about the viewer may be stored in a memory in advance. The resolution information reception unit 303a receives information about the resolution transmitted from the decoding apparatus 360.

The multiple sampling information setting unit 203 sets multiple sampling information using the resolution information received by the resolution information reception unit 303a. More specifically, the multiple sampling information setting unit 203 may set multiple sampling information for the first to fourth output data illustrated in FIGS. 25A to 25D so that the resolution of video generated through a multiple sampling process matches the resolution information received by the resolution information reception unit 303a.

In this way, the low-resolution image generation/display unit 102 is capable of displaying an image optimized for the resolution of the viewer.

Although the flowchart illustrating the procedure of the above-described process is omitted, transmission and reception of the resolution information may be performed before step S101 in FIG. 20, and multiple sampling information based on the resolution information may be applied to image capturing using multiple sampling in step S101, for example.

In a case where the resolution of the viewer has a value larger than or equal to a predetermined value, the multiple sampling information setting unit 203 may increase low-resolution pixel groups corresponding to the first to fourth readout pixel groups illustrated in FIGS. 29A to 32B, and may decrease the pixel groups corresponding to the fifth to eighth readout pixel groups that are temporally changed. On the other hand, in a case where the resolution of the viewer is lower than the predetermined value, the multiple sampling information setting unit 203 may decrease the low-resolution pixel groups corresponding to the first to fourth readout pixel groups illustrated in FIGS. 29A to 32B, and may increase the pixel groups corresponding to the fifth to eighth readout pixel groups that are temporally changed.

Fifth Embodiment

In the above-described image capturing system according to the second to fourth embodiments, the decoding apparatus is configured so as to include a relatively large number of elements. However, the configuration of the decoding apparatus can be simplified. In this embodiment, a description will be given of an example in which part of the configuration of the decoding apparatus is separated as an operation apparatus.

Figure 40:
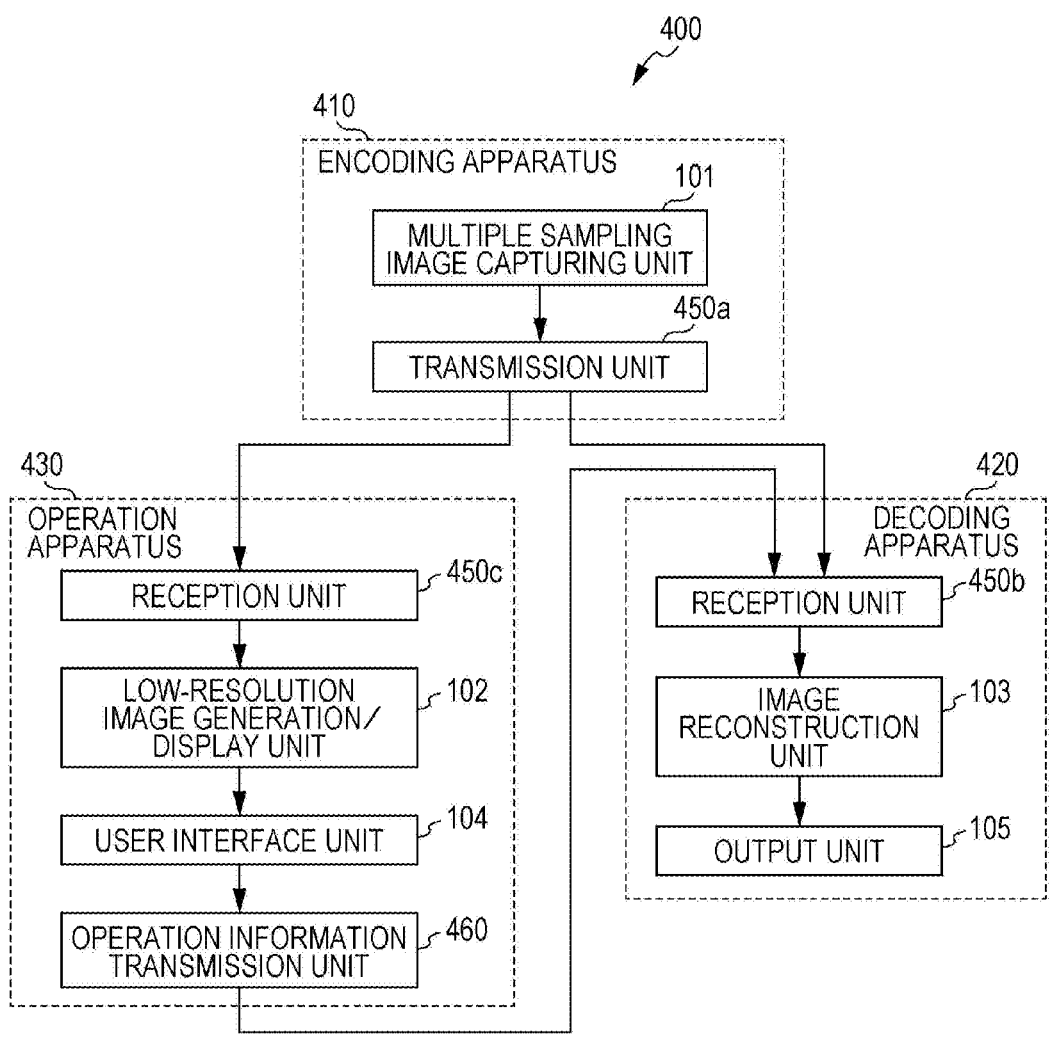
FIG. 40 is a block diagram illustrating the configuration of an encoding system according to a fifth embodiment.

FIG. 40 is a block diagram illustrating the configuration of an encoding system 400 according to this embodiment. The encoding system 400 includes an encoding apparatus 410, a decoding apparatus 420, and an operation apparatus 430.

The encoding apparatus 410 includes the multiple sampling image capturing unit 101 and a transmission unit 450a. The operation apparatus 430 includes a reception unit 450c, the low-resolution image generation/display unit 102, the user interface unit 104, and an operation information transmission unit 460. The decoding apparatus 420 includes a reception unit 450b, the image reconstruction unit 103, and the output unit 105. In FIG. 40, the same elements as those in FIG. 19 are denoted by the same reference numerals, and the description thereof is omitted.

The transmission unit 450a of the encoding apparatus 410 transmits digital data of an image and multiple sampling information.

The reception unit 450c of the operation apparatus 430 receives digital data of low-resolution pixel groups corresponding to the first to fourth readout pixel groups illustrated in FIGS. 29A to 32B. Multiple sampling information is not necessary. Because a real-time operation is required, only the digital data of low-resolution pixel groups may be obtained.

The operation information transmission unit 460 transmits operation information to the decoding apparatus 420. The operation information indicates whether or not the user has an intention of recording an image. This process corresponds to, for example, ON or OFF of the image capturing switch in step S104 in FIG. 20 according to the second embodiment. In a case where the user has an intention of recording an image, the case is equivalent to a case where the image capturing switch in FIG. 20 is ON. On the other hand, in a case where the user does not have an intention of recording an image, the case is equivalent to a case where the image capturing switch in FIG. 20 is OFF.

Although the flowchart illustrating the procedure of the above-described process is omitted, transmission and reception of resolution information may be performed before step S101 in FIG. 20, and multiple sampling information based on the resolution information may be applied to image capturing using multiple sampling in step S101, for example.

The reception unit 450b of the decoding apparatus 420 receives the digital data of the image and the multiple sampling information transmitted from the transmission unit 450a of the encoding apparatus 410, and also receives the operation information transmitted from the operation information transmission unit 460 of the operation apparatus 430.

As is clear from the configuration according to this embodiment, the configurations of the decoding apparatuses according to the second to fourth embodiments are examples, and the configuration of the decoding apparatus can be divided into a plurality of separate apparatuses.

Sixth Embodiment

In the above-described first to fifth embodiments, an explicit description is not given of an output destination of a reconstructed image output from the output unit of the decoding apparatus. In this embodiment, a description will be given of an example of a process performed by the output destination.

Figure 41:
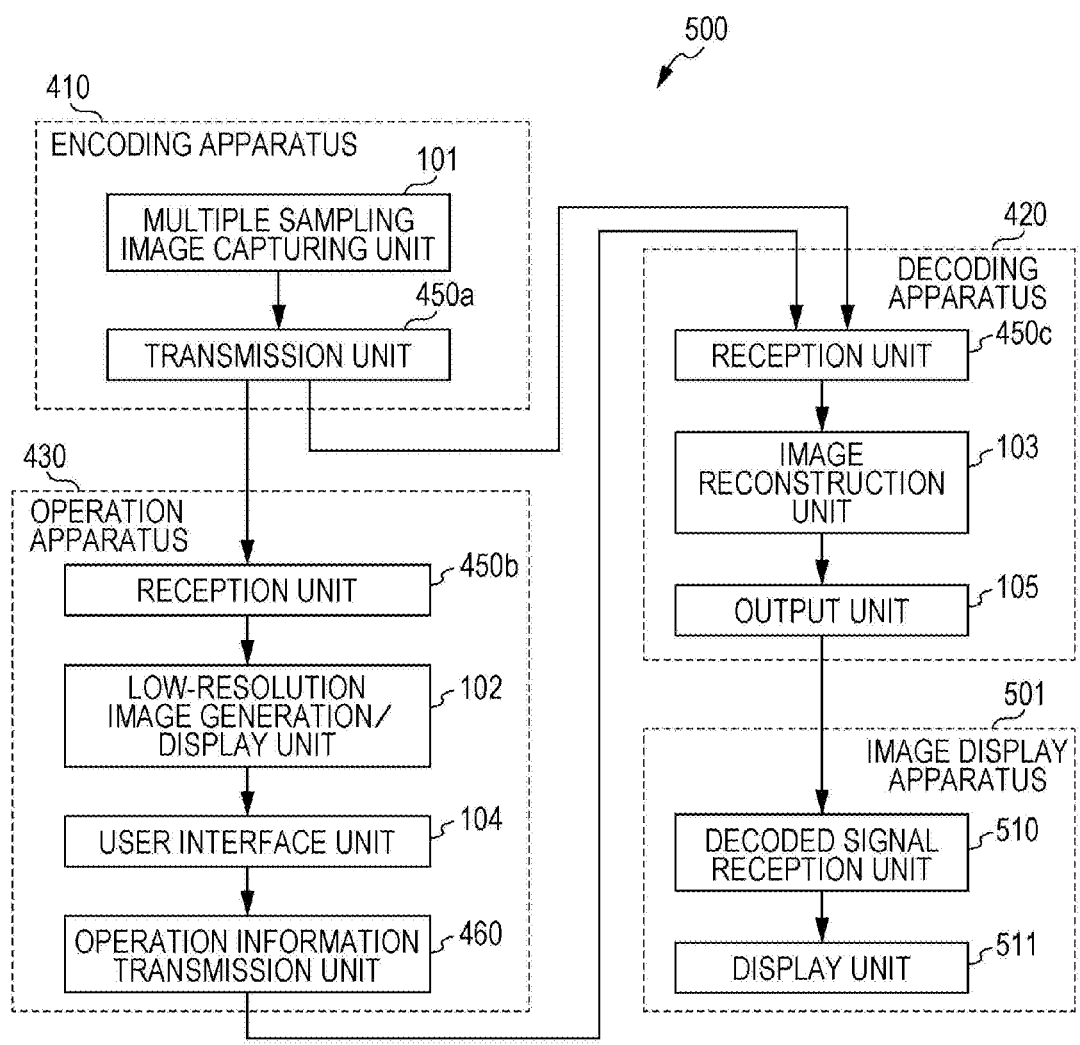
FIG. 41 is a block diagram illustrating the configuration of an encoding system according to a sixth embodiment.

FIG. 41 is a block diagram illustrating the configuration of an encoding system 500 according to this embodiment. The encoding system 500 according to this embodiment is configured by adding an image display apparatus 501 to the encoding system 400 according the fifth embodiment. The same elements as those of the encoding system 400 are denoted by the same reference numerals as those in FIG. 40, and the description thereof is omitted.

The image display apparatus 501 is, for example, a liquid crystal display or a projector.

The image display apparatus 501 includes a decoded signal reception unit 510 and a display unit 511. The decoded signal reception unit 510 receives a decoded signal output from the output unit 105 of the decoding apparatus 420. For example, in a case where the decoded signal is a digital signal, the decoded signal reception unit 510 receives the decoded signal via a wireless or wired communication line (network). The display unit 511 displays an image obtained from the decoded image. The resolution of the displayed image is higher than the resolution of an image displayed by the low-resolution image generation/display unit 102.

Seventh Embodiment

A seventh embodiment relates to a configuration for a new issue recognized by the inventors of the present application. First, the issue will be described.

In a moving image compression technique according to the related art, data for pixels in a still region in which no change occurs among frames is not transmitted, and only data for a region including a motion is transmitted, so as to increase the compression rate. In this method, however, if a user extracts one still image from moving image frames or if the user cuts out a still image region of part of an image from a moving image, the quality of the still image portion is insufficient in some cases.

The inventors of the present application focused their attention on an issue that it is important to enhance the image quality in a still region in the case of cutting out a still image from a moving image. A display control method described below has been conceived by the inventors of the present application to address the issue. With the configuration according to this embodiment, the quality of a reconstructed image in a still region can be enhanced as the number of frames of a still region increases.

Hereinafter, the configuration and operation of a system according to this embodiment will be described.

Figure 42:
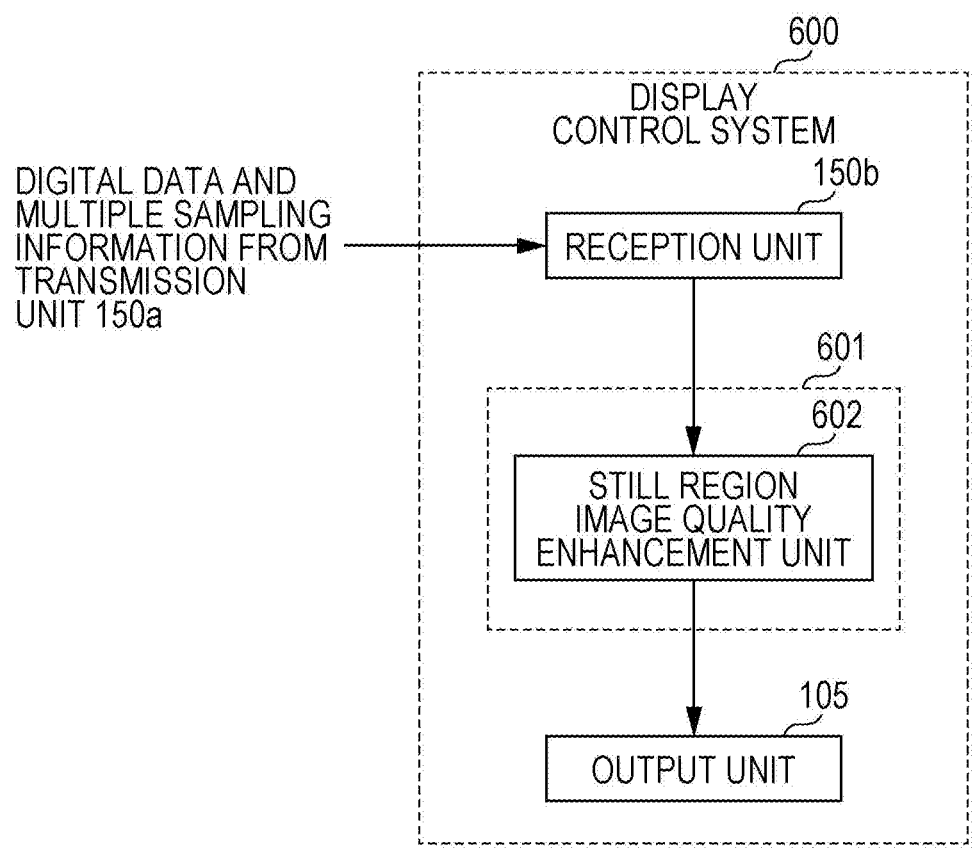
FIG. 42 is a block diagram illustrating an example of the configuration of a display control system according to a seventh embodiment.

FIG. 42 is a block diagram illustrating an example of the configuration a display control system 600 according to this embodiment. In FIG. 42, the same elements as those in FIG. 19 are denoted by the same reference numerals, and the description thereof is omitted. The display control system 600 can coexist with the decoding apparatus 2 illustrated in FIG. 19.

The display control system 600 includes the reception unit 150b, a display control unit 601, and the output unit 105. The display control unit 601 includes a still region image quality enhancement unit 602. The display control unit 601 may be constituted by, for example, a central processing unit (CPU) or a graphics processor.

Figure 43:
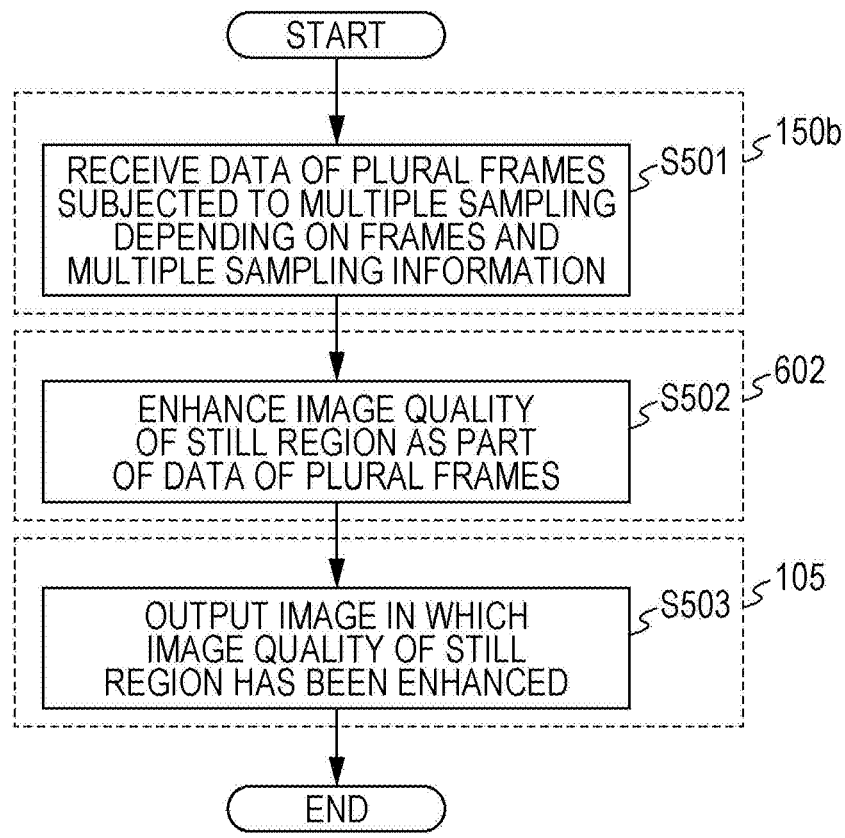
FIG. 43 is a flowchart illustrating the procedure of a main process performed in the display control system according to the seventh embodiment.

FIG. 43 is a flowchart illustrating the procedure of a process performed in the display control system 600 according to the seventh embodiment.

The reception unit 150b receives data of a plurality of frames and multiple sampling information (step S501). As described above, the data of the plurality of frames is obtained as a result of a multiple sampling process that depends on frames. As in the image capturing state estimation unit 106 described above, a region in which pixel values are not largely changed compared to the preceding frame is specified as a still region. Of course, a signal specifying a still region may be received from the outside. This signal may be input by a user using a playback time of a moving image, or may be input from a timer or the like on the basis of a predetermined playback time or playback interval. Alternatively, an instruction may be part of a region of a still image indicated by a user using a mouse or a pen tablet.

The still region image quality enhancement unit 602 specifies a still region, which is part of the data of the plurality of frames received by the reception unit 150b, on the basis of an instruction received from the outside. Also, the still region image quality enhancement unit 602 enhances the image quality of the specified still region using the data of the plurality of frames received by the reception unit 150b (step S502). The decoding apparatus 2 according to the second or third embodiment may be used for this process. That is, the configuration of the still region image quality enhancement unit 602 may correspond to the decoding apparatus 2, and at least part of the frame specified by an instruction related to the above-described still region may be extracted as a still image.

As illustrated in FIG. 35, the quality in a still region of a reconstructed image according to the second embodiment enhances as the number of frames increases. Specifically, multiple sampling information is changed in accordance with frames, so as to decrease the correlation of artifacts among frames and to enhance the quality of a reconstructed image.

The output unit 105 outputs an image whose image quality in a still region has been enhanced by the still region image quality enhancement unit 602 (step S503).

Figure 44:
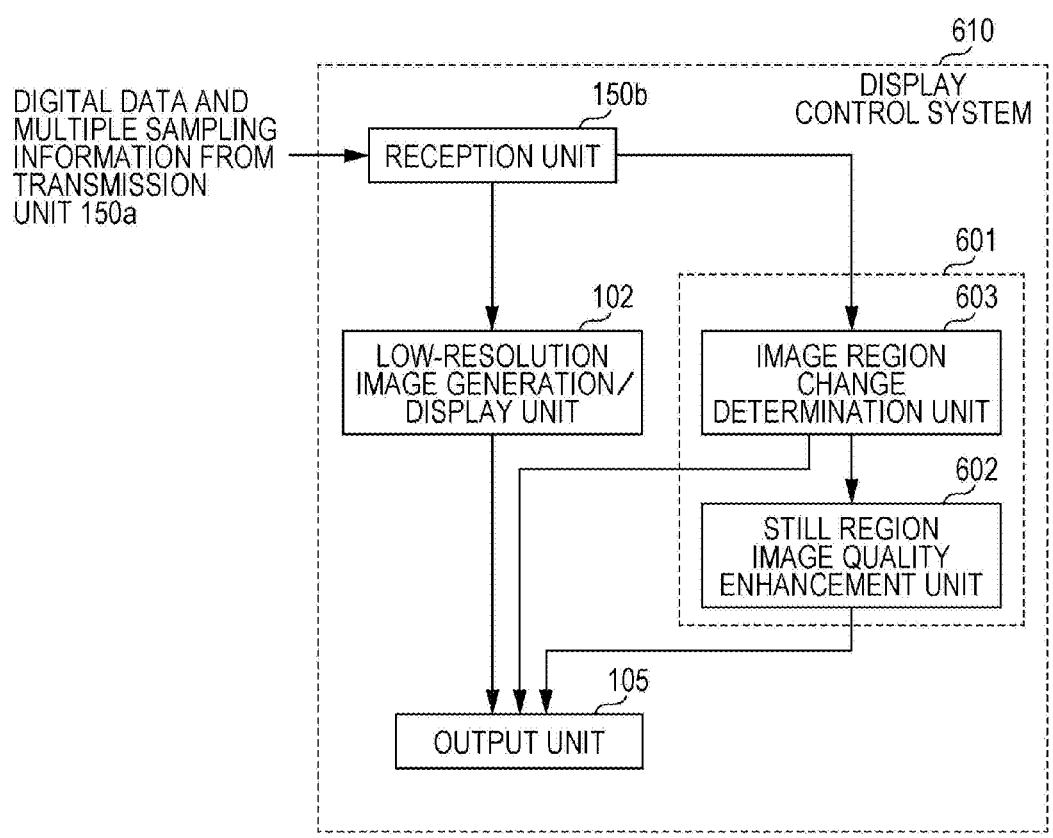
FIG. 44 is a block diagram illustrating an example of the configuration of another display control system according to the seventh embodiment.

Next, a modification example of the display control system 600 will be described. FIG. 44 illustrates a display control system 610, which is a modification example of the display control system 600. The display control system 610 includes the reception unit 150b, the low-resolution image generation/display unit 102, the display control unit 601, and the output unit 105. The display control unit 601 includes an image region change determination unit 603. The image region change determination unit 603 switches the output in accordance with the data received by the reception unit 150b. In FIG. 44, the same elements as those in FIGS. 19 and 42 are denoted by the same reference numerals, and the description thereof is omitted.

Figure 45:
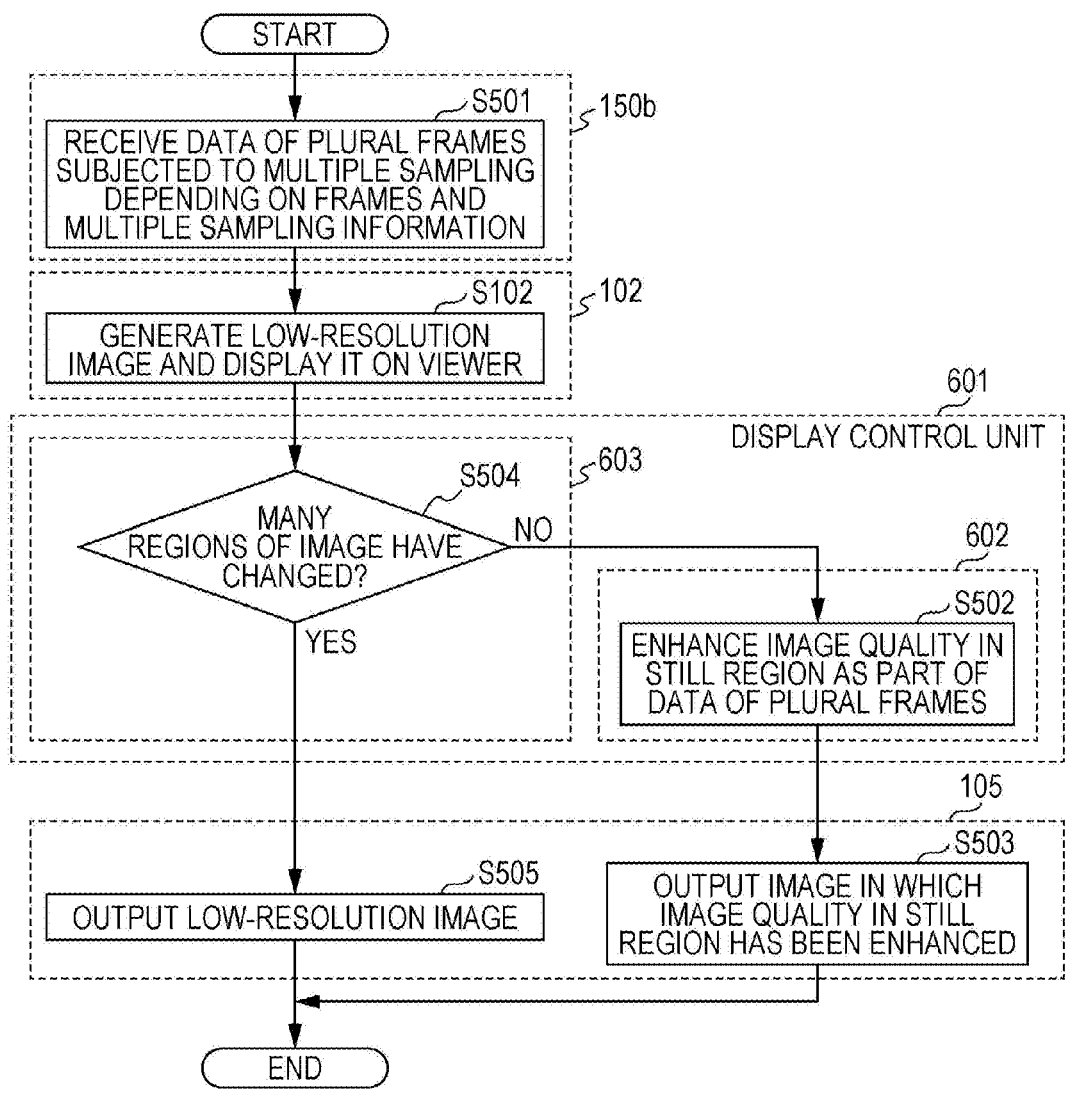
FIG. 45 is a flowchart illustrating the procedure of a main process performed in the other display control system according to the seventh embodiment.

FIG. 45 is a flowchart illustrating the procedure of a process performed in the display control system 610 according to the modification example of the seventh embodiment. In FIG. 45, the same elements as those in FIGS. 20 and 43 are denoted by the same reference numerals, and the description thereof is omitted.

First, the display control unit 601 according to the modification example of this embodiment determines, with the image region change determination unit 603, whether or not there is a great change in many regions of an image compared to the preceding frame (step S504). As in the image capturing state estimation unit 106 described above, the determination may be performed using a reconstructed image and a low-resolution image generated by the low-resolution image generation/display unit 102, and the percentage of the pixels satisfying expression (6). For example, in a case where the percentage of the pixels satisfying expression (6) is higher than or equal to a certain percentage of the entire image (for example, two thirds), it may be determined that there is a great change. Otherwise, it may be determined that there is a small change.

If the image region change determination unit 603 determines that there is a change in many regions of a displayed image (YES in step S504), the output unit 105 outputs the low-resolution image generated by the low-resolution image generation/display unit 102 (step S505). This is because it is estimated that the image quality will not be significantly enhanced even if image reconstruction is performed.

On the other hand, if the image region change determination unit 603 determines that the image has been hardly changed (NO in step S504), the still region image quality enhancement unit 602 enhances, using the data of the plurality of frames received by the reception unit 150b, the image quality of the still region which is part of the data (step S502), and the output unit 105 outputs an image in which the image quality of the still region has been enhanced by the still region image quality enhancement unit 602 (step S503).

An image capturing system according to an embodiment of the present disclosure is effective to enhance image quality in an image capturing apparatus using compressed sensing that can realize lower power consumption, a higher SN ratio, and a reduced communication band.

What is claimed is:

1. An image capturing system comprising:
   a photoelectric conversion unit configured to convert optical signals received by a plurality of pixels to electric signals, the photoelectric conversion unit converting first optical signals received by the plurality of pixels to first electric signals and converting second optical signals received by the plurality of pixels to second electric signals, the photoelectric conversion unit receiving the second optical signals after receiving the first optical signals;
   a charge holding unit configured to store the electric signals and hold the electric signals as charge signals, the charge holding unit storing the first electric signals and holding the first electric signals as first charge signals, the charge holding unit storing the second electric signals and holding the second electric signals as second charge signals;
   a multiple sampling information setting unit configured to set multiple sampling information used for a multiple sampling process, the multiple sampling information including first multiple sampling information and second multiple sampling information different from the first multiple sampling information;
   a multiple sampling unit configured to perform the multiple sampling process using the multiple sampling information and the charge signals so as to output signals, the multiple sampling unit performing the multiple sampling process using the first multiple sampling information and first pixel values of a first plurality of pixels included in the plurality of pixels so as to output first signals used for a first frame, the first charge signals including the first pixel values, the multiple sampling unit performing the multiple sampling process using the second multiple sampling information and second pixel values of the first plurality of pixels so as to output second signals used for a second frame immediately after the first frame in time, the second charge signals including the second pixel values, the output signals including the first signals and the second signals;
   a conversion unit configured to convert the output signals to digital signals; and an image reconstruction unit configured to generate reconstructed images using the digital signals and the multiple sampling information, and output the reconstructed images.

2. An image capturing apparatus comprising:
a photoelectric conversion unit configured to convert optical signals received by a plurality of pixels to electric signals, the photoelectric conversion unit converting first optical signals received by the plurality of pixels to first electric signals and converting second optical signals received by the plurality of pixels to second electric signals, the photoelectric conversion unit receiving the second optical signals after receiving the first optical signals;
a charge holding unit configured to store the electric signals and hold the electric signals as charge signals, the charge holding unit storing the first electric signals and holding the first electric signals as first charge signals, the charge holding unit storing the second electric signals and holding the second electric signals as second charge signals;
a multiple sampling information setting unit configured to set multiple sampling information used for a multiple sampling process, the multiple sampling information including first multiple sampling information and second multiple sampling information different from the first multiple sampling information; and
a multiple sampling unit configured to perform the multiple sampling process using the multiple sampling information and the charge signals so as to output signals, the multiple sampling unit performing the multiple sampling process using the first multiple sampling information and first pixel values of a first plurality of pixels included in the plurality of pixels so as to output first signals used for a first frame, the first charge signals including the first pixel values, the multiple sampling unit performing the multiple sampling process using the second multiple sampling information and second pixel values of the first plurality of pixels so as to output second signals used for a second frame immediately after the first frame in time, the second charge signals including the second pixel values, the output signals including the first signals and the second signals.

3. A decoding apparatus that receives digital signals from an encoding apparatus, comprising:
a reception unit configured to receive the digital signals and multiple sampling information from the encoding apparatus; and
an image reconstruction unit configured to generate a reconstructed image using the digital signals and the multiple sampling information,
the encoding apparatus including
a photoelectric conversion unit configured to convert optical signals received by a plurality of pixels to electric signals, the photoelectric conversion unit converting first optical signals received by the plurality of pixels to first electric signals and converting second optical signals received by the plurality of pixels to second electric signals, the photoelectric conversion unit receiving the second optical signals after receiving the first optical signals,
a charge holding unit configured to store the electric signals and hold the electric signals as charge signals, the charge holding unit storing the first electric signals and holding the first electric signals as first charge signals, the charge holding unit storing the second electric signals and holding the second electric signals as second charge signals,
a multiple sampling information setting unit configured to set the multiple sampling information used for a multiple sampling process, the multiple sampling information including first multiple sampling information and second multiple sampling information different from the first multiple sampling information,
a multiple sampling unit configured to perform the multiple sampling process using the multiple sampling information and the charge signals so as to output signals, the multiple sampling unit performing the multiple sampling process using the first multiple sampling information and first pixel values of a first plurality of pixels included in the plurality of pixels so as to output first signals used for a first frame, the first charge signals including the first pixel values, the multiple sampling unit performing the multiple sampling process using the second multiple sampling information and second pixel values of the first plurality of pixels so as to output second signals used for a second frame immediately after the first frame in time, the second charge signals including the second pixel values, the output signals including the first signals and the second signals, and
a conversion unit configured to convert the output signals to digital signals.

4. An image capturing method comprising:
a photoelectric conversion step of converting, using a photoelectric conversion unit, optical signals received by a plurality of pixels to electric signals, the photoelectric conversion unit converting first optical signals received by the plurality of pixels to first electric signals and converting second optical signals received by the plurality of pixels to second electric signals, the photoelectric conversion unit receiving the second optical signals after receiving the first optical signals;
a charge holding step of storing, using a charge holding unit, the electric signals and holding the electric signals as charge signals, the charge holding unit storing the first electric signals and holding the first electric signals as first charge signals, the charge holding unit storing the second electric signals and holding the second electric signals as second charge signals;
a multiple sampling information setting step of setting, using a multiple sampling information setting unit, multiple sampling information used for a multiple sampling process, the multiple sampling information including first multiple sampling information and second multiple sampling information different from the first multiple sampling information;
a multiple sampling step of performing, using a multiple sampling unit, the multiple sampling process using the multiple sampling information and the charge signals so as to output signals, the multiple sampling step performing the multiple sampling process using the first multiple sampling information and first pixel values of a first plurality of pixels included in the plurality of pixels so as to output first signals used for a first frame, the first charge signals including the first pixel values, the multiple sampling step performing the multiple sampling process using the second multiple sampling information and second pixel values of the first plurality of pixels so as to output second signals used for a second frame immediately after the first frame in time, the second charge signals including the second pixel values, the output signals including the first signals and the second signals;

a conversion step of converting, using a conversion unit, the output signals to digital signals; and an image reconstruction step of generating, using an image reconstruction unit, reconstructed images using the digital signals and the multiple sampling information, and outputting the reconstructed images.

5. An image capturing method comprising:

converting first optical signals received by a plurality of pixels to first electric signals and second optical signals received by the plurality of pixels to second electric signals, the plurality of pixels and the first electric signals being in a one-to-one relationship, the plurality of pixels and the second electric signals being in a one-to-one relationship, the photoelectric conversion unit receiving the second optical signals after receiving the first optical signals;

holding the first electric signals as first charge signals and the second electric signals as second charge signals, the first electric signals and the first charge signals being in a one-to-one relationship, the second electric signals and the second charge signals being in a one-to-one relationship;

generating first signals by using first multiple sampling information items and generating second signals by using second multiple sampling information items, wherein the first signals and the first multiple sampling information items are in a one-to-one relationship, a third signal included in the first signals corresponds to a third multiple sampling information item included in the first multiple sampling information items, charge signals, included in the first charge signals, from pixels indicated by the third multiple sampling information item, are used when the third signal is generated, a total number of the first signals is smaller than a total number of the first charge signals, the second signals and the second multiple sampling information items are in a one-to-one relationship, a fourth signal included in the second signals corresponds to a fourth multiple sampling information item included in the second multiple sampling information items, charge signals, included in the second charge signals, from pixels indicated by the fourth multiple sampling information item, are used when the fourth signal is generated, and a total number of the second signals is smaller than a total number of the second charge signals; and converting the first signals to first digital signals and the second signals to second digital signals, the first digital signals being used for a first frame, and the second digital signals being used for a second frame after the first frame in time.

* * * * *